United States Patent [19]
Dipaolo et al.

[11] Patent Number: 5,367,619
[45] Date of Patent: Nov. 22, 1994

[54] ELECTRONIC DATA ENTRY SYSTEM EMPLOYING AN EXPERT SYSTEM TO FACILITATE GENERATION OF ELECTRONIC DATA FORMS WITH COMPLEX INTERRELATIONSHIPS BETWEEN FIELDS AND SUBFORMS

[75] Inventors: William J. Dipaolo, Pittsburgh; David M. Tinley, Pitcairn; Timothy F. Thompson, Monroeville; Carol A. Parsons, Forest Hills, all of Pa.

[73] Assignee: Eaton Corporation, Cleveland, Ohio

[21] Appl. No.: 179,994

[22] Filed: Jan. 10, 1994

Related U.S. Application Data

[63] Continuation of Ser. No. 515,817, Apr. 27, 1990, abandoned.

[51] Int. Cl.$^5$ ............................................. G06F 15/62
[52] U.S. Cl. ..................................... 395/149; 395/50; 395/600; 395/156
[58] Field of Search ................. 395/148, 149, 600, 50, 395/156; 364/413.02, 413.1, 401

[56] References Cited

U.S. PATENT DOCUMENTS

| | | | |
|---|---|---|---|
| 4,723,209 | 2/1988 | Hernandez et al. | 364/300 |
| 4,752,889 | 6/1988 | Rappaport et al. | 364/513 |
| 4,789,962 | 12/1988 | Berry et al. | 364/900 |
| 4,823,283 | 4/1989 | Diehm et al. | 364/518 |
| 4,837,693 | 6/1989 | Schotz | 364/408 |
| 4,866,634 | 9/1989 | Reboh et al. | 364/513 |
| 4,982,344 | 1/1991 | Jordan | 364/521 |
| 5,008,810 | 4/1991 | Kessel et al. | 364/200 |
| 5,077,666 | 12/1991 | Brimm et al. | 364/413.02 |
| 5,206,949 | 4/1993 | Cochran et al. | 395/600 |

OTHER PUBLICATIONS

Cobb, *Excel in Business,* "Editing the Worksheet", pp. 143–184, 1989.
Meadows Laura Lou; "AM-Tax (one of four tax--preparation software evaluations in tax preparation software moves toward eletronic filing, artificial intelligence)"; *PC Magazine* Feb. 27, 1990 v9 n4; p. 387.
Brody, Herb; "A tax expert you can trust"; *PC-Computing;* Mar. 1990; v3 n3; pp. 129–132.
Meadows, Laura Lou; "Countdown to Apr. 15: five more personal income-tax programs"; PC-Magazine; Mar. 14, 1989; v8 n5; pp. 444–448.

*Primary Examiner*—Heather R. Herndon
*Assistant Examiner*—Joseph H. Feild
*Attorney, Agent, or Firm*—Martin J. Moran

[57] ABSTRACT

An rulebase software system is incorporated into a form data entry system for a digital computer to assure that only complete, consistent and valid data entries are made in accordance with the expert system rulebase. The rulebase is in a simple tabular format which eliminates the need for programming. The system interprets the rulebase tables automatically in order to draw the data forms and subforms displayed on the computer screen. Dependencies between input data fields on a data form and between fields and subforms are embedded in the tables of the rulebase. Valid data entries displayed for a given menu field vary in accordance with certain prior entries, and fields which can only assume one valid value can be automatically filled in with the single value dependent upon the value previously entered for designated other fields. Context sensitive hypertext help forms called by a selected field are dependent upon values previously entered for designated other fields.

14 Claims, 28 Drawing Sheets

FIG. 1

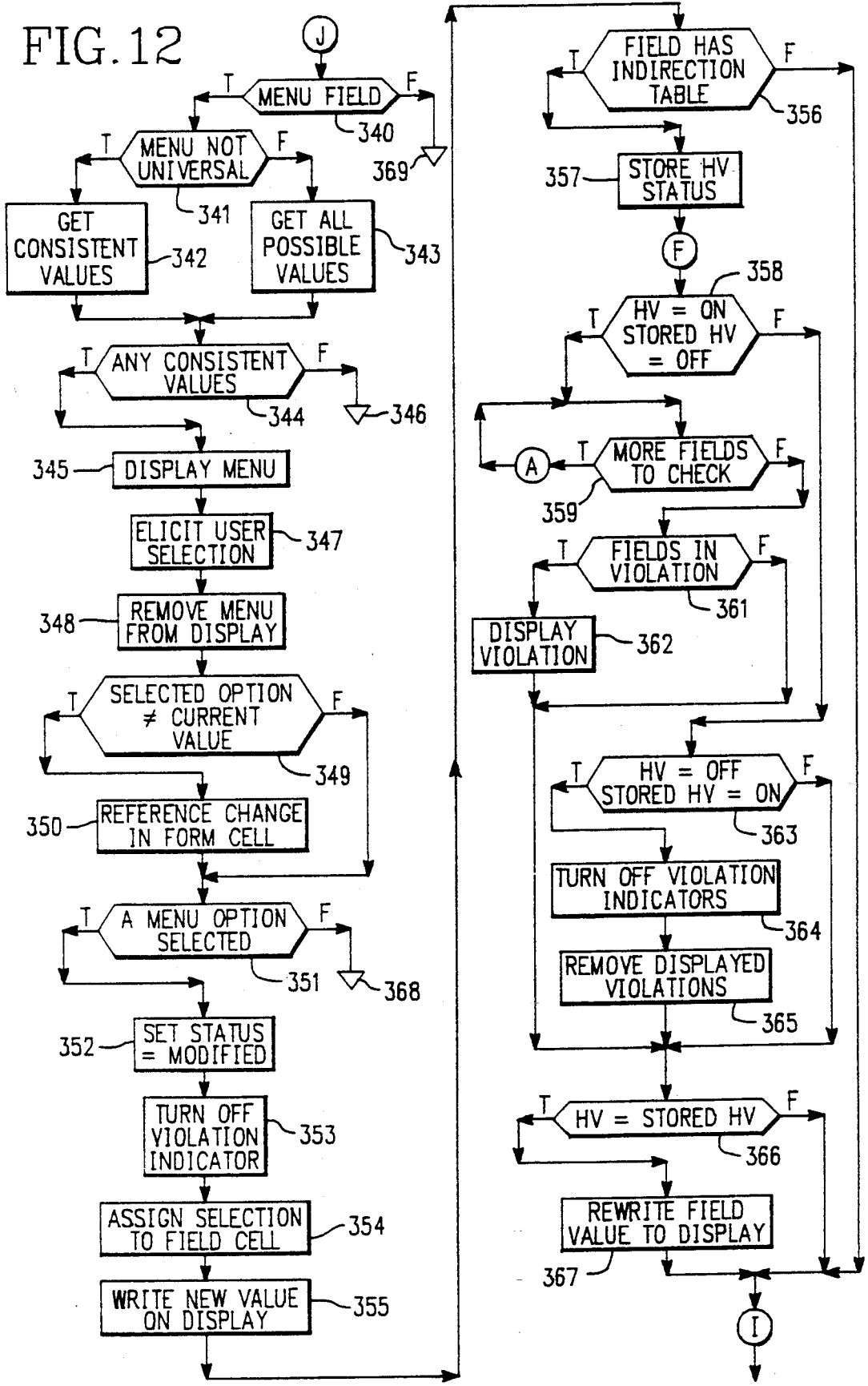

ELECTRONIC DATA ENTRY SYSTEM EMPLOYING AN EXPERT SYSTEM TO FACILITATE GENERATION OF ELECTRONIC DATA FORMS WITH COMPLEX INTERRELATIONSHIPS BETWEEN FIELDS AND SUBFORMS

This application is a continuation of application Ser. No. 07/515,817 filed Aug. 27, 1990, now abandoned.

BACKGROUND INFORMATION

1. Field of the Invention

This invention relates to a data entry system for digital computers, and more particularly to such a system which employs an expert software system to facilitate the generation of electronic data forms with complex interrelationships between fields and subforms and in which the validity of entries is assured as the data is entered.

2. Background Information

Many data entry systems for digital computers utilize a form format in which background text and blanks or fields in which the user is to insert data are presented on a display screen. The user proceeds from field to field supplying the requested data. In some instances, the user is presented with a list of entries for a particular field in the form of a menu from which the user can select an entry. This eliminates the need to remember suitable entries for that field and to type in the selected entry, thus saving time and reducing errors. Where there is much data to be entered, successive forms can be presented to the user. The succession of forms presented cannot depend on entries made in particular fields, and thus, the path through a network or hierarchy of forms cannot vary depending upon selections made by the user at a given field always the same.

While such data entry systems aid a user in inputting data into a digital computer, particularly by reducing typing requirements and speeding up data entry, in all but very small, and therefore limited applications, they do not assure that the data will be valid and consistent when it is entered. Expert systems are examples of computer programs which frequently use the form format of data entry. It is widely acknowledged that user acceptance is the key to the success of an expert system. A large percentage of expert systems employ a user interface of the kind that the MYCIN system (Stanford University, circa 1975) used. As this type of system processes rules, it decides what further questions need to be asked of the user. The question is printed on the screen and the user is prompted to type in some information in a "fill in the blank" format. Users are often frustrated by this approach, especially novice users, because the system may ask questions in a seemingly random fashion. It is possible not to understand what is really being asked. It is also possible not to know what the legal answers to a question are, and it is further possible to enter a value which the system discovers is invalid only at a later stage.

Many other expert systems use an interface like the one employed by DEC's R1 system (circa 1980). R1 requires all answers to all questions to be typed in up front, before the expert system begins processing rules. This method has the advantage that all the questions are answered at the same time, but has the disadvantages that questions irrelevant to a specific job must also be answered, and that the user still may not know what the legal answers to a question are. In addition, the expert system only detects inconsistent or invalid responses after all of the input has been gathered and rule processing has commenced.

There remains a need for an improved system for inputting data to a program running on a digital computer.

More particularly, there is a need for such an improved system for inputting data to a program in a form format.

There is a further need for such a system for inputting data to a program in which the data is verified as it is entered.

There is a particular need for such an improved system for inputting data to an expert system.

There is also a need for such an improved system for inputting data to a program running on any digital computer and in particular a personal computer.

SUMMARY OF THE INVENTION

These and other needs are satisfied by the invention which is directed to a system for entering data to a digital computer program. This novel system integrates an expert system with electronic data forms. Essentially, at each field in an electronic dataform, a rulebase is employed to insure that the value entered by the user is valid in the context of the information entered up to that point. With this system, electronic data forms with complex interrelationships between fields and subforms can be developed, but there is no computer programming involved. All forms and fields are specified in a simple tabular format. The resultant electronic data forms provide the end user with a uniform interface which automatically validates input data, and insures that values entered for each field are consistent with all other values. In addition to data entry forms, hypertext help forms can be displayed in a sequence which is variable dependent upon the data entered by the user. The invention is machine independent, however, the exemplary system has been implemented on a personal computer.

More particularly, the invention is directed to a system for data entry for a digital computer which generates on a display screen variable menus of valid entries for selected menu fields with the valid data entries being variable dependent upon data entries made for designated other fields. In this manner, only valid data entries consistent with previous entries can be made for the selected fields by the user. Fields which have only one valid data entry which is dependent upon entries made for designated other fields may be designated automatically. The entries for these fields can be automatically updated without user input when any value of the designated other fields is changed. Where the automatic field is a designated other field for additional automatic fields the data entry system iteratively automatically enters the valid data entries for the additional automatic fields until a stable state is reached and no additional field values change.

The system for data entry in accordance with the invention incorporates an expert system having a rulebase which includes rules establishing the one valid entry for a selected field for each combination of values for the designated other fields and an inference engine which fires the rules to select the one valid data entry dependent upon the values of the designated other fields. This expert system includes a table for each of the fields having only one valid data entry with each table including an input column for each of the designated other fields upon which the one valid entry for the selected field depends, an output column and successive rows, each containing in the input columns a combination of values for the designated other fields and in the output column the one valid data entry for the selected field for the values of the designated other fields in the input columns. Each row in this table constitutes a rule in the rulebase. A similar table is maintained for each field having a menu of valid outputs, with the output columns specifying the valid entries for each combination of input values in a row.

Also in accordance with the invention, appropriate commands invoked at designated fields on a given form can result in display of one of a plurality of subforms with the subform displayed being variable dependent upon the data entered for designated other fields. Again, an expert system having a rulebase which includes rules establishing the one subform displayed for each combination of values for the designated other fields is incorporated in the system. This rulebase includes an indirection table for each field that may call a subform. The indirection table includes an input column for each designated other field upon which the one subform displayed by invocation of the appropriate command is dependent, an output column, and successive rows each containing in the input columns a combination of values for the designated other fields and in the output column the one subform displayed for the values of the designated other fields in the input columns, with each row constituting a rule in the rulebase.

As another aspect of the invention, certain fields appear in multiple locations in an interface and can be designated as global fields so that entering a value in the global field with a specified name in one location enters that same value in all other fields of like name in the interface. Further, the values of specified fields in subforms can be overridden on entry to those subforms by values entered for those fields in a parent form, and a field on a parent form can be labeled for modification upon return from a subform such that the labeled field on the parent form is changed to the value of a field of the same name on the subform when returning to the parent form from the subform.

As yet another feature of the invention, hypertext help forms can be called up for display with the hypertext help form network dependent upon the values that have been entered for designated fields on the calling form. In this manner, the help forms presented are dynamically tailored to the prevailing conditions. Each particular help form called is determined by an indirection table contained in the expert system rulebase.

BRIEF DESCRIPTION OF THE DRAWINGS

A full understanding of the invention can be gained from the following description of the preferred embodiment when read in conjunction with the accompanying drawings in which:

FIG. 1 is an illustration of a display generated by the electronic form data entry system of the invention.

FIGS. 5A, 5B, 6, 7A, 7B, 7C, 8, 9, 10A, 10B and 11-18 are flow charts of a computer program suitable for implementation of the electronic form data entry system of the invention in the digital computer installation of FIG. 3.

FIG. 18 is a functional diagram illustrating the organization of a system for implementing expert software systems utilizing the software tools of the related application.

DESCRIPTION OF THE PREFERRED EMBODIMENTS

Figure 2:
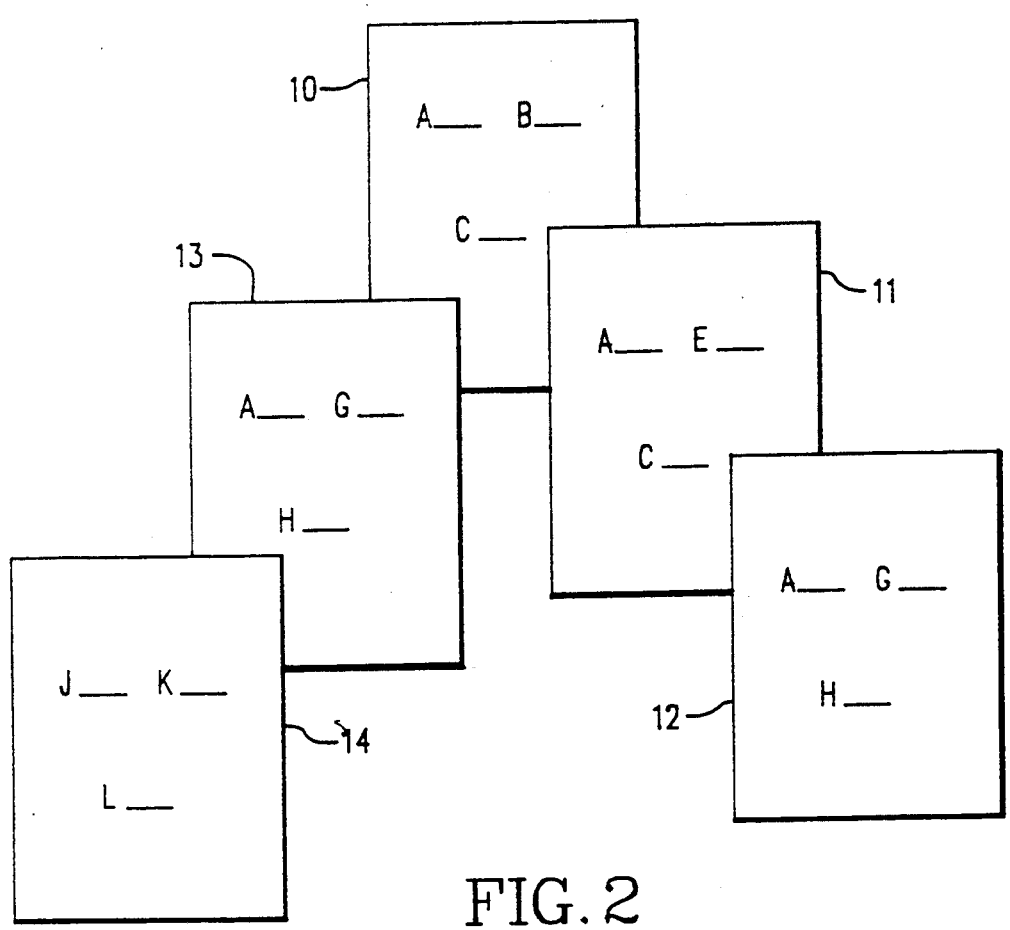
FIG. 2 is an illustration of a heirarchy of forms generated by the electronic form data entry system of the invention.

This invention is directed to an electronic form data entry system which utilizes an expert system to guide the user in entering data on the forms and to assure that the data entered is valid and consistent with other data entered previously. This includes providing lists of consistent values based on previous entries from which the user may choose a valid entry, and in the case where there is only one valid entry, automatically entering the data. The system can also call subforms and pass information downward from a parent form or upward from a subform, again with the assurance of only valid entries. The system further allows the calling of software functions defined in an application program and the validation of entries returned. While some of the examples used in the following description of an exemplary embodiment of the invention are related to a system for selecting electric motors to meet a customers specifications, such examples are for illustrative purposes only and the invention is applicable to a wide variety of data gathering interfaces for digital computers.

Figure 1:
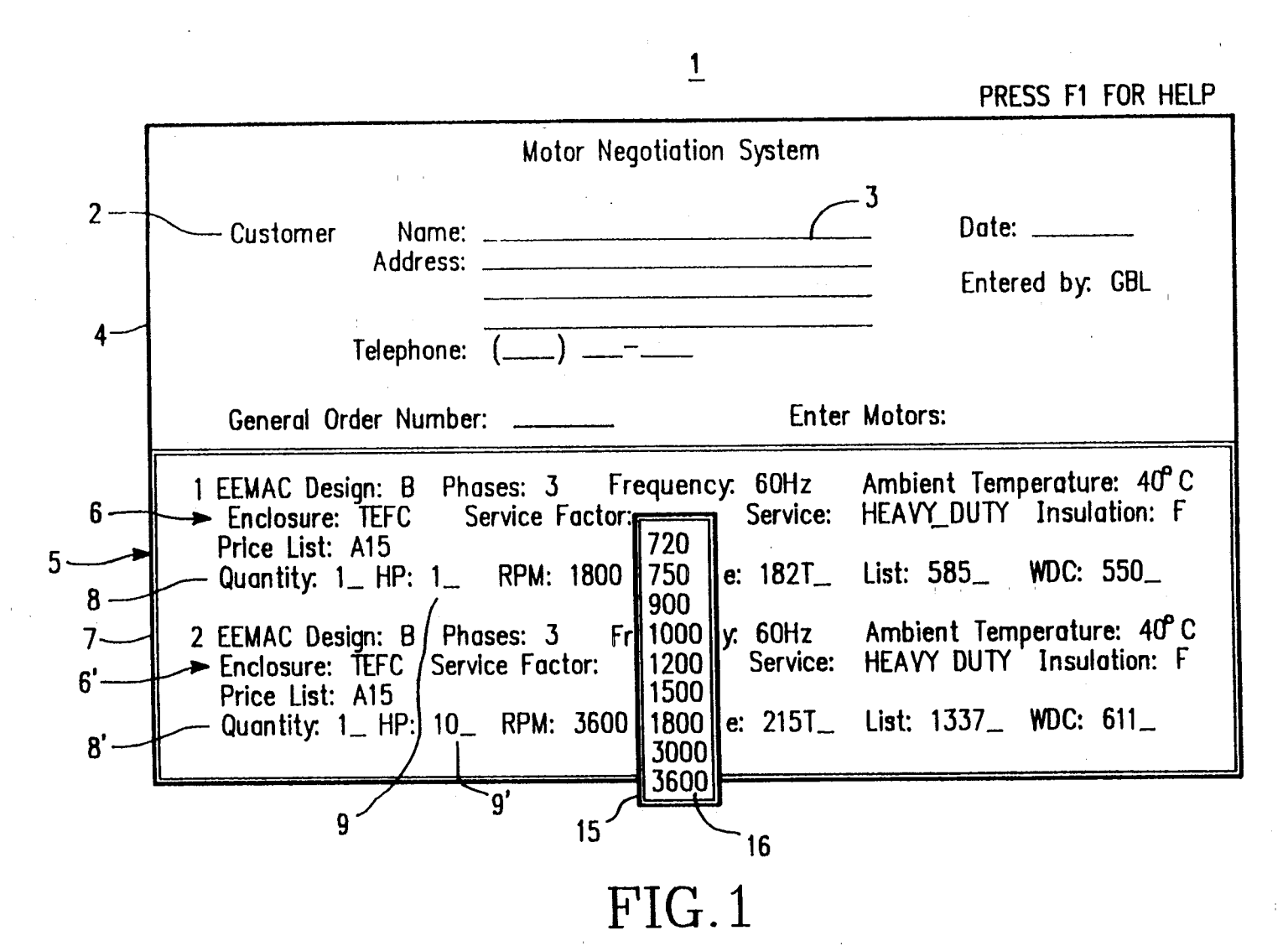

FIG. 1 illustrates an exemplary form 1 which can be generated by the present invention. The form 1 includes background text 2 which conveys information to the user, and a number of fields 3 in which the user enters information, all presented within a window 4 which may be bounded by a border.

The form 1 shown in FIG. 1 is a hybrid form which includes an embedded form 5. The embedded form 5 includes additional background text and fields. In the example shown, the embedded form 5 is an array form containing a set of fields 6 which is replicated at 6'. The set of fields 6 may be reproduced as many times as necessary to enter sets of data requiring the same types of information. In the example shown, only two set of fields 6 and 6' are visible at any given time in the embedded form; however, additional sets of fields can be scrolled in the window 7 of the embedded form. This arrangement allows for the entry of repetitive type information while maintaining the general information of the form 1 in view. The sets of fields 6 and 6' include the same background text 8 and 8' and the same or different data may be entered in corresponding fields 9 and 9' in the replications of the set of fields.

A calling form such as the form 10 in FIG. 2 may call a subform 11 which in turn may call an additional subform 12, thus creating a hierarchy of forms. As shown in FIG. 2, the top form 10 may call additional subforms, such as subform 13 which is identical to the subform 12 called by subform 11. Another hierarchy of forms can be created by the subform 13 calling a subform 14, and so forth. The subforms can be used for various purposes. For example, they might provide additional detailed information about a field on a calling form or may be used to calculate a value for a field on the parent form. In some instances, the same field may appear on a form and one or more of its subforms. For example, in FIG. 2, the field A on parent form 10 also appears on forms 11, 12 and 13. Each subform is called by a field on the calling form.

When a form calls a subform, data may be entered on the subform and then the system returns to the calling form. If the subform called calls for a further subform, as in FIG. 2 where subform 11 calls for subform 12, the system returns to subform 11 after subform 12 has been processed and then returns to the parent form 10. The forms pass information between each other when going from parent to subform and from subform to parent. Thus in the case of going from form 10 to subform 11 in FIG. 2, the values of fields A and C in form 10 are passed to form 11 and used to override previous values of those fields on form 11. If, in processing form 11, the values of A or C are changed, the new values of these fields can, if specified by the developer, be passed upward when the system returns to form 10. Similarly, any changes in field A in subform 12 can be passed up through subform 11 to subform 10.

The fields can be either global or local. Thus, for example, if the field A is global and its value is changed on form 12, the value of the field A would be changed on all forms 10 through 13 having the field A. On the other hand, if the field is local, it only affects other fields with the same name are not affected. A hybrid form may be constructed by grouping together several forms in a heirarchical structure like in FIG. 2. In such a case, form 10 is a root form and forms 10-14 are embedded forms within form 10. Form 14 is embedded in form 13 which in turn is embedded in form 10, and form 12 is embedded in form 11 which in turn is embedded in form 10. Forms 10-14 embody the hybrid form. Each of forms 10-14 has its own window to display its own set of fields. Unlike the form heirarchy discussed above, all fields on the hybrid form are active at the same time. Embedded forms do not have to be called from the root form 10 by the user because they are an integral part of the root form 10 and therefore are automatically displayed when the root form 10 is called by the used. In the context of hybrid forms, the concept of scope may be discussed. Scope refers to which fields in a hybrid form may affect one another. By default, any field in a hybrid form may affect or be dependent upon another. However, when scope is restricted in a hybrid form, only fields within the same scope may affect one another. By within the same scope, it is meant that two fields are in a direct path between each other in the heirarchy. For instance, if the field H is local and drives field A, and its value is changed in subform 12, this would cause a change to the value of the field A in forms 11 and 10, but would not affect the value of the field A in form 13.

Forms may be global or local as well as fields. Thus, it will be noticed from FIG. 2 that the forms identified as 12 and 13 are different instantiations of the same form. This form is called as a subform by form 10 directly, and is also called by subform 11. If this subform is designated as global, then values entered in any one instantiation of the form such as at 13 in FIG. 2, will appear in all other instantiations of the form, such as at 12. On the other hand, if the subform is not a global subform, then changes made to fields on the form will only appear on the instantiations of the form in which the field is directly changed.

As mentioned previously, the system is unique in that the consistency of data is assured as entries are made. One means by which this is implemented is through dynamic constraint of the inputs in certain fields based upon values previously entered in certain other fields. Menus are used for this purpose. Field values listed on the menu which may be selected by the user are variable depending upon data previously entered in driving fields. Thus, returning to FIG. 1, when the user selects a menu driven field, a window 15 is presented on the screen next to the current field. This window contains the menu 16 listing current, valid values for that field. In the example, discrete values between 720 and 3600 RPM for a motor 1 are presented adjacent the rpm field. These valid rpm selections are a function of previous data entered for the motor. As can be seen, 1800 rpm has been selected from the menu for the RPM field of set of fields form 6 and 3600 has been selected for the corresponding field in the set of fields.

In some instances, there will be only one valid menu item for the current field at any time although this current valid value can vary dependent upon entries made in certain other fields. Since there is only one valid selection for such a field, the system can automatically enter the one valid value without action by the user. Thus, these fields are referred to as automatic menu fields.

It should be evident that making automatic entries of data could result in changing of other field values which are dependent upon the field value which was automatically changed. And in fact, it is possible that the propagation of a change made in one field could result in the changing of the value of the field in which the original entry was made. Thus, for instance, referring to FIG. 2, a change entered in the value of field A in FIG. 10 could result in an automatic change in the value of field B, which in turn could automatically change the value of field C which could change the value of field A. The system propagates automatic changes until all affected fields have been changed. A stable state will be reached as long as consistent relationships have been established in the rulebase to be discussed below which determines the relationships between fields.

In making automatic changes, the system enters the value directed by the automatic change, and then checks for fields which the changed field affects. Each of those fields must then be checked to see if they change. If they are changed, then the fields which they affect must also be checked. All such affected fields are iteratively checked until no more changes are observed.

In addition to automatic menus, field values may be automatically set based upon dependencies established between a current field and fields for which data was previously entered. In addition, values of certain fields may be automatically established by an application specific software function which is called based upon changes in the values of certain other fields.

The system does not automatically make entries from a menu listing multiple choices for the user. However, to assure that consistent data is being entered, the system operating in a validation mode incrementally checks all data entered to make sure that it is consistent with other entries made. Thus, after a field has been automatically changed, a validation check is made to determine whether a selection previously made for a menu field is on the menu for that field as the menu may have been affected by changes in the values on other fields. The system is provided with a "highlight violation" mode, in which any such inconsistencies are brought to the attention of the user, so that a change in the value of that field can be made to bring it into conformity with the revised menu listing.

Another unique feature of the invention is that the links between subforms and fields from which they are called can be made variable dependent upon the values of designated fields. This feature not only has application to calling subforms for data entry, but can also be applied to hypertext help forms. Thus, unlike a prior art hypertext help, where the links between text that could be called up was fixed, with the present invention these links can be made context sensitive. That is, the subforms of hypertext that can be called vary depending upon previous selections made by the user. This includes not only previous selections made within the hypertext help structure, but also selections made on the data entry forms. Again, these changes can be made without programming as will be explained below.

Figure 3:
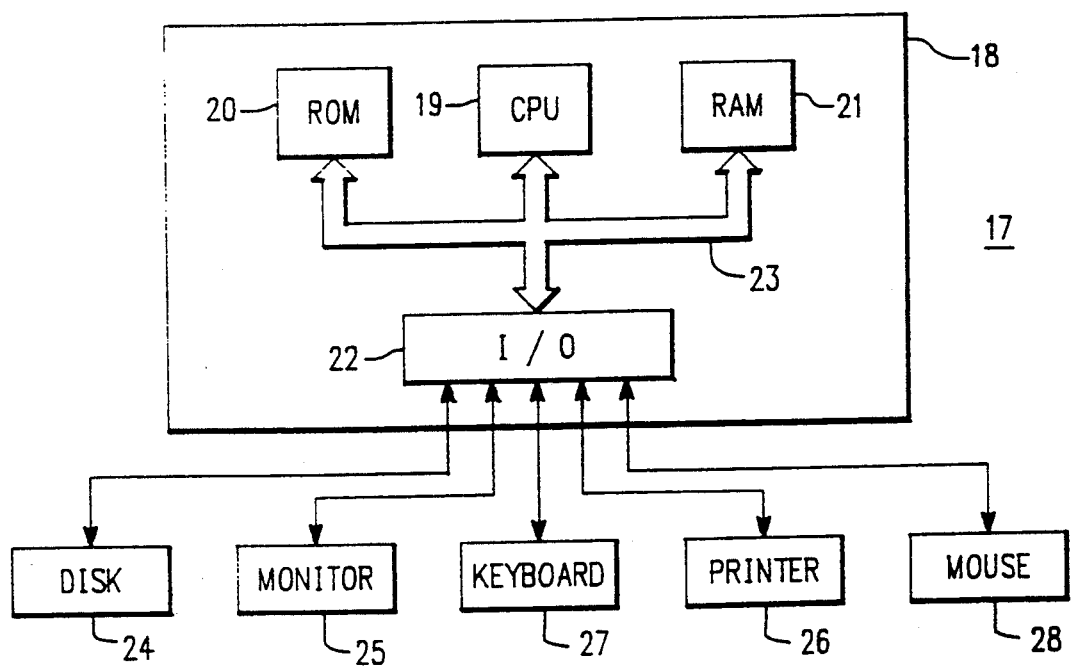
FIG. 3 is a schematic diagram of a digital computer installation on which the exemplary embodiment of the invention is implemented.

The system is implemented in a computer system such as the system 17 illustrated in FIG. 3. The system 17 includes a digital computer 18 having a central processing unit 19, a read only memory (ROM) 20, a random access memory (RAM) 21, and an input/output device 22 all connected by a bus system 23. The ROM 20 stores the programs used by the central processing unit 19, and the RAM 21 is a memory for data used and generated by the CPU 19.

The computer system 17 also includes a secondary storage device such as a disk 24. A monitor 25 generates a digital display of the forms generated by the computer and serves as an output for the system. Additional, optional output devices may include a printer 26. Input devices may include a keyboard 27 and mouse 28.

While the present invention is not computer dependent, its unique structure and organization result in a compact system which can be run efficiently on a personal computer.

The present invention utilizes expert system technology by incorporating a rulebase for managing the complex interrelationships required by the system. A suitable rulebase, particularly adapted for implementation on a personal computer, is described in the above identified related United States patent application. This related application is hereby incorporated by reference in this application. This system for implementing an expert system organizes the rulebase in tables. One or more columns in the tables represent inputs and others represent outputs. Each of the rows in the rulebase tables represent a separate rule. This tabular format permits the rulebases to be generated without the use of a knowledge engineer and without programming. It also presents the rulebase in easily understood form and allows the developer to readily see the interrelationship between the rules and assure that all valid combinations of inputs and outputs for the rulebase are included. The rulebase may include various types of data including all types of operators. A knowledge compiler translates the tables into a number of files. This translation includes encoding all non-numerical entries into integers. The files include an input file containing all the input columns for each rule for each table, and output file containing all the output columns for each rule in all the tables, and a number of indexing files. The input file and the output file are stored separately on the disk 24. The indexing files provide rapid access to entries in the input and output files.

A knowledge processor fires the rules by successively comparing the input values with a set of input states provided by an application program. When the inputs for a particular row match the input state, the output values for the matching row are retrieved. Processing of the rules is very rapid because comparisons are made only between integers and only the input columns need to be retrieved for making the comparison. Furthermore, the input file and output file remain on disk. Only the block of data containing the current rule to be matched is copied into memory. Similarly, only the block of data containing the outputs for the matching row are retrieved from disk. This permits even large expert systems with rulebases in excess of a thousand rules, to be processed using a personal computer.

An example of the type of table which is used to generate a rulebase for the data entry system of the invention is shown in Table 1.

TABLE 1

| HEADING<br>I/O<br>TYPE | DESCRIPTION | range<br>INPUT<br>RANGE | ... | number<br>INPUT<br>NUM | member<br>OUTPUT<br>ALPHA | ... | comment<br>OUTPUT<br>ALPHA |
|---|---|---|---|---|---|---|---|
| | SAMPLE TABLE COMMENT | | | | | | |
| R | SAMPLE TABLE | [1,6] | | 2 | yes | | 1.. |
| — | SAMPLE TABLE | | | | | | 5 |
| R | SAMPLE TABLE | (2,7) | | 7 | no | | 3..6 |
| R | SAMPLE TABLE | [3,8] | | 8 | yes | | 3..8 |

Such a table is conveniently created and maintained using a spreadsheet package but is simply a text file and may also be generated using an ordinary text editor. There is a strict format that must be followed when creating such a table.

The first row of the table starts with the HEADING Description string which starts in the first, column and is the indicator to the knowledge compiler of the system described in the related application that a new table has been encountered in the table file. The remainder of the line consists of a series of column header attribute names which are specified by the developer and must be distinct. The column headers may be used in one of two ways. A header may be an input attribute whose value is specified in the rows of the table underneath the column header. Otherwise, the header may be an output attribute. Values beneath output attributes in a table may be accessed when a match occurs. This occurs when the input attributes on the corresponding table row and the actual values of the input attributes for the particular application match.

The second row of the table specifies whether each attribute is used as an input or an output. The row begins in the first column of the table with the string I/O and is followed by an INPUT or OUTPUT keyword for each attribute in the line above.

The third row specifies the type of the attribute values that will occur in the table column. The row begins in the first column of the table with the string TYPE and is followed by type specifiers for each attribute in the table. If the data is alphanumeric in nature, the type specifier should be ALPHA. If the data is in the form of integers, the type specifiers should be NUM. NUM type data may use the $>$, $<$, $>=$, $<=$, and $<>$ operators to the left of the integer to specify inequalities. If the data is in the form of a range of integers, the RANGE type specifier should be used. The standard mathematical notation of square brackets for inclusive range delimiters and parenthesis for exclusive range delimiters is used as in [,], [,), (,], and (,). so [1,3] would denote the set of integers {1,2,3} and [1,3) would denote the set of integers {1,2}. RANGE type attributes may also have any valid NUM type values so that the RANGE attribute type is a super set of the NUM attribute type. Output columns may always be of type ALPHA since output column data is treated as a character string by the knowledge compiler regardless of its nature.

After the third row, one of three types of lines may comprise the table in any order. Actual data recognized by the knowledge compiler should be placed on rule lines. Data on a rule line must be preceded by an R. If data in an input or output column cannot fit in one row, the data may be extended underneath its column in multiple rows following the rule line using a rule extension line. Rule extension lines are preceded by a —. There may also be comment lines which are ignored but may be useful for human readability. Lines are considered to be comments if neither an R nor— appear before the table description. Multiple tables may be stored in the same file.

Tables must be created for the form that will define the user interface being created. Form tables are processed by knowledge compiler. In addition to the knowledge compiler format constraints, there are also format constraints imposed to make a valid form table.

the row, column, length, and width of the window on the physical screen that will display the form in the event that no overriding values for these parameters have been passed by the calling form. This row also specifies several other default parameters that pertain to the entire form as opposed to any one field on the form. Since these parameters are all default values, the window parameters row is optional in a form table if the parameters are already defined by the calling form.

The remaining rows in a form table correspond to fields on the form. It follows that the values occurring in a row under specific columns refer to properties of the corresponding field. A field is simply a set of contiguous character spaces reserved on a form which may assume values specified by the user within constraints mandated by the fields attributes. There may be as many fields on a form as desired.

A form table will always have a mandatory input attribute column denoted by the reserved word order. This numerical attribute shall always be given a value of zero in the default window parameters row of the table. In all other rows of the table, order dictates the order in which the form will be traversed by the user when in the text mode (as opposed to the mouse mode). The field in which the screen cursor will initially reside in entering the form has an order equal to 1. All remaining fields on the form have distinct and sequential integer values.

The order column is the only input column in the form table. All the remaining columns are for output attributes.

The field name alpha/numeric column is the first output column in Table 2. The type alpha/numeric column specifies the field type. Each legal field type has a reserved word associated with it that appears in this column. In addition to alpha/numeric (alpha), and numerical (num) fields, an additional type of field is the menu type field. A menu field has a pop-up menu associated with it. Other types of fields include an automatic menu field which is similar to a menu field except that there is only one consistent value for the field and this value is automatically updated by the system. Another type of field is the automatic function field (a_func) which provides the developer with a versatile way of making a field on a form an arbitrary function of other field values. The developer writes his own software function. Additional types of fields, not shown in the exemplary table 2 include call fields. A call field is a

TABLE 2

| HEADING I/O TYPE | Description | order IN- PUT NUM | name OUT- PUT ALPHA | type OUT- PUT ALPHA | row OUT- PUT NUM | column OUT- PUT NUM | length OUT- PUT NUM | menu OUT- PUT ALPHA | Indir OUT- PUT ALPHA | func OUT- PUT ALPHA | text OUT- PUT ALPHA |
|---|---|---|---|---|---|---|---|---|---|---|---|
| R | TOP FORM | 0 | | | | | | | | | bb |
| R | TOM FORM | 1 | aic_rat | num | 0 | 22 | 3 | | | | |
| R | TOP FORM | 2 | bus_amps | num | 2 | 10 | 3 | | | | |
| R | TOP FORM | 3 | service | menu | 4 | 9 | 9 | SV | SVI | | |
| R | TOP FORM | 4 | mcon_cur | menu | 7 | 0 | 4 | MR | | | |
| R | TOP FORM | 5 | mpoles | a_menu | 7 | 10 | 1 | SM | | | |
| R | TOP FORM | 6 | mbkr_fr | menu | 7 | 18 | 5 | MBF | SD | | |
| R | TOP FORM | 7 | mqty | numeric | 7 | 30 | 3 | | | | |
| R | TOP FORM | 8 | mmods | alphanumeric | 7 | 43 | 3 | | | | |
| R | TOP FORM | 9 | bcon_cur | menu | 10 | 0 | 4 | BR | | | |
| R | TOP FORM | 10 | bpoles | menu | 10 | 10 | 1 | SB | | | |
| R | TOP FORM | 11 | bbkr_fr | menu | 10 | 18 | 5 | BBF | AD | | |
| R | TOP FORM | 12 | bqty | num | 10 | 30 | 3 | | | | |
| R | TOP FORM | 13 | bmods | alphanumeric | 10 | 43 | 3 | | | | |
| R | TOP FORM | 14 | func_test | a_func | 12 | 0 | 10 | | | | last |

Each row in a form table corresponds to a field on the form being defined except the default window parameters row. The default window parameters row specifies field which can call a subform and/or an arbitrary software function. Embedded forms are also indicated under the type attribute. Other types of fields not necessary for an understanding of the invention can be identified under type.

The form table also includes row and column information indicating the location of the field on the form, the length of the field and the default values for the field (the latter not shown in FIG. 2). If a field is a menu type or automenu type, a menu attribute identifies the menu table for that field. An indirection (indir) attribute specifies the name of an indirection table for menu or call fields. Indirection tables provide the developer with the ability to call up subforms associated with the current field. The indirection table enables the subform that is called up to be different at various times in the data entry process. The subform that is called depends upon current field values in the interface.

Additional attributes for form fields not shown in Table 2 include a func attribute used to locate a developer defined software function written by the developer and linked in with the interface. A global form attribute (gform) is used to specify the name of a global form table which a field references. A depend attribute is used to specify the dependency table associated with the current field. The dependency table is associated with the field to allow values on the current form to change automatically when the current field's value changes.

A field that calls subforms via an indirection table may be designated automatic by assigning the field any value under an auto column (not shown in Table 2) in its form table. Subforms called from the field with this attribute will be automatically filled in (i.e., fields will be set to their initial values) by the interface whenever the calling form is saved by the user.

A modify attribute modif (not illustrated in Table 2) is used to indicate that a field on a calling form will be modified to reflect any changes made to a field with an identical name on a subform. The change will automatically occur when control of the program returns to the calling form from the subform. The subform need not be attached to the field that changes. Any information entered on forms attached to fields with the modif designation will be lost on leaving the subform.

A protect attribute (prot) (not shown in Table 2) is used to indicate that a field is protected. When any value is specified for a field under this column, the user will be unable to modify this field directly. In fact, the cursor cannot be moved to a protected field in text mode. This attribute can be used, for instance, to protect a field that is automatically set such as a automatic menu field.

It is possible to pass parameters to the developer defined functions. This is accomplished by listing the parameters, separated by a delimiter, under an fparms attribute column (not shown in Table 2) in the form table for the field associated with the function. The parameters will be passed as an array of strings to the function.

A help (not shown in Table 2) attribute is used to specify the name of, or the indirection table referencing, the initial hypertext help form (potentially a member of a network of hypertext forms) to be called to the physical screen for a specific field.

Additional column headers are window parameter attributes. They may be assigned values in the default window parameter row of the form table if they refer to default values for the form currently being defined. They may also be assigned values in the field specific rows of the form table for fields that call other forms. In this context, they are used to specify window parameters that will override any default parameters that may be defined in the form that is called. This allows the user to call the same form table from various locations and assign the form different window parameters for different instantiations.

These window parameter attributes includes a text attribute which is used to specify the file name of the text file containing the background text for a form.

A header (not shown in Table 2) attribute is used to specify the file name of a text file containing the background text for the top of an array form. The header attribute is only used with array forms, but is not mandatory.

An alen attribute (not shown in Table 2) is used to indicate the type and length of an array form. A value for the attribute indicates that the developer intends that a form be used as an array. Any value in this column of a form table preceded by a 0 indicates a non-fixed length array form. Consequently, the user may insert elements into or delete elements from the array at will. A value greater than zero for the attribute indicates that the form will be used as a fixed length array.

Additional attributes may be used in the form table; however, the above attributes are sufficient for an understanding of the invention.

Tables must be created for the pop-up menus that will specify the valid menu items consistent with other current field values on a form. This provides the interface with the highly desirable feature of limiting the user to only those menu selections that are consistent with other values entered on the form up to this point. It follows that the user may encounter different menu contents at the same field at different times depending on other related field values on the form.

In addition to the knowledge compiler format constraints, there are also format constraints imposed to make a valid menu table. Menu tables may have multiple input columns and multiple output columns. Each row in a menu table specifies the items that will comprise the pop-up menu contents in the output columns given current field values that match the attribute values in the input columns. Both input and output column headers are field names (i.e. names specified under the name column of form tables).

The input attributes correspond to those fields on the current form or other forms on which the output fields depend. Each field of type menu or a_menu is associated with one menu table. However, one menu table may be associated with multiple form fields. For menu tables, this is accomplished by requiring the developer to specify the contents of a menu under a column headed by the name of the field with which the menu is to be used or by the reserved name [menu] which can be used with any field. If the [menu] column header is not used, there must be one output column in the table for each distinct field.

The menu contents are specified in the output columns by listing the menu items separated by the delimiter defined for that file. An example of a menu table is as follows:

TABLE 3

| HEADING I/O TYPE | Description | mcon_cur INPUT RANGE | service INPUT ALPHA | mbkr_fr OUTPUT ALPHA |
|---|---|---|---|---|
| | MAIN BR FRAME | | | |
| R | MAIN BR FRAME | [15,40] | 208Y/120 | FD FDB HFD FDC |
| R | MAIN BR FRAME | 45 | 208Y/120 | FD FDB HFD |
| R | MAIN BR FRAME | 50 | 208Y/120 | FD FDB |
| R | MAIN BR FRAME | [60,100] | 208Y/120 | FD |
| R | MAIN BR FRAME | [110,150] | 208Y/120 | FD FDB HFD FDC |
| R | MAIN BR FRAME | [15,40] | 240 | FD FDB HFD |
| R | MAIN BR FRAME | 45 | 240 | FD FDB HFD FDC |
| R | MAIN BR FRAME | 50 | 240 | FD FDB |
| R | MAIN BR FRAME | [60,100] | 240 | FD FDB HFD FDC |
| R | MAIN BR FRAME | [110,150] | 240 | FD |
| R | MAIN BR FRAME | [15,40] | 240D/120 | FD |
| R | MAIN BR FRAME | 45 | 240D/120 | FD FDB HFD FDC |
| R | MAIN BR FRAME | 50 | 240D/120 | FD FDB HFD FDC |
| R | MAIN BR FRAME | [60,100] | 240D/120 | FD FDB HFD FDC |
| R | MAIN BR FRAME | [110,150] | 240D/120 | FD FDB |
| R | MAIN BR FRAME | [15,40] | 208Y/120 | FD FDB HFD FDC |
| R | MAIN BR FRAME | 45 | 208Y/120 | FD FDB HFD |
| R | MAIN BR FRAME | 50 | 208Y/120 | FD FDB HFD |
| R | MAIN BR FRAME | [60,100] | 208Y/120 | FD FDB HFD FDC |
| R | MAIN BR FRAME | [110,150] | 208Y/120 | FD |
| R | MAIN BR FRAME | [15,40] | 240 | FD FDB |
| R | MAIN BR FRAME | 45 | 240 | FD FDB HFD |
| R | MAIN BR FRAME | 50 | 240 | FD FDB HFD FDC |
| R | MAIN BR FRAME | [60,100] | 240 | FD FDB HFD FDC |
| R | MAIN BR FRAME | [110,150] | 240 | FD |
| R | MAIN BR FRAME | [15,40] | 240D/120 | FD |

As can be seen from this illustrative menu table for selecting a main circuit breaker frame, if the maximum continuous current is 45 amps with a 240 volt service, then a menu from which the user can select either an FD, FDB, HFD, or FDC frame is generated. However, if a maximum continuous current of 50 amperes has been previously selected for 240 volt service, only the FD and FDB frames will be presented to the user as valid choices. In some instances, such as where the maximum continuous current is from 110 to 150 amps for 240 volt service only one choice, FD, is presented to the user.

The automatic menu tables are similar to table 3 except that there is only one choice for the output for each combination of inputs and the appropriate output is automatically inserted in the field by the system whenever one of the inputs is modified.

Indirection tables are created to map current field values to the subform that can be called from a field. Indirection tables are processed by the knowledge compiler. In addition to the knowledge compiler format constraints imposed to make a valid indirection table, there are also constraints imposed to make a valid indirection table. Indirection tables are used exclusively with menu and call type fields that have subforms associated with them.

Indirection tables are attached to fields by indicating the name of the table under the indir held columns in the form table (Table 2). Indirection tables will always have one output column with the reserved header name [form]. The names for all of the form tables that can be connected to this field will be placed under this output column. The input columns will be headed by the field names on which the field-subform connection is dependent. If the same subform is always associated with a field, there may be no input columns and only one row in the table containing the form table name under the [form] column. Table 4 which follows is an example of an indirection table.

TABLE 4

| HEADING I/O TYPE | Description | bus_amps INPUT NUM | [form] OUTPUT ALPHA |
|---|---|---|---|
| | SUBF DEPEND INDIRECTION TABLE | | |
| R | SUBF DEPEND | 50 | SF |
| R | SUBF DEPEND | 100 | TF |

Table 4 is a simple indirection table with only one input attribute. There can of course be multiple input columns where the subform to be selected is dependent upon the value of more than one field.

Dependency tables are created to enable changes in the value of one field to automatically cause a change in the values of other fields. Dependency tables are processed by the knowledge compiler. The format of a dependency table is identical to the format of a menu table with all input and output columns headed with field names.

Dependency tables are connected to fields by indicating the name of the table under the depend column in the form table. Dependency tables always have a set of output columns headed by the names of those fields to be modified whenever a field that serves as an input to the table changes. The output fields are modified according to the current values of fields specified in the input columns of the table.

At first glance, the feature provided by the dependency tables seems similar in effect to having automatic menu fields within a form. However, unlike automatic menu fields, the field interdependencies are not derived automatically from existing menu tables but must be specified explicitly by the developer. Also, dependency tables may be used to modify any fields (other than form fields) that do not have subforms associated with them. They may therefore be used in cases where automatic fields would be inappropriate or impossible to implement.

An example of a dependency is as follows:

TABLE 5

| HEADING I/O TYPE | Description | aic_rat INPUT NUM | bus_amps OUTPUT ALPHA | service OUTPUT ALPHA |
|---|---|---|---|---|
| | AIC RATING DEPENDENCY TABLE | | | |
| R | AIC RAT DEP | 5 | 50 | 208Y/120(5) |
| R | AIC RAT DEP | 10 | 100 | 240(10) |
| R | AIC RAT DEP | 15 | 150 | 240D/120(15) |
| R | AIC RAT DEP | 20 | 100 | 240(RO) |
| R | AIC RAT DEP | 25 | 150 | 240D/120(25) |
| R | AIC RAT DEP | 30 | 100 | 240(30) |
| R | AIC RAT DEP | 35 | 150 | 240D/120(35) |
| R | AIC RAT DEP | 40 | 100 | 240(40) |
| R | AIC RAT DEP | 45 | 150 | 240D/120(45) |
| R | AIC RAT DEP | 50 | 100 | 240(50) |
| R | AIC RAT DEP | 55 | 150 | 240D/120(55) |
| R | AIC RAT DEP | 60 | 100 | 240(60) |
| R | AIC RAT DEP | 65 | 150 | 240D/120(65) |
| R | AIC RAT DEP | 70 | 100 | 240(70) |
| R | AIC RAT DEP | 75 | 150 | 240D/120(75) |
| R | AIC RAT DEP | 80 | 100 | 240(80) |
| R | AIC RAT DEP | 85 | 150 | 240D/120(85) |
| R | AIC RAT DEP | 90 | 100 | 240(90) |
| R | AIC RAT DEP | 95 | 150 | 240D/120(95) |
| R | AIC RAT DEP | 100 | 100 | 240D(100) |

As mentioned, hypertext help forms can be called to provide the user with context sensitive help information. Each hypertext form has a form table such as the following:

TABLE 6

Hypertext Form Table

| HEADING I/O TYPE | Description | order INPUT NUM | name OUTPUT ALPHA | type OUTPUT ALPHA | row OUTPUT NUM | column OUTPUT NUM | length OUTPUT NUM | indir OUTPUT ALPHA | default OUTPUT ALPHA |
|---|---|---|---|---|---|---|---|---|---|
| R | GH1 | 0 | | | | | | | |
| R | GH1 | 1 | cmds | call | 13 | 34 | 8 | GH2 | Commands |
| R | GH1 | 2 | ftyp | call | 17 | 30 | 11 | GH8 | Field Types |
| R | GH1 | 3 | mind | call | 20 | 7 | 10 | GH9 | Indicators |

Fields in a hypertext form are always of type call. Because call type fields are highlighted when moved to by the user and cannot be modified, they serve as the highlighted key words in help text from which additional text may be called. The first hypertext form is called from a data form either directly or through an indirection table. As shown by Table 6, the hypertext form table for the first hypertext form GH1 lists the fields in the form from which additional hypertext forms can be called. The directions for finding subforms to be called are listed in the indir output column. If the same subform is always to be called from a given field, the reference in the indir column is to the form table for the called form. If the called subform is to be dependent on values entered for other fields, the reference in the indir column is to an indirection table which would contain as rows various combinations of values for the inputs which are to determine the subform to be called which would be listed in an output column. In this way, a network of hypertext forms with variable links may be attached to any data field in an interface.

Figure 4:
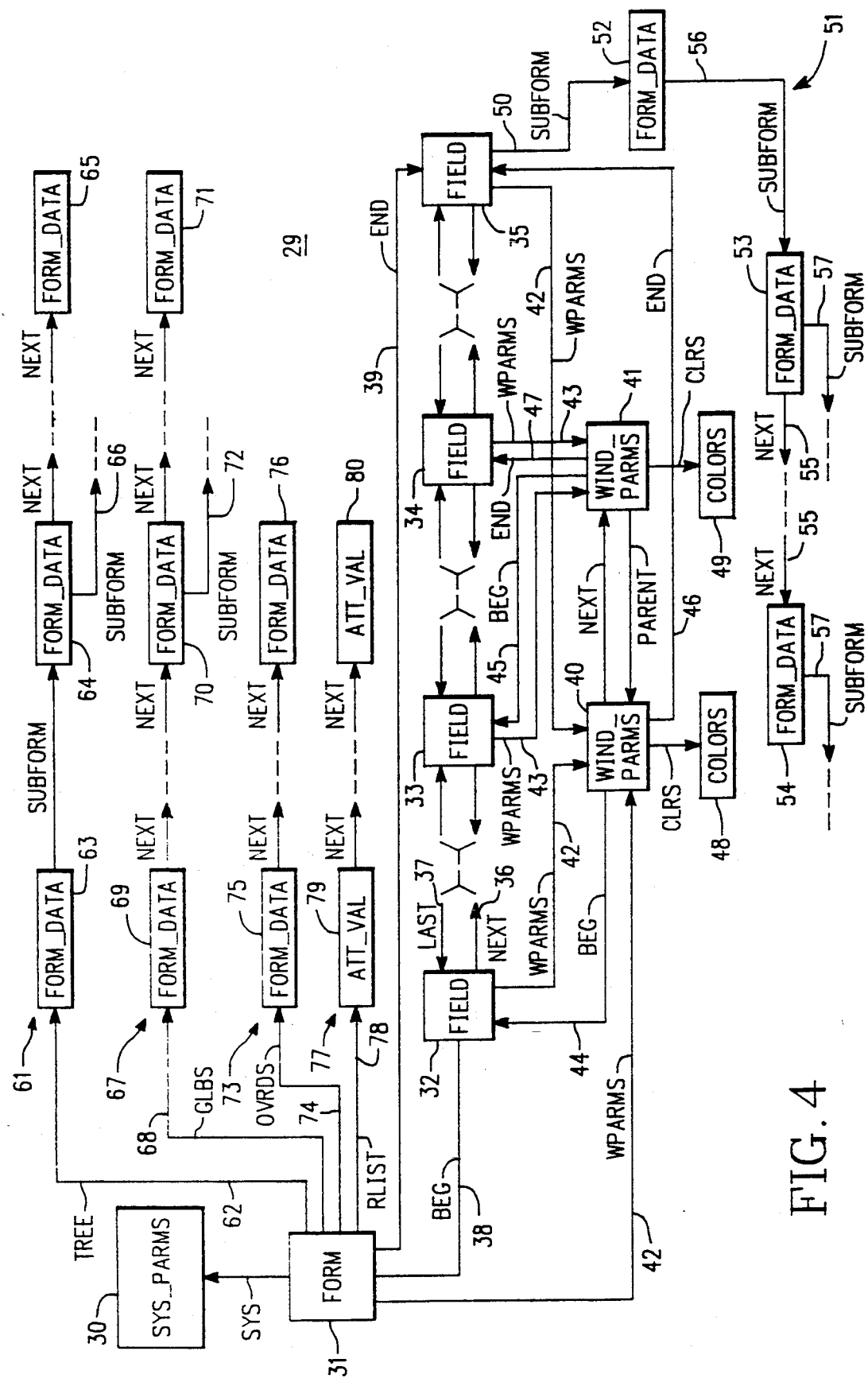
FIG. 4 is a diagram of a data structure used to implement the electronic form data entry system of the invention on the digital computer installation of FIG. 3.

As discussed previously, the above tables are translated by a knowledge compiler into compact integer tables in binary form which are stored in secondary storage. When a form is called, the form table is used to construct a data structure in computer memory. In the exemplary system, a C language structure such as shown in FIG. 4 is constructed in computer memory (RAM). This data structure 29 comprises a number of data cells linked by pointers. A systems parameter cell 30 contains parameters common to the hierarchy to which the form belongs. This cell stores the current execution mode whether interactive, validate, automatic, or hypertext. It also stores the name of the next hypertext form to be called if the user asks for help. It also stores a restricted scope indicator for hybrid forms. The systems parameter cell also stores a mouse mode indicator indicating whether the mouse is active and a highlight violations indicator indicating whether highlight violations option has been selected. System parameter cell 30 further includes an override precedence indicator. As will be seen, there are three lists by which the value of a field on a form can be set by values from another form: a global list, a tree list and an override list. The override precedent establishes which value will prevail if a field is on more than one list. Also the system parameter cell 30 stores an audit type selection which is used in leaving a form to determine whether all forms, in the heirarchy should be validated, only the top form, or none of the forms in which case a form could be exited with inconsistent data in the fields.

The form cell 31 is essentially a header structure for the form. The form cell and the remaining elements of the form structure are all specific to the current form. The current form cell 31 stores the number of levels deep in the current heirarchy that the current form is. For instance, the level is zero for the top form, one for the first subform, two for the second, etc. The form cell 31 also includes a stop parameter which indicates that the user has entered a command to leave the current form and a save parameter which indicates that the user wants to save the form upon leaving. The form cell 31 also records the context in which an externally defined software function is to be called. The contexts can be "entering a field", "leaving a field", "remote automatic filling out of a field", "returning from hypertext", or "called from a call field." Finally, the form cell 31 includes references to the rest of the data in the structure represented by the arrows found in FIG. 4 which, in the C language implementation, are pointers.

A field cell, such as the cells 32 through 35 in FIG. 4, is provided for each field on the form. The information in these field cells is initially obtained upon establishing the structure from the form table. The information stored in the field cells includes: the name of the cell, the type of field, the position of the field on the form, the current value of the field, the default value, the previous state of the field (only for menu type), the names of the menu, indirection, dependency and hypertext help tables associated with the field, if an audit of the field is mandatory, an autoindicator specifying whether subforms are to be filled out automatically without user intervention, whether the field is protected so that its value cannot be changed, an array index if the field is part of an array form, the location in memory of a developer created function associated with the field, if any, a modify on return indicator which is set if the user wants subform values returned from a field of the same name to be used as a current value of the field, and a highlight violations indicator to indicate if the field is in violation.

The field cells 32–35 are arranged in the order in which they appear in the form table. They are linked by pointers 36 and 37 which point to the next field and last field, respectively. The form cell 31 includes a "beg" pointer 38 identifying the location of the first, or beginning, field 32 in memory, and an "end" pointer 39 locating the last field 35 in memory.

Next, the data structure includes a windows parameter cell 40 for each window of the form. These cells store the information defining the parameters of each window in which the form is displayed. It includes the name of the form table defining the fields displayed, the name of the form background text file, the position and dimensions of the window, and the type of form, whether conventional or hybrid. The structure shown in FIG. 4 is for a hybrid form which displays sets of fields defined in separate form tables and displayed in separate windows. The window parameter cell 40 is for the overall or base form of a hybrid form. For a conventional form, that is a form without embedded forms, there would only be the one windows parameters cell 40 in the cell structure 29.

Since FIG. 4 illustrates a hybrid form, a second windows parameter cell 41 is included for the window in which an embedded form appears. In addition to the information discussed in connection with the window parameter cell 40, the window parameter cell 41 for the embedded form might also include the name of the header (background) text file for arrays, and the current number of elements in the array. The window parameter cells also include a level indicator indicating the number of levels down in the hybrid form of the form associated with the window. Thus, the cell 40 is for the top form and would have a value of zero, while the cell 41 for the embedded form would have a value of one. Each of the fields 32–35 has a "wparms" pointer pointing to the window parameter cell for the form on which the field appears. In the example, the fields 32 and 35 appear on the parent form and thus have pointers 42 pointing to the cell 40. The form cell 31 also has a pointer "wparms" pointer pointing to the cell 40. On the other hand, the fields 33 and 34 are on the embedded form and have pointers 43 pointing to the window parameter cell 41. There are also "beg" pointers 44 and 45 indicating to the window parameter cells 40 and 41, respectively the location of the first field cell of the associated form table. Likewise, there are "end" pointers 46 and 47 indicating the location of the last field in the form table. The window parameter cells 40 and 41 also have associated with them "colors" cells 48 and 49, respectively, which store the colors to be used in displaying the various elements of the window on the display screen.

For fields, such as in the example for field 35, which have a previously saved subform called from that field there is a "subform" pointer 50 pointing to a tree 51. Each tree 51 includes a root form_data cell 52 which stores the name of the form table for the subform. The trees 51 also include a series of cells, 53 and 54 in the example, linked by "next" pointers 55 for each field in the subforms. The first cell 53 is located by a "subform" pointer 56 in the root cell 52. The subform root cells 53 and 54 include the name and value of the field in the subform, an index if the field is part of an array, and an indication of whether the field is part of an embedded subform. Any of the fields 53 and 54 in the subform tree 51 may themselves reference additional subforms as indicated by the pointers 57.

The data structure shown in FIG. 4 also includes several lists. The first list is a current form tree 61 which is accessed by a "tree" pointer 62 in the form cell 31. The current form tree 61 is similar to the tree 51 for subforms. It includes a root cell 63 and a cell 64 and 65 for each field 32–35 in the current form. This current form tree 61 contains previously saved values for the current form stored on a previous invocation of the form. It is used in restoring previously generated data upon returning to a form. Any subform tree such as the tree 51 is attached to the calling field in tree 61 by a "subform" pointer 66 which is similar to the "subform" pointer 50. If upon leaving a form, the form is to be saved, data from the field cells 32–35 is condensed with the subform data appended and stored in cells 64–65 in the tree 61. The information saved is the same as discussed in connection with the cells 53 and 54 in the subform tree 51. This tree 61 can be used on entering a form to override default values. The tree is passed up to the calling routine on leaving the top form.

The second list stored in the form structure 29 is the global list 67 which is referenced by a "glbs" pointer 68 in the form cell 31. The global list 67 is typically created manually by the developer and passed to all forms in the interface form. The global list contains two types of information: global fields, and global forms. It includes a series of cells 69–71. The cell 69 is a root cell for a global form. The field cells for this global form are appended to the list 67 by a "subform" pointer 72. When a form calls a subform, it looks first in the global list. If that form is in the global list, the field values are stored in the global list rather than in a subform tree such as 51.

An overrides list 73 is located by an "ovrds" pointer 74 in the form cell 31. Each time a subform is called, the values of all fields for the current form stored in the field cells 32–35 are stored in separate cells 75–76 and appended to the overrides list 73. The overrides list is then passed to the subform. Thus, the overrides list contains entries for all fields in all forms above the current form in the current hierarchy.

The above three lists, the current form tree list 61, the global list 67 and the overrides list 73 are used to override values on the current form. If a particular field appears on more than one of these lists, the precedence parameter set in the systems parameter cell 30 is used to determine the value used.

The forms structure 29 also includes a modified on return list 77 which is referenced in the form cell 31 by a "list" pointer 78. When a subform is called, all fields identified in their field cells 32–35 as a modify on return field, are added to the modify on return list 77. This list 77 comprises a number cells 79–80 containing the name and current value of the modify on return fields. This list is passed to the subform. Upon returning from a subform, the values or the fields in the list 77 are copied into the appropriate field cells 32–35 and the entry is removed from the list. Thus, if the value of one of the modify on return fields was changed in the subform, this change will be reflected on the higher level forms.

FIGS. 5A through 18 are flow charts of the routines for a suitable computer program for implementing the invention in the hardware illustrated in FIG. 3. The important steps of each of the routines is set forth below with a three digit reference character for each step referring to blocks in the flow charts. Where a routine calls another routine, an identifying letter for the called routine is shown within a circle in the calling routine. An open triangle at the end of a routine indicates that the program returns to the caller of the current routine. A solid triangle indicates a return to the caller of the form main routine.

Figure 5A:
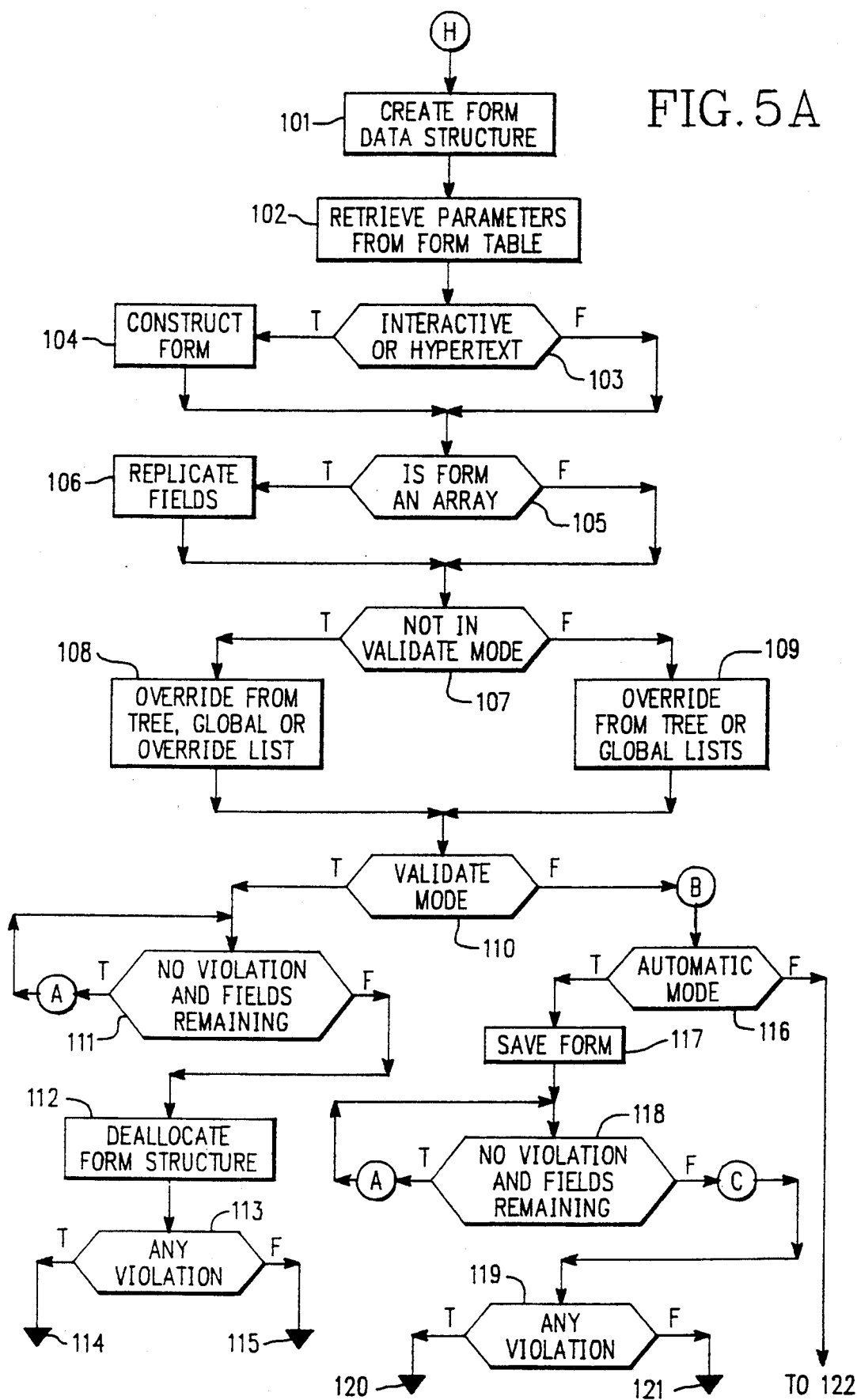
Figure 5B:
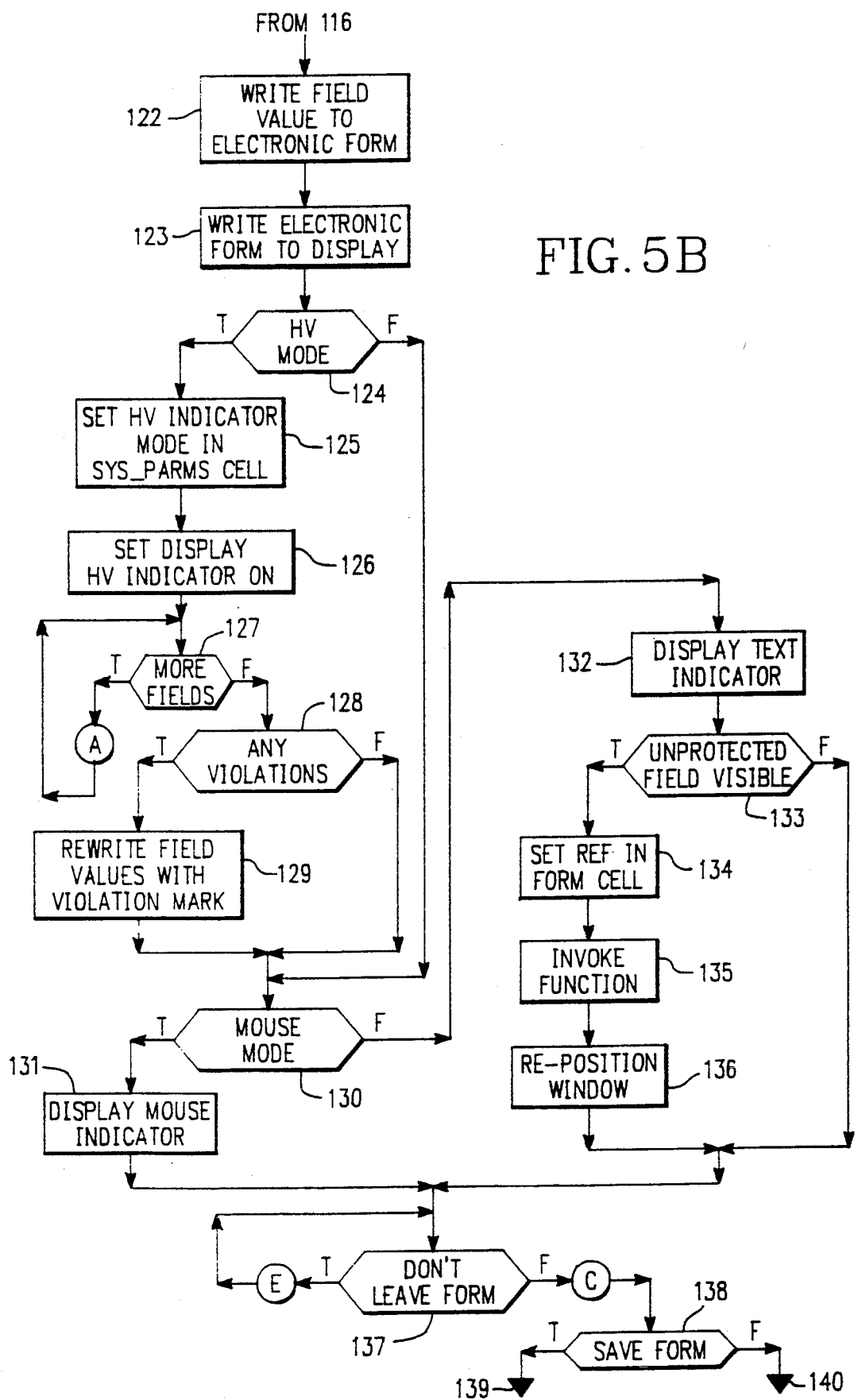

The form main routine which is flow charted in FIGS. 5A and 5B is identified by the letter H when it is a called routine. The form main routine sets up the data structure illustrated in FIG. 4, and calls other routines as needed to process the form.

The form main routine proceeds as follows:

1. Create and initialize the internal form data structure representing the current state of the form by using information supplied by the caller and the system configuration file, 101.
2. Retrieve all window parameters and field information about the form from its form table in the rulebase and store it in the WIND-PARMS and FIELD cells respectively. The WIND-PARMS and FIELD cells and the references between the cells are created as the information is obtained from the form table, 102.
3. If in "interactive" or "hypertext" execution mode 103,d construct the electronic form(s) constituting the current form using the window parameters stored in the WIND-PARMS cell list for the current form 104. These parameters include reference to the form's background text, window and form dimensions, and window border types. One window is associated with each form.
4. If a form is being used as an array 105, replicate the set of fields defined in the FIELD cell list as many times as needed for the array to have its specified initial length and append these replicated lists to the FIELD cell list 106.
5. If not in "validate" execution mode 107, override default field values in the FIELD cell list with those specified in the "form tree", "global list", and "override list" using the list precedence defined in the appropriate SYS-PARMS cell parameter 108.
   Else, override default field values in the FIELD cell list with those specified in the "form tree" and "global list" using the list precedence defined in the appropriate SYS-PARMS cell parameter 109.
6. If in "validate" execution mode 110,
   a. perform the "field validation" routine, A, on each field in the current form including subforms until a violation, if any, is detected, 111.
   b. deallocate the internal form data structure 112.
   c. if a violation was detected 113 in Step 6.a., return to the caller indicating that violations exist, 114.
   Else, return to the caller indicating that no violations exist 115.
   Else, initialize all automatic fields on the form by performing the "update automatic fields" routine, B, with no driving field specified.
7. If in "automatic" execution mode 116,
   a. indicate in the FORM cell that the current form should be saved 117.
   b. perform the "field validation" routine, A, on each field in the current form including subforms until a violation, if any, is detected, 118.
   c. perform the "leaving a form" routine c.
   d. if any violations were detected, 119, in step 7.b., return to the caller indicating that violations exist, 120.
   Else, return to the caller indicating that no violation exist, 121.
8. Write the current form field values from the FIELD cell list to the physical display in the spaces reserved for these values on the electronic form, 122.
9. Write the electronic form to the physical display, 123.
10. If currently in "highlight violations" mode, 124,
    a. indicate in the SYS-PARMS cell that the system is in "highlight violations" mode, 125.
    b. turn the physical display "highlight violations" mode indicator on, 126.
    c. perform the "field validation" routine, A, on each field on the current form checking subforms and marking violations as they are found, 127.
    d. if any violations were found, 128, in step 10.c., rewrite the current field values to the physical display distinguishing those in violation, 129.
11. If in "mouse" data entry mode 130, write the "mouse" mode indicator to the physical display, 131.
    Else,
    a. write the "text" mode indicator to the physical display, 132.
    b. if there is an "unprotected" field currently visible through the form's window, 133,
       1. change the "current field" reference in the FORM cell to this field, 134.
       2. invoke any attached function in the "entering" context without changing the field' value, 135.
       3. if necessary, reposition the window to make the entire field value visible through the window, 136.
12. While the FORM cell does not contain an indication that the user wants to leave the form 137, perform the "interactive execution" routine, E.
13. Perform the "leaving a form" routine, C.
14. If the call in step 12 returned indicating that the form was saved 138, return to the caller indicating that the form was saved, 139.

Figure 6:
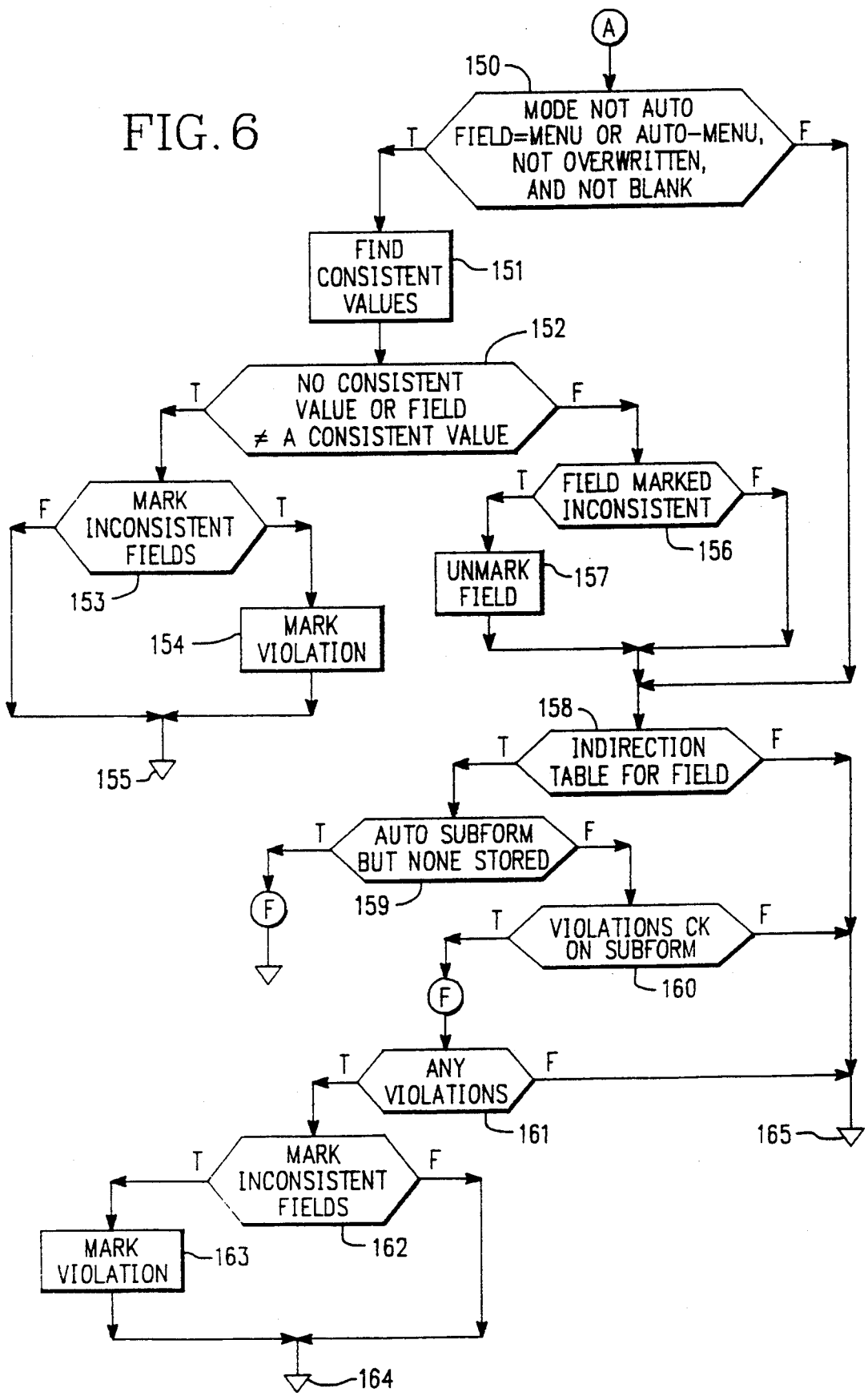

The field validation routine is illustrated in FIG. 6 and identified by the letter A. When called, the field validation routine checks fields for consistent values and reports violations. The procedure for this routine is as follows:

1. If the execution mode is not "automatic", the field is a "menu" or "automatic menu", the field is not overwritten by the user, and the field has a non-blank value, 150.

a. query the field's menu table, stored in the rulebase, for all currently consistent values for this field, 151.
b. if there are no currently consistent values, or the field's current value does not match any of the consistent values, 152,
   1. if inconsistent field values are to be marked 153, mark the field as in violation 154.
   2. return to the caller indicating that the field is in violation, 155.
c. if the field is currently marked as in violation 156, unmark the field 157.
2. If there is an indirection table associated with the field, 158,
   a. if subforms called from the field are to be automatically filled in and there is no subform currently stored with the field 159, perform the "invoke subform" routine F in "automatic" mode. Else, if the violations check is to be carried out on subforms, 160,
      1. perform the "invoke subform" routine F "validate" mode.
      2. if 161 a violation is indicated from the call made in 2.a.1,
         a. if inconsistent field values are to be marked 162, mark the field as in violation, 163.
         b. return to the caller indicating that the field is in violation 164.
3. Return to the caller indicating that the field is not in violation, 165.

Figure 7A:
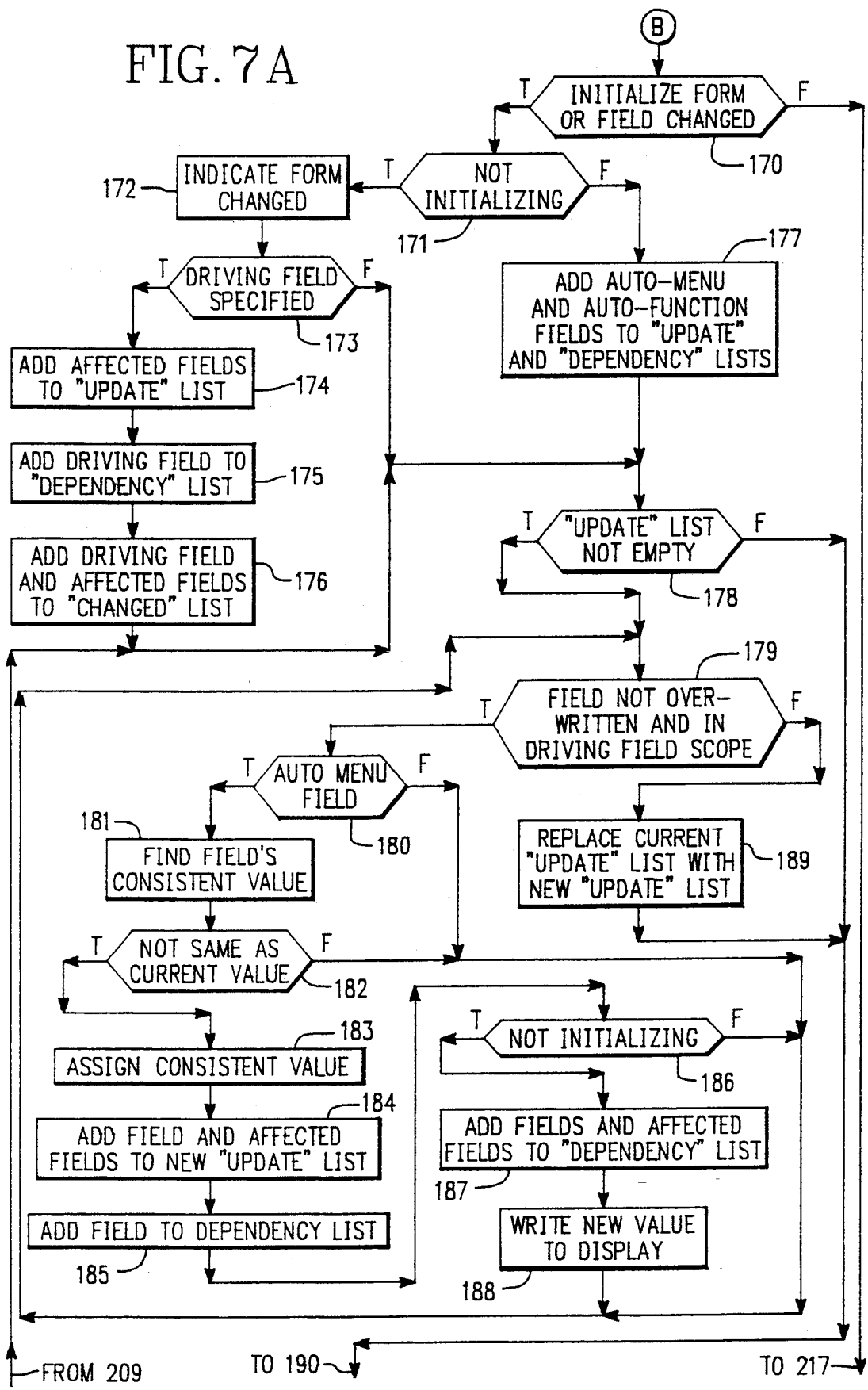
Figure 7B:
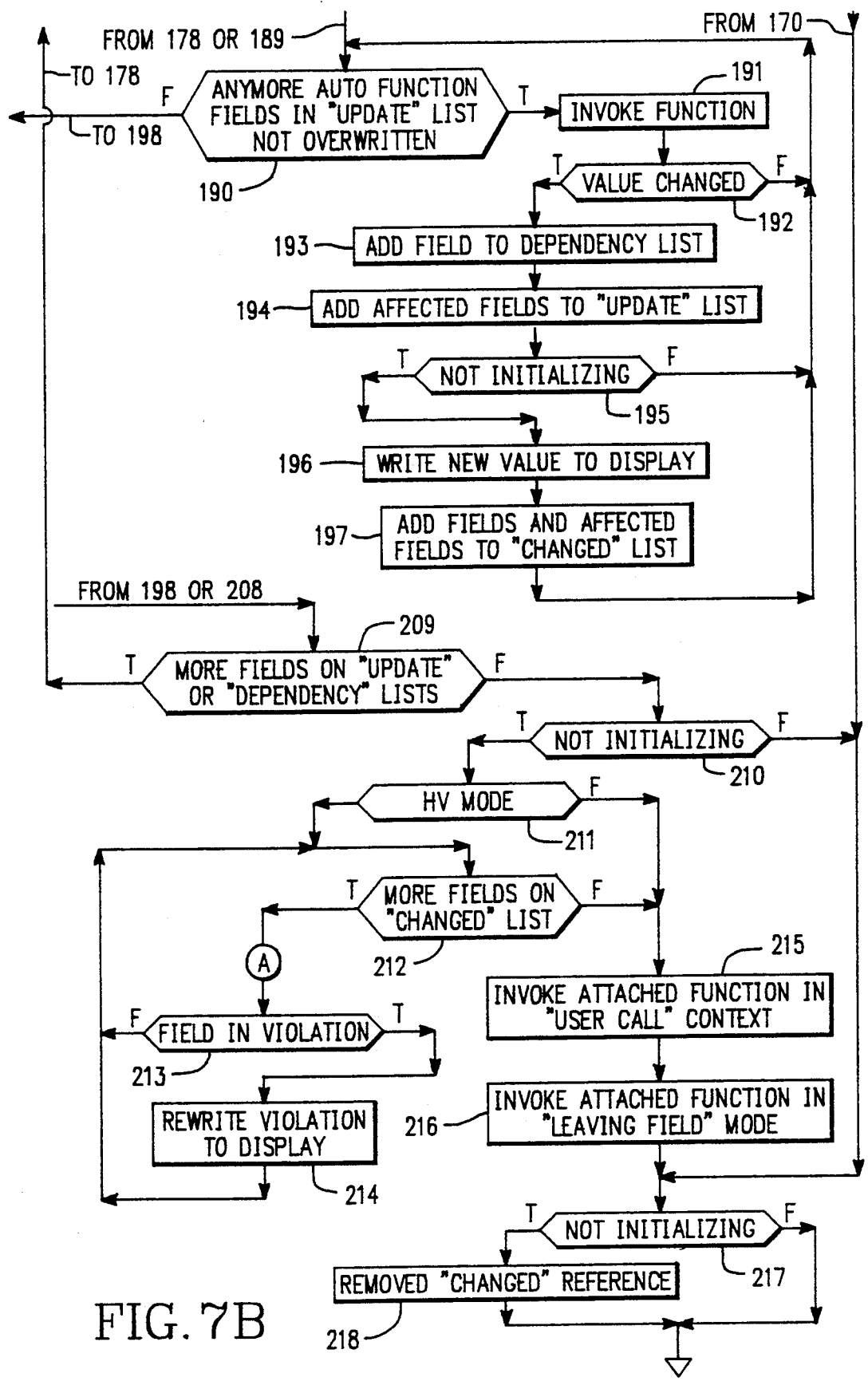
Figure 7C:
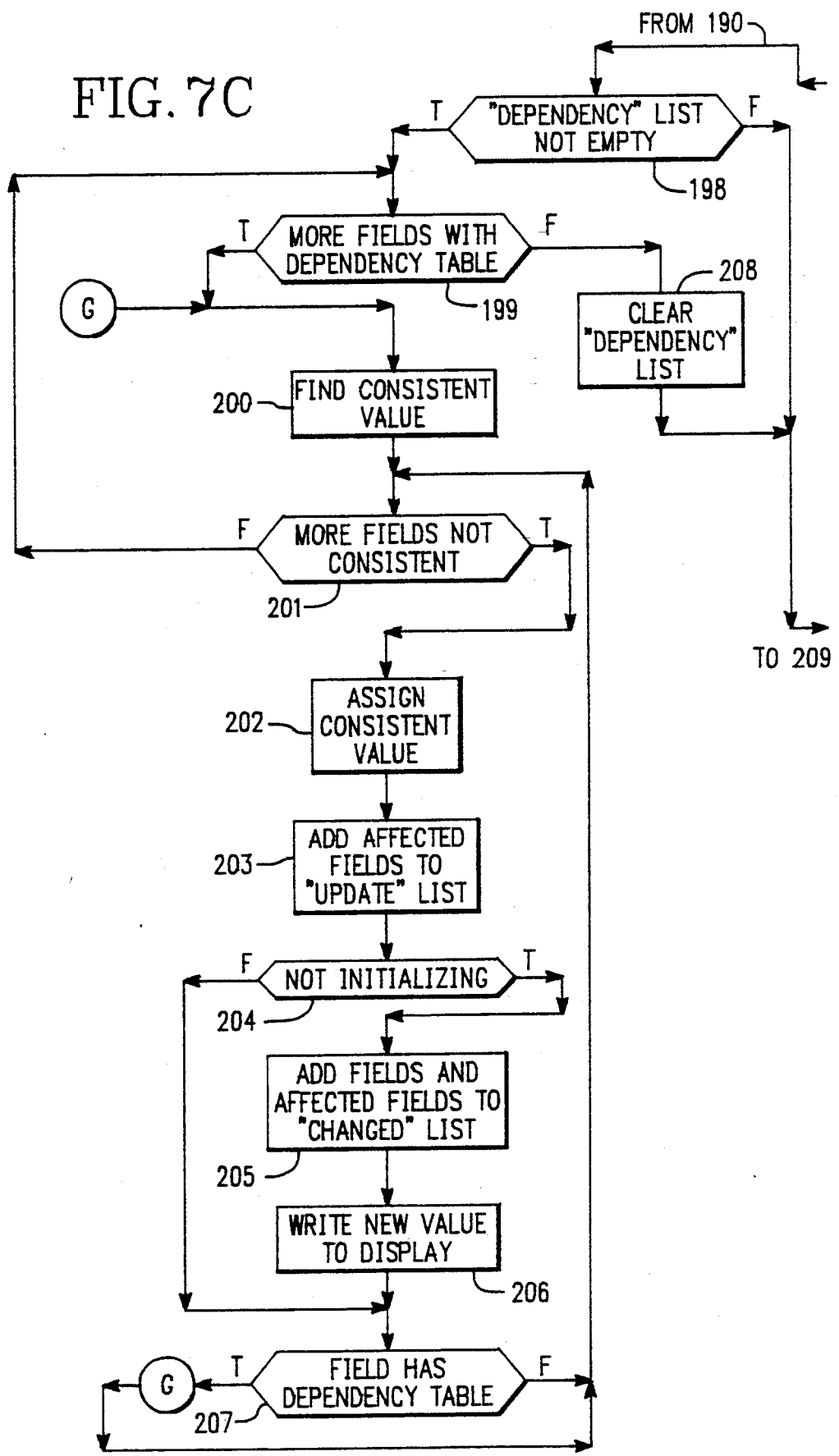

The update automatic fields routine identified by the letter B is illustrated in FIGS. 7A, 7B and 7C. This is an iterative routine which automatically enters values for automatic menu fields and automatic function fields. The letter G which appears in the update automatic fields routine shown in FIG. 7C marks an insertion point indicating that the routine loops back as indicated. The steps of this procedure are as follows:

1. If there is a reference in the FORM cell to a field that has been changed on the current form, or the current form is to be initialized, 170,
   a. If the current form is not to be initialized, 171,
      1. indicate in the FORM cell that the current form has been changed, 172.
      2. if a driving field has been specified by the caller, 173,
         a. add all fields that are directly affected by the driving field via a table relationship to the "update" list, 174.
         b. add the driving field to the "dependency" list, 175.
         c. add the driving field and all fields that are directly affected by the driving field via a table relationship to the "changed" list, 176.
      Else, add all "automatic menu" and "automatic function" fields to the "update" and "dependency" lists, 177.
   b. Perform the following steps once and then continue to repeat the steps until both the "update" and "dependency" lists are empty, 209,
      1. if the "update" list is not empty, 178,
         a. perform the following steps for each field in the "update" list that is not overwritten by the user and is in the same scope as its driving field, 179:
            1. if the field is an "automatic menu", 180,
               a. query the field's menu table, stored in the rulebase, for the field's consistent value, 181.
               b. if the consistent value does not match the field's current value, 182
                  1. assign the consistent value to the field, 183.
                  2. add the field and all fields that are directly affected by the driving field via a table relationship to the new "update" list, 184.
                  3. add the field to the "dependency" list, 185.
                  4. if the form is not being initialized 186.
               a. add the field and all fields that are directly affected by the field via table relationship to the "changed" list, 187.
               b. write the field's new value to the physical display, 188.
            b. replace the current "update" list with the new "update" list derived above, 189.
         2. perform the following steps for each "automatic function" field in the "update" list that is not overwritten by the user, 190:
            a. invoke any attached function in the "remote execution" context changing the field's value if necessary, 191.
            b. if the field's value was changed, 192, in the step 1.b.2.a.,
               1. add the field to the "dependency" list, 193.
               2. add all fields that are directly affected by the field via a table relationship to the "update" list, 194.
               3. if the form is not being initialized, 195.
               a. write the field's new value to the physical display, 196.
               b. add the field and all fields that are directly affected by the field via a table relationship to the "changed" list, 197.
         3. if the "dependency" list is not empty, 198.
            a. perform the following steps for each field in the "dependency" list that has a dependency table associated with it, 199.
               1. query the field's dependency table, stored in the rulebase, for the list of fields and their respective consistent values which will be used to update the current form, 200.
               2. for each of the fields in the list derived in step 1.b.3.a.1. which is in the same scope as the driving field, is not overwritten by the user, and has a current value that does not match the consistent value obtained from the dependency able, perform the following step, 201:
                  a. assign the consistent value to the field's FIELD cell, 202.
                  b. add all fields that are directly affected by the field via a table relationship to the "update" list, 203.
                  c. if the form is not being initialized, 204.
                     1. add the field and all fields that are directly affected by the field via a table relationship to the "changed" list, 205.
                     2. write the field's new value to the physical display, 206.
                  d. if the field has a dependency table associated with it, 207, invoke the "update automatic fields" routine starting with step 1.b.3.a.1 on the field, 200.
            b. remove all fields from the "dependency" list, 208.
         c. if the form is not being initialized 210,
            a. if the system is in "highlight violations" mode 211, perform the following steps on each field in the "changed" list which is in the same scope as its driving field, 212:
               1. invoke the "field validation" routine, A, indicating that subforms should be checked and an illegal field value marked.

2. if the field is in violation, 213, rewrite the current field value to the physical display to distinguish it, 214.
b. invoke any attached function in the "user call" context without changing the field's value, 215.
c. invoke any attached function in the "leaving" context without changing the field's value, 216.

Else, invoke any attached function in the "leaving" context without changing the field's value, 216.

2. If the form is not being initialized, 217, remove the reference in the FORM cell to the field indicating that it has been changed, 218.

Figure 8:
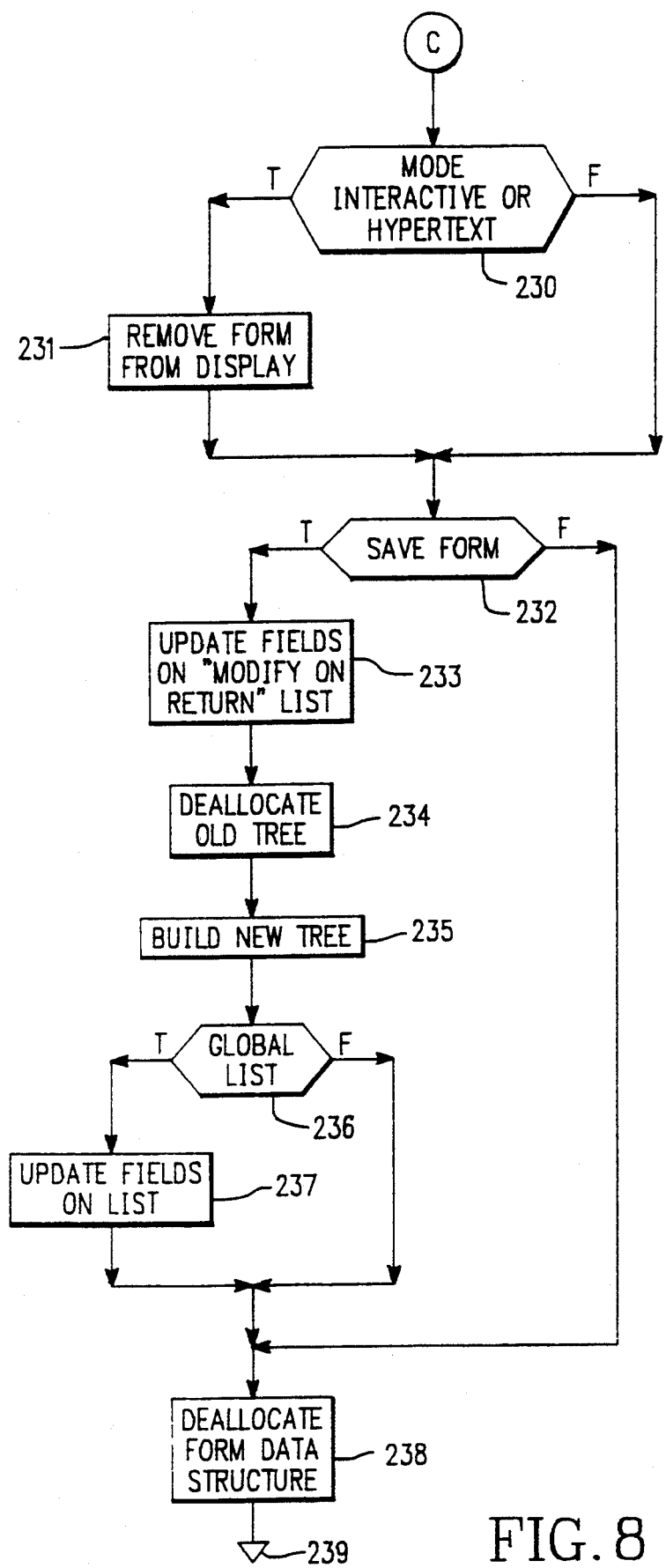

The leaving of form routine, C, is illustrated in FIG. 8. This routine is called when leaving a form for a subform, and proceeds as follows:

1. If the execution mode is "interactive" or "hypertext", 230, remove the electronic form from the physical display, 231.
2. If there is an indication in the FORM cell that the user wishes to save the current form, 232,
   a. update the values of the fields on the "modify on return" list from current field values in the FIELD cell list, 233.
   b. deallocate any tree structure containing a previously stored set of data for the form which was made available to the form main routine on entry, 234.
   c. build a new tree structure reflecting the current set of ROM data derived from the FORM and FIELD cells, 235.
   d. if a global list exists, 236, update the global field values on the list from the FIELD cell list, 237.
3. deallocate the internal form data structure, 238.
4. return to the caller indicting whether or not the form was saved, 239.

Figure 9:
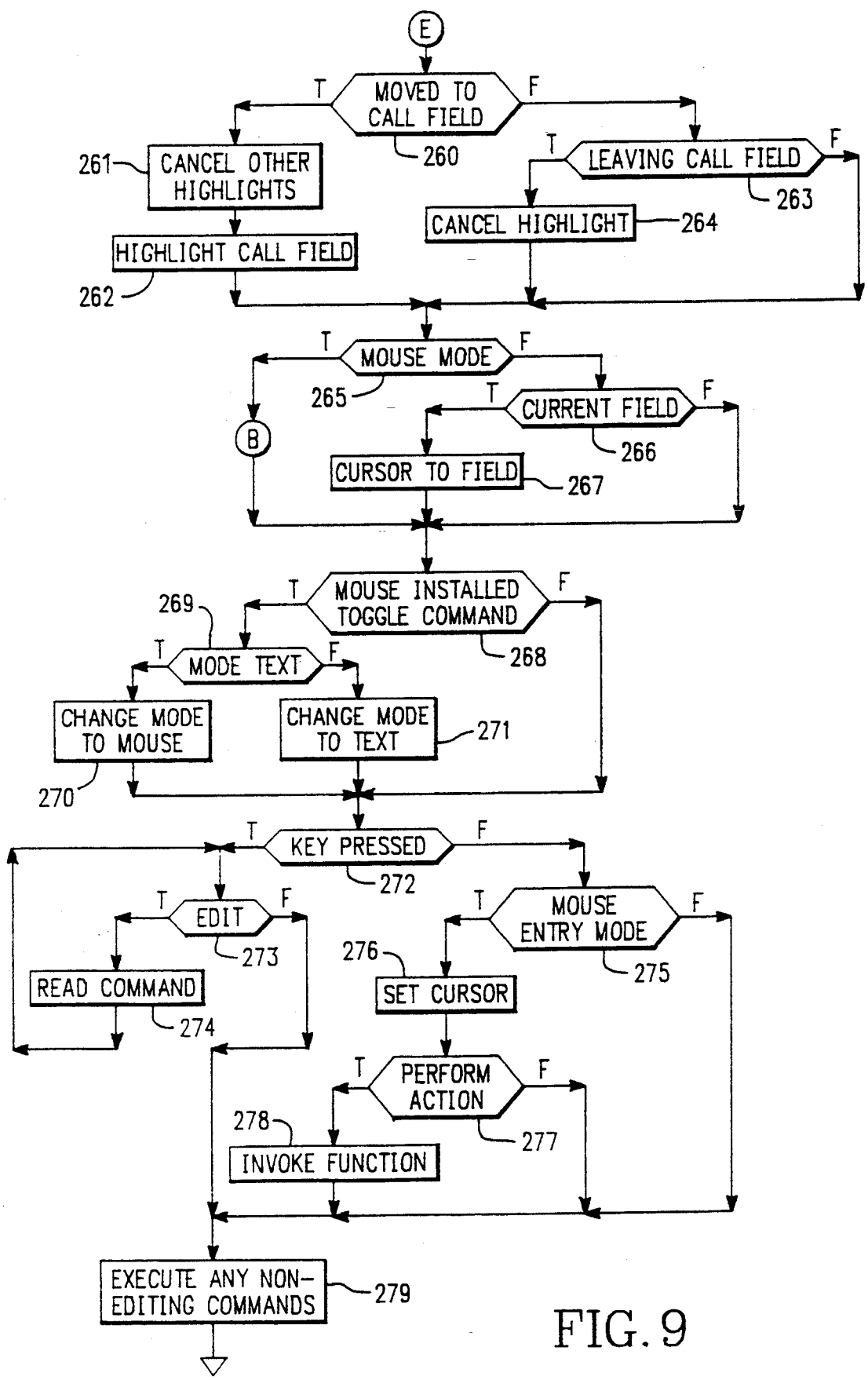

The interactive execution routine, E, through which a user enters commands and data into the system is shown in FIG. 9, and is as follows:

1. If just moved to a "call" field, 260,
   a. unhighlight any other highlighted "call" field value on the current form indicating this in the field's FIELD cell, 261.
   b. highlight the "call" field value on the electronic form indicating this in the FORM cell and the field's FIELD cell 262.

Else, if just left a "call" field, 263.
   a. unhighlight the "call" field value on the electronic form and indicate this in the FORM cell and the field's FIELD cell, 264.
2. if the "mouse" data entry mode, 265, update the form using the "update automatic fields" routine B with the current field specified as the driving field.
3. if not in "mouse" data entry mode and there is a current field 266, place the electronic form cursor at the current field 267.
4. if a mouse is installed and the user is invoking the data entry "toggle" command, 268,
   a. if in "text" data entry mode 269, change the data entry mode to "mouse" mode, 270.

Else, change the data entry mode to "text" mode, 271.
5. if the user is pressing a key on the keyboard, 272,
   a. if the user wants to edit the current field value 273, continue reading field edit commands from the keyboard until the user finishes editing the field 274.

Else, if a mouse is installed and the system is in "mouse" data entry mode, 275,
   a. determine the current mouse coordinates and place the electronic form cursor at these coordinates, 276.
   b. if the user is invoking the "perform action" command and the electronic form cursor rests on a field value space 277, invoke any attached function in the "entering" context without changing the field's value, 278.
6. if the user has entered a non field-editing command, execute the command by performing the appropriate command routine 279. Commands that may only be invoked in specific data entry modes are noted. Flow charts for all of these commands may be found in FIGS. 13–18.

Figure 10A:
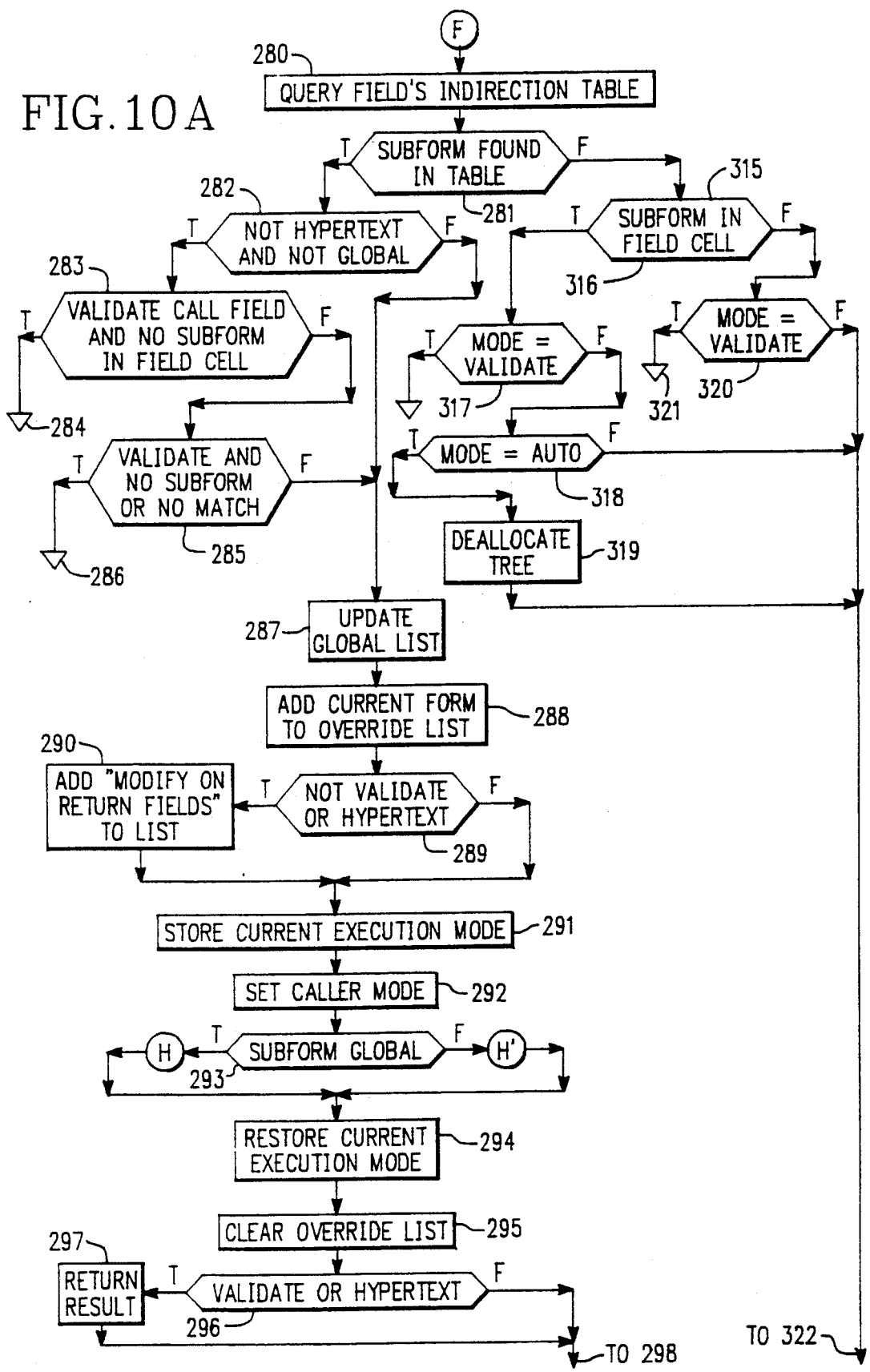
Figure 10B:
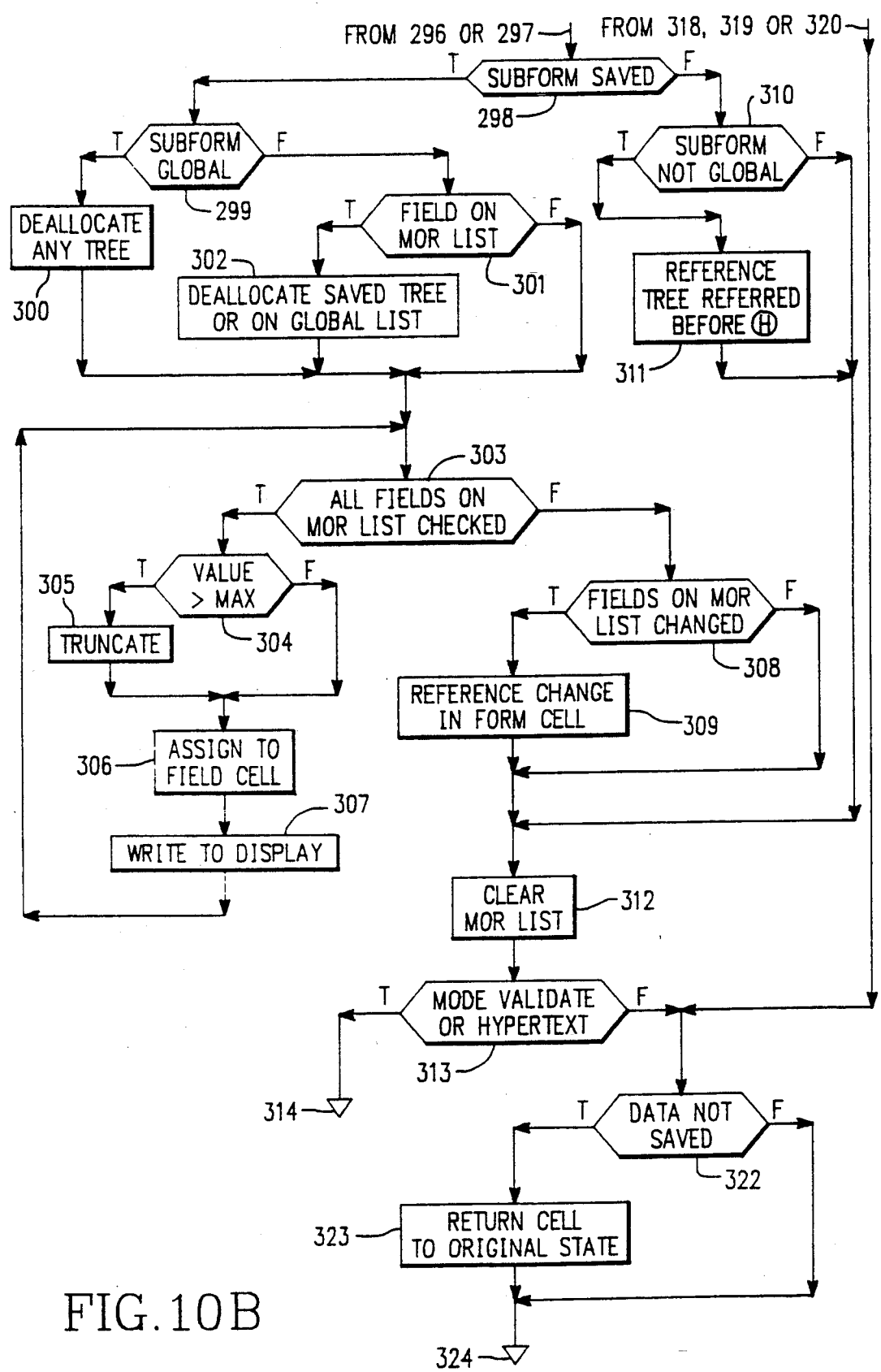

FIGS. 10A and 10B illustrate the invoke subform routine, F, which is called to display subforms on the physical display. The steps of this routine are as follows:

1. query the field's indirection table, stored in the rule-base, for a subform name, 280.
2. if a subform name was found 281 in step 1.
   a. if the mode specified by the caller is not "hypertext", and the subform is not on the global list, 282,
      1. if the mode specified by the caller is "validate", the field type "call", and no subform is currently referenced by the field's FIELD cell 283, return to the caller indicating that the field is valid 284.
      2. if no subform is currently referenced by the field's FIELD cell or the subform name referenced does not match the subform name obtained from the indirection table, and the mode specified by the caller is "validate", 285, return to the caller indicating that the field is not valid, 286.
   c. update the global fields on the global list from the current FIELD cell list 287.
   d. add the current form fields to the override list 288.
   e. if the mode specified by the caller is not "validate" and not "hypertext", 289, add all "modify on return" fields on the current form, to the "modify on return" list.
   f. store the current execution mode 291.
   g. change the execution mode to the mode specified by the caller 292.
   h. if the subform is global 293, invoke the forms main routine H specifying the name of the subform, a reference to the storage location for the global form on the global list, a reference to the global list, a reference the override list, a reference to any overriding window parameters, a reference to the "modify on return" list, the name of the system configuration field, the levels deep that the subform is in the interface, and a reference to the system parameters.

Else, invoke the form main routine H specifying the name of the subform, a reference to the storage location for the form in the field's FIELD cell, a reference to the global list, a reference to the override list, a reference to any overriding window parameters, a reference to the "modify on return" list, the name of the system configuration file, the levels deep that the subform is in the interface, and a reference to the system parameters.
   i. change the execution mode back to the mode stored in step 2.f., 294.
   j. remove all fields added to the override list in step 2.d., 295.
   k. if the mode specified by the caller is "validate" or "hypertext", 296, return to the caller indicating the result of the call to the form main routine in step 2.h., 297.

l. if the subform was saved by the user, 298,
1. if the subform is global, 299, deallocate any tree referenced by the field's FIELD cell 300. Else, if the field is a "modify or return" (MOR) field 301, deallocate the tree just saved by the user either referenced by the field's FIELD cell or in the global list, 302.
2. for each field on the "modify on return" (MOR) list that resides on the current form, is in the same scope as the current field, and has a value differing from the corresponding field's current value, 303,
   a. if the modified value is longer than the field's maximum length 304, truncate the modified value 305.
   b. assign the modified value to the field's FIELD cell 306.
   c. write the field's new value to the physical display, 307.
3. if any "modify on return" fields on the current form were changed in step 2.k.2., 308, make a reference in the FORM cell to the current field indicating that it has been changed, 309.

Else, if the subform is not global 310 make the field's FIELD cell reference the tree, if any, referenced before the form main routine was invoked, 311.

m. remove all "modify on return" fields added to the "modify on return" list in step 2.e., 312.
n. if the mode specified by the caller is "validate" or "hypertext", 313, return to the caller indicating the result of the call to the form main routine in step 2.h., 314.

Else,
a. if the field's FIELD cell references a subform, 315,
   1. if the mode specified by the caller is "validate", 316, return to the caller indicating that the field is in violation, 317.
   2. if the mode specified by the caller is "automatic" or the user does not mind losing the data stored in the referenced tree, 318, deallocate the tree, 319.

Else, if mode specified by the caller is "validate", 320, return to the caller indicating that the field is valid, 321.

3. if data entered by the user was not saved, 322, restore the field's FIELD cell to its state upon entry to the routine, including its value, status and violation indicator, 323.
4. return to the caller indicating whether or not data entered by the user was saved, 324.

Figures 11, 18:
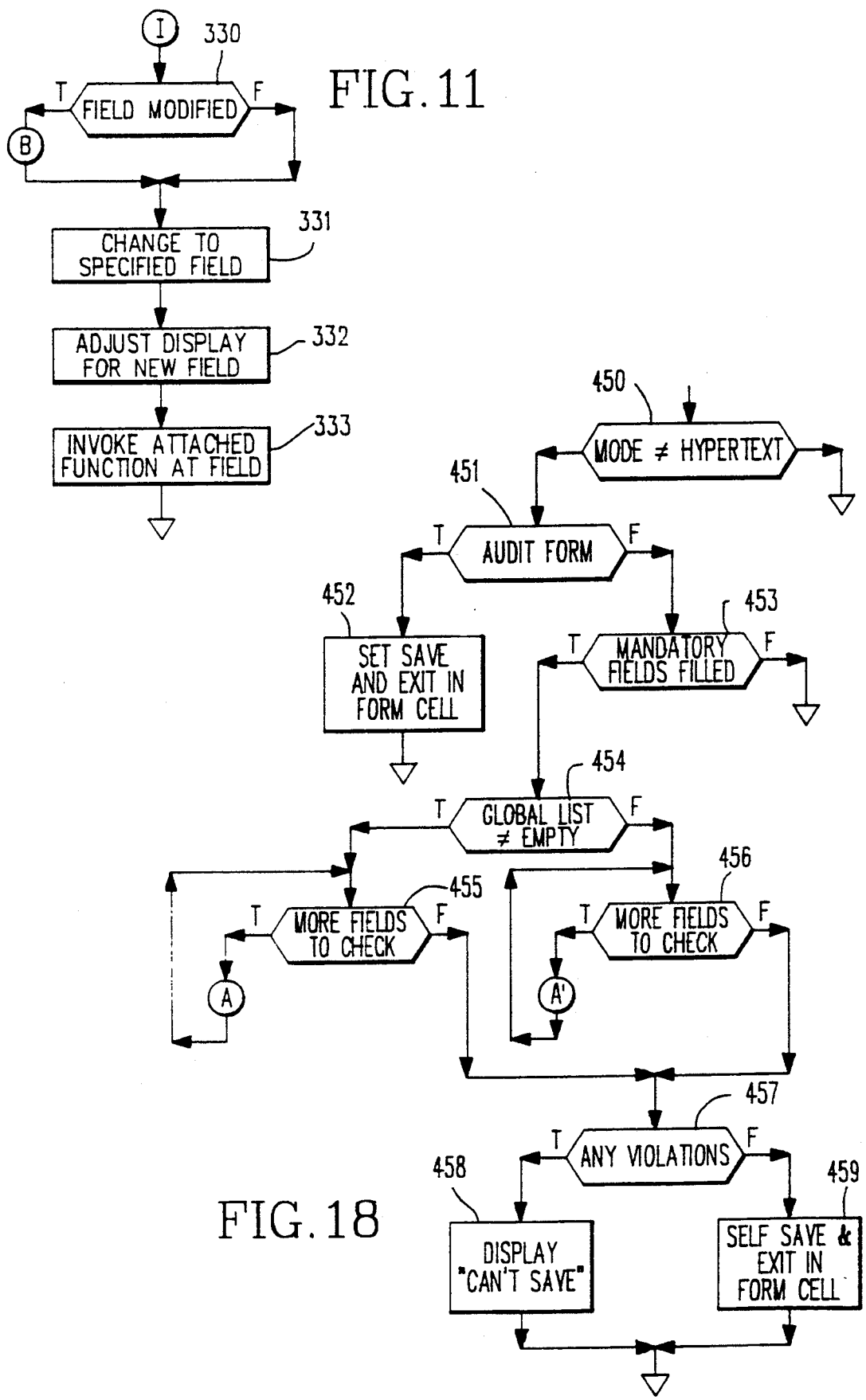

A field transition routine, I, shown in FIG. 11 is invoked to advance between fields on a form. This routine is as follows:
1. If the current field has been modified by the user 330, update the automatic fields on the form using the "update automatic fields" routine B with the current field specified as the driving field.
2. Change the current field to the first/last/next/previous field/element on the form as specified by the user, 331.
3. Reposition the electronic form on the physical display if this is necessary for the user to see the current field, 332.
4. Invoke any attached function in the "entering" context indicting that the field value is not to be changed by the function, 333.

The flow chart for the "pop-up menu" routine is shown in FIG. 12. The routine is used to create and display menus to the user and proceeds as follows:
1. If there is a menu table associated with the field, 340,
   a. if the menu is not to be universal, 341, query the menu table, stored in the rulebase, for all currently consistent values that the field could assume 342.

Else, query the rulebase for all possible values for the field contained in the field's menu table, 343.
   b. if any values were obtained in step 1.a., 344, convert these values into a pop-up menu and place it on the physical display, 345.

Else, return to the caller indicating that there is no menu which can be called to the physical display at this time, 346.
   c. elicit a menu selection from the user, 347.
   d. remove the pop-up menu from the physical display 348.
   e. if the user selected one of the menu options and the option does not match the current field value, 349, make a reference in the form cell to the field indicating that it has been changed, 350.
   f. if the user selected one of the menu options, 351,
      1. set the field's status to "modified" in its FIELD cell 352.
      2. turn off any violation indicator in the field's FIELD cell 353.
      3. assign the menu selection to the field's FIELD cell, 354.
      4. write the field's new value to the physical display, 355.
      5. if the field has an indirection table associated with it, 356,
         a. store the current "highlight violations" (HV) mode status, 357.
         b. perform the "invoke subform" routine F in "interactive" mode.
         c. if "highlight violations" (HV) mode is now "on" and the stored "highlight violations" mode status is "off", 358,
            1. perform the "field validation" routine, A, on each field 359, on the current form including subforms and marking those fields in violation.
            2. if any fields were in violation 361, rewrite all current form, field values on the physical display to distinguish those in violation.

Else, if "highlight violations" mode is now "off" and the stored "highlight violations" mode status is "on", 363.
            1. for each filed on the form, turn off any violation indicator in its FIELD cell, 364.
            2. rewrite all field values for the current form to the physical display to turn off distinguished fields 365.
         d. if the current "highlight violations" mode does not conflict with the stored mode 366, rewrite the field value to the physical display, 367.
      6. perform the "field transition" command I to go to the next field.

Else, return to the caller indicating that the user exited the menu without making a selection 368.

Else, return to the caller indicating that no menu table is associated with the field, 369.

Figure 13:
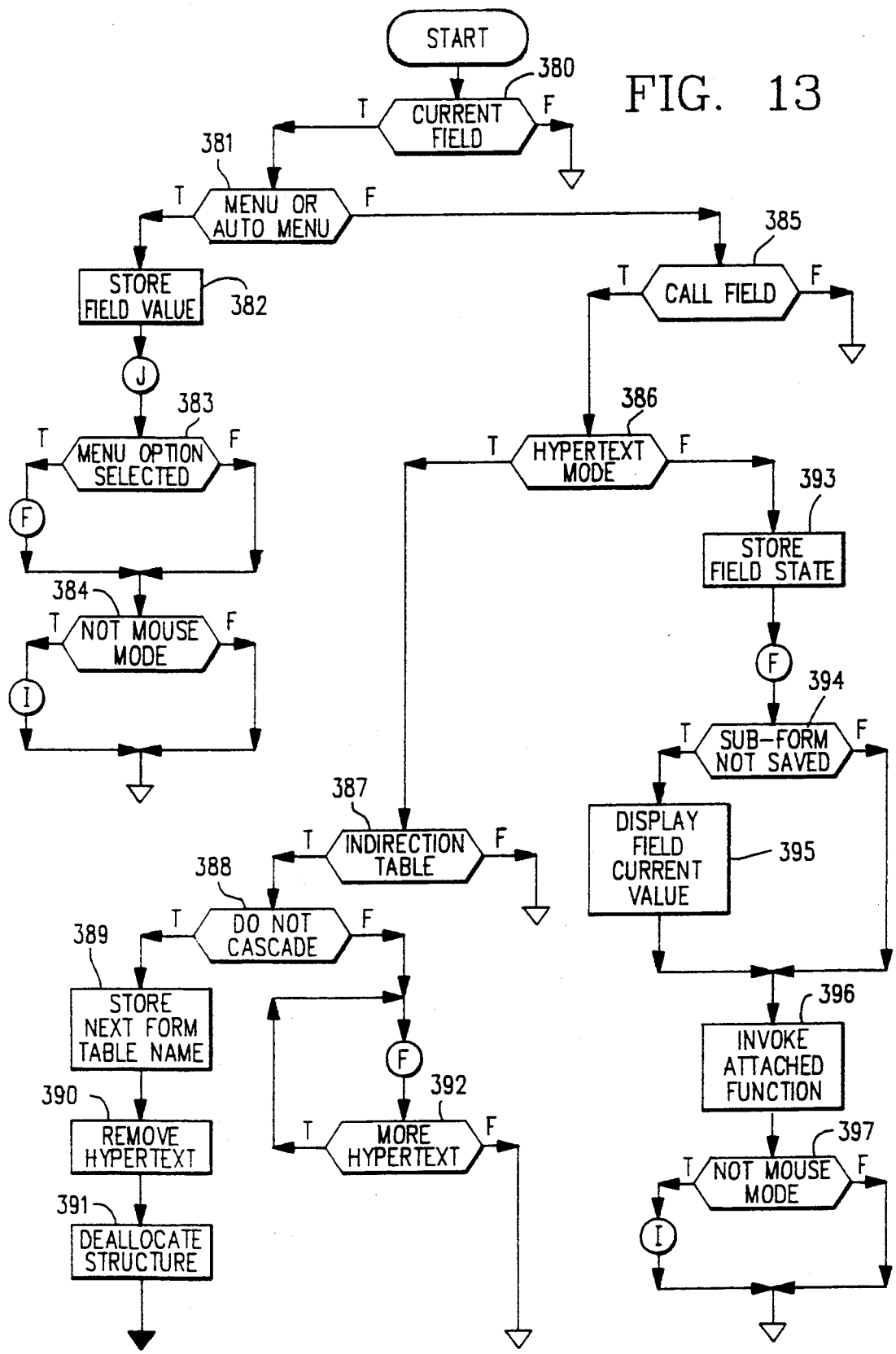

The flow chart for the call command is shown FIG. 13. This routine is used for call fields and proceeds as follows:
1. If there is a current field, 380, a. if the current field is a "menu" or "automatic menu" type field, 381,
   1. store the current field value in the field's FIELD cell, 382.
   2. call up a pop-up menu for the field using the "pop-up menu" routine, J.
   3. if the user elected one of the menu options in step 1.a.2, 383, attempt to call up a subform from the current field using the "invoke subform" routine, F, in "interactive" mode.
   4. if not in "mouse" mode 384, go to the next field using the "field transition" command, I.

Else, if the current field is of type "call", 385,
   1. if the execution mode is "hypertext", 386,
      a. if the current field has an indirection table associated with it, 387,
         1. if hypertext forms are not to be cascaded from this field, 388,
            a. store the name of the indirection table to the next "hypertext" in the SYS-PARMS cell, 389.
            b. remove the current hypertext form form the physical display, 390.
            c. deallocate the internal form data structure for the current hypertext form, 391.
            d. return to the caller of the "form main routine."
         Else, repeatedly call, 392, the "invoke subform" routine, F, in "hypertext" mode until an indication is returned that the user wishes to exit the hypertext form network. The name of the indirection table to the next hypertext form, stored in the SYS-PARMS cell, is made available to the routine on each invocation.
      Else,
         1. store the current state of the field in the field's FIELD cell, 393.
         2. attempt to call a subform from the field using the "invoke subform" routine, F, in "interactive" mode.
         3. if a subform was called in step 1.a.2. and not saved by the user 394, write the field's current value to the physical display, 395.
         4. invoke any attached function in the "user call" context without changing the field's value, 396.
         5. if not in "mouse" mode, 397, go to the next field using the "field transition" routine I.

Figure 14:
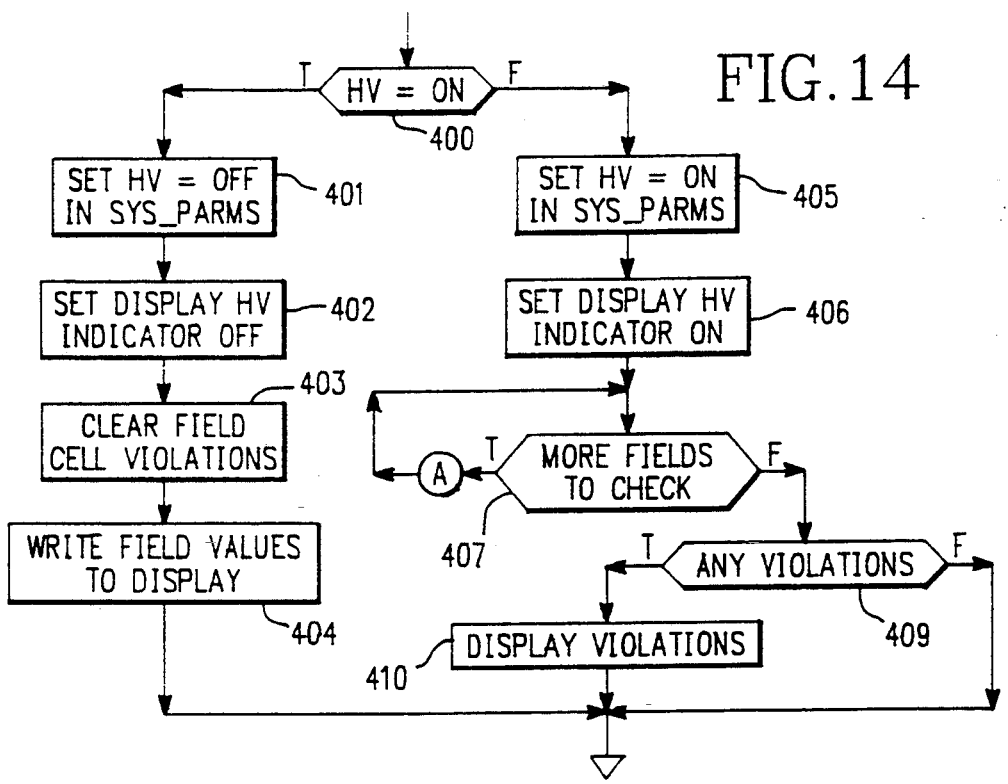

The toggle "highlight violations" mode command shown in FIG. 14 is used to highlight those fields on the physical display which are inconsistent or invalid. The steps of the routine are as follows:

1. If "highlight violations" (HV) mode is on, 400,
   a. indicate in the SYS-PARMS cell that "highlight violations" mode is off, 401.
   b. turn the physical display "highlight violations" mode indicator off, 402.
   c. remove the violation indicator from the FIELD cell for each field currently in violation, 403.
   d. write all field values on the current form to the physical display to turn off distinguished fields, 404.
Else,
   a. indicate in the SYS-PARMS cell that "highlight violations" mode is on, 405.
   b. turn the physical display "highlight violations" mode indictor on, 406.
   c. perform the "field validation" routine, A, on each field, 407, on the current form checking subforms and marking violations as they are found.
   d. if any violations are found, 409, in step 1.c., write all field values on the current form to the physical display to distinguish those in violation, 410.

Figure 15:
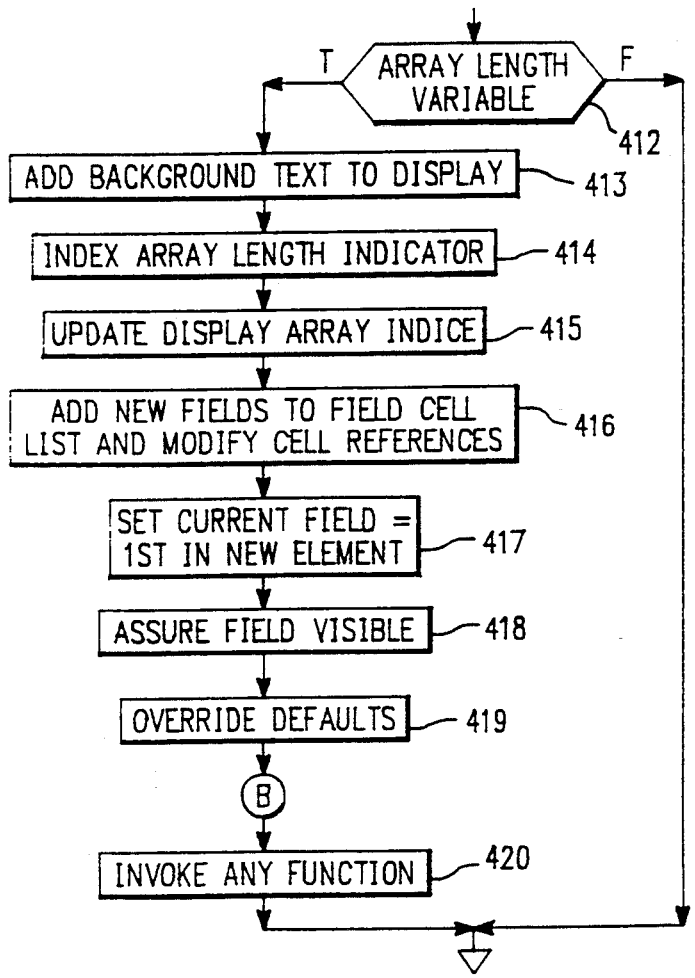

The add array element command shown in FIG. 15 is used to add another element to an array of variable length. If the steps of this routine are as follows:

1. if the current form is an "array" form of variable length, 412,
   a. load the background text for the array element into memory from the background text file referenced in the WIND-PARMS cell and contained in the directory indicated in the system configuration file, and then append the text to the end of the existing elements on the physical display, 413.
   b. add "1" to the array length indicator for the form in the WIND-PARMS cell, 414.
   c. update the array element indices on the physical display, 415.
   d. splice the new element's fields into the FIELD cell list copying element-invariant information from existing cells to the newly created cells, updating indices and row numbers, setting the status of the newly created cells to "default", and modifying FORM, FIELD, and WIND-PARMS cell references appropriately, 416.
   e. change the current field to the first "visible" and "unprotected" field in the newly created array element, 417.
   f. if the current field is not visible through the window to the user, reposition the form's window to make it visible, 418.
   g. override default field values in the newly created FIELD cells with those specified in the form tree, global list, and override list using the list precedence defined in the SYS-PARMS cell, 419.
   h. apply the "update automatic fields" routine B to the form with no driving field specified to account for the newly added array element.
   i. invoke any attached function in the "entering" context without changing the field's value, 420.

Figure 16:
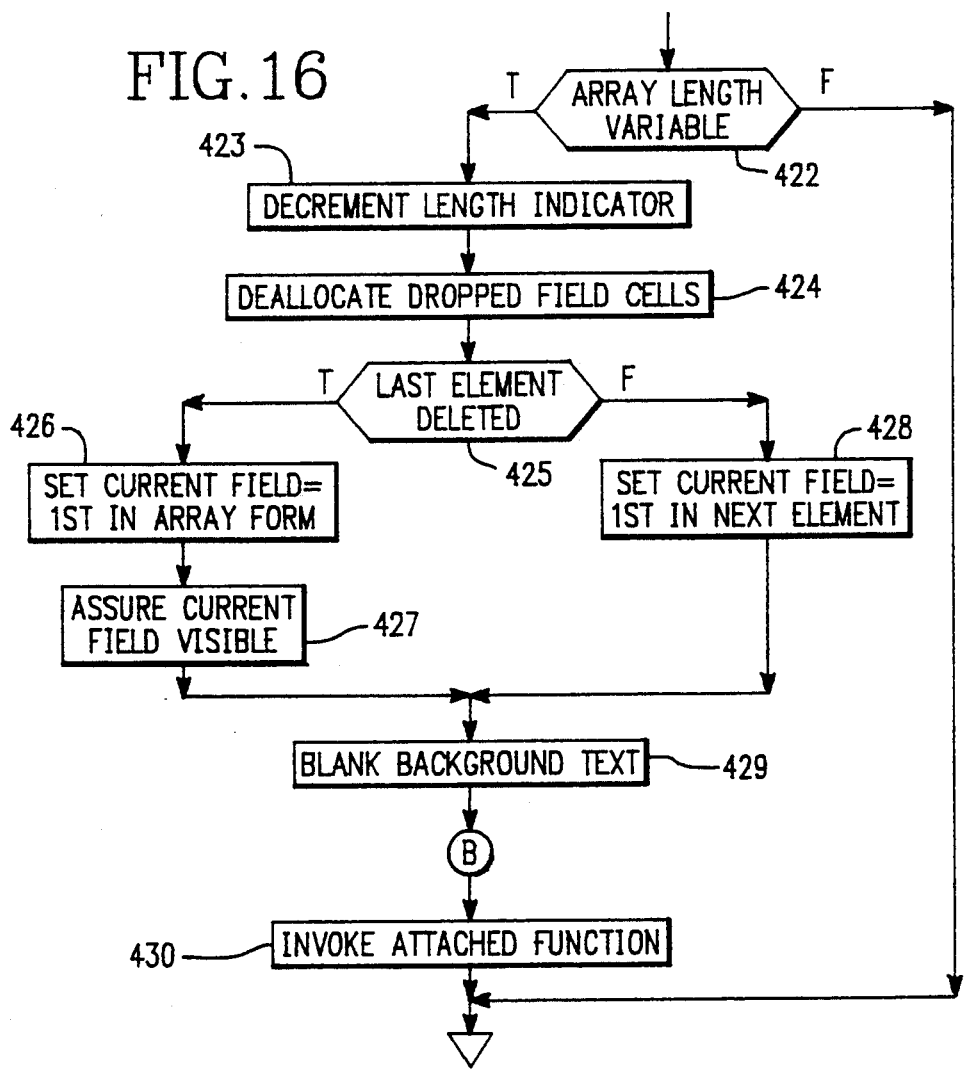

The delete array element command shown in FIG. 16 is as follows:

1. If the current form is an "array" form of variable length and contains more than one array element, 422.
   a. subtract "1" from the array length indicator for the form in the WIND-PARMS cell, 423.
   b. deallocate all FIELD cells corresponding to the element being deleted updating field indices and row numbers in the remaining FIELD cells, 424.
   c. if the last element on the form was the one eliminated, 425,
      1. change the current field to the first "visible" and "unprotected" field in the "array" form, 426.
      2. if the current field is not visible to the user through the window, reposition the form's window to make it visible, 427.
   Else, change the current field to the first "visible" and "unprotected" field in the array element following the one that was deleted, 428.
   d. blank out the extra array element background text on the physical display, 429.
   e. perform the "update automatic fields" routine, B, with no driving field specified to account for the elimination of the array element.
   f. invoke any attached function in the "entering" context without changing the field's value, 430.

Figure 17:
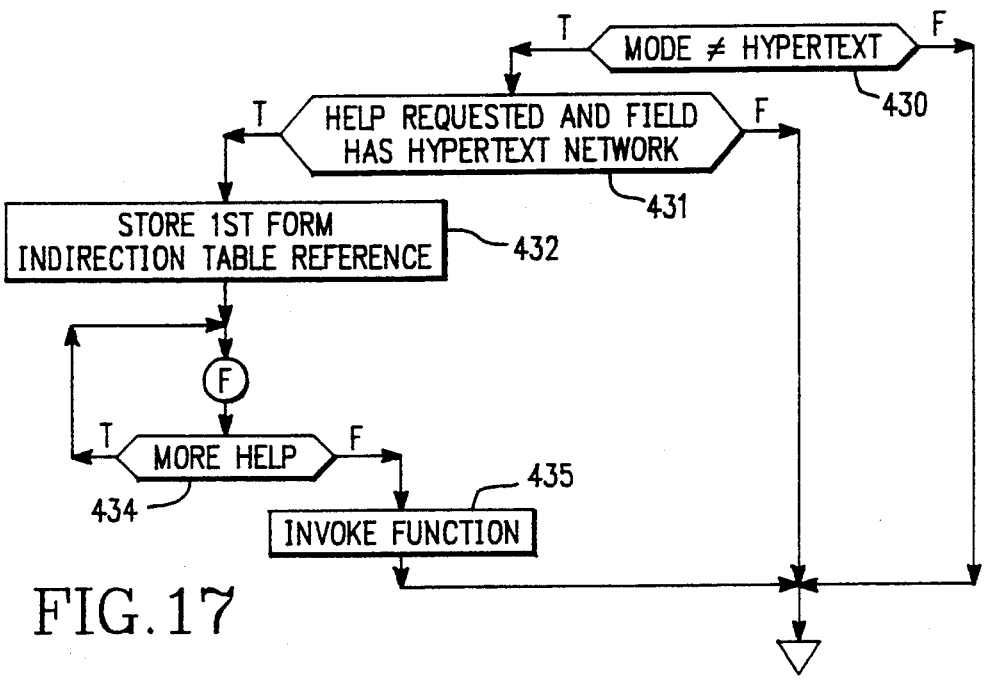
Figure 18:
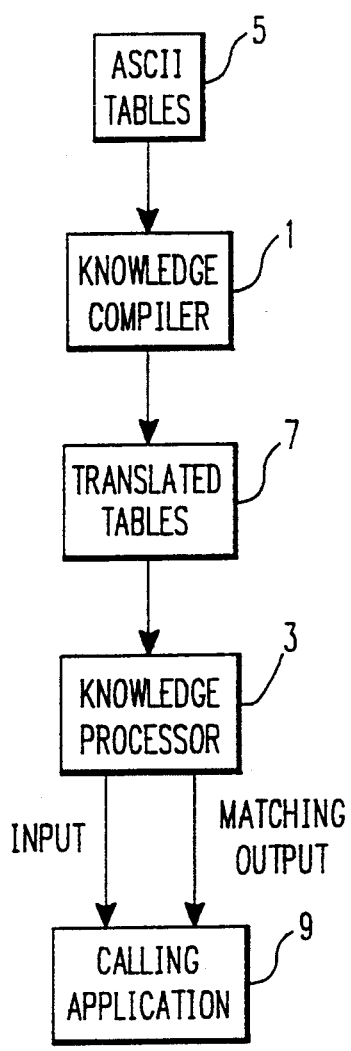

The help command for displaying hypertext is shown in FIG. 17 and includes the following steps:
1. If the execution mode is not "hypertext", 430,
   a. if the user wants general system help, or the user wants field-specific help and the current field has a hypertext from network associated with it, 431,
      1. store, in the SYS-PARMS cell, the name of the indirection table to the initial form in the network of hypertext forms, 432.
      2. repeatedly call the "invoke subform" routine, F, in "hypertext" mode until an indication is returned that the user wishes to exit the hypertext from network, 434. The name of the indirection table to the next hypertext for, stored in the SYS-PARMS cell, is made available to the routine on each in vocation.
      3. Invoke any attached function in the "return from hypertext form" context without changing the field's value, 435.

The "exit form" command, which is used when the form is left by the user, is shown in FIG. 18 and proceeds as follows:
1. If the current execution mode is not "hypertext", 450,
   a. if the current form is to be audited, 451, then indicate that the user wants to save and exit the form in the form's FORM cell 452.
   Else, if all "mandatory" fields have been filled in by the user, 453,
      1. if the "global list" is not empty, 454, then perform 455 the "field validation" routine, A, including subforms on each field on the current form until a violation is detected or the fields are exhausted.
      Else, perform 456 the "field validation" routine, A, without checking subforms on each field on the current form until a violation is detected or the fields are exhausted.
      2. if any violations were detected, 457, in step 1.a.1., place a prompt on the physical display indicating to the user that the form may not be saved while violations exist.
   Else, indicate that the user wants to save and exit the form in the FORM cell.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

SOFTWARE TOOLS

The subject electronic data form entry system can be implemented on a digital computer utilizing the following software tools.

The following describes an integrated system of software tools that are used to automatically generate rule bases for expert systems and to fire the rules as called for by applications programs. The tools are designed for use primarily on IBM personal computers and compatibles, although they are not machine dependent and have already been ported to, for example, Data General MV class computers. The tools are general purpose in nature and can be used in a wide variety of applications, including product engineering and manufacturing plants, order negotiation, field sales offices, and many other activities.

FIG. 18 shows in block diagram form how an expert system is developed using the software tools of the invention. The two main tools are known as the knowledge compiler 1 and the knowledge processor 3.

All knowledge in the expert system (product information, interdependency knowledge, expert rules, intelligent interface definition, etc.) is represented in the form of Table 11. These tables, which will be described in detail below, are created in ASCII format. Once the tables have been created, the knowledge compiler 1 is used to translate them into a compact, computer readable form. The knowledge compiler 1, and the translation process, will be described in detail below.

After the rule base is created and translated, the knowledge processor 3 is called to run the expert system. The knowledge processor 3 takes input from a calling program, matches it against the rule base, and returns the appropriate output (i.e., fires the rules). The execution strategy of the knowledge processor 3 is under the control of the calling program and is invoked through a simple function call. The knowledge processor 3 will be described in more detail below.

Using the speed and flexibility afforded by this knowledge compilation/processing technique, it is possible to build very large, complex, maintainable expert systems and intelligent user interfaces in a PC environment.

Table Format

As mentioned, all knowledge in an expert system developed using the tools of this invention is represented in the form of tables. Each table represents a set of "rules" in the expert system. These tables are generally constructed as ASCII files using spread sheet packages or any text editor. The total rule base for an exemplary expert system implemented in accordance with the invention typically consists of more than 100 tables comprising on the order of 10,000 rules contained in multiple files.

Tables 7, 8 and 9 demonstrate the simple format which is used to define rule bases. The first three rows of these tables (Table Heading) are used to interpret the remaining rows in the table (Table Body). In the body of the table, each row represents a rule in the system.

TABLE 7

| ASCII File 1 - Same Rule Base Table | | | | | |
|---|---|---|---|---|---|
| TABLE TYPE: | Pick One | | | | |
| DEFINE OR: | L = U V W X Y Z | | | | |
| DEFINE OR: | M = X Y Z | | | | |
| HEADING | | long-attri-name | output1 | output2 | out-in |
| I/O | | INPUT | OUTPUT | OUTPUT | OUTPUT |
| TYPE | Description | ALPHA | ALPHA | ALPHA | ALPHA |
| R | Table 1 | value1 | output11 | output12 | Yes |

TABLE 7-continued

| | ASCII File 1 - Same Rule Base Table | | | | |
|---|---|---|---|---|---|
| R | Table 1 | value2 | | output22 | No |
| R | Table 1 | value3 | output31 | output32 | |
| R | Table 1 | A | it's 'A' | output42 | |
| R | Table 1 | M | its 'X' or 'Y' or 'Z' | output52 | Maybe |
| — | | | | | |
| R | Table 1 | !=L | it comes before 'U' | | Maybe |
| — | | | | | |
| R | Table 1 | | @text.fil | | |

The first row of each of the ASCII tables starts with HEADING which begins in the first column and indicates the start of a new table. The remainder of the first row consists of a series of column heading attribute names. Attribute names may be extended to more than one line as shown in Table 7 by the entry long-attr-name. As will be noted, the first column heading is for the table Description. Each rule in the table body includes the table name under the Description Heading.

The second row of the table begins with I/O and is a list of key words which indicate whether a column of values is to be considered an INPUT or an OUTPUT. The INPUTs are tests which must all be satisfied in order for the rule to be applied. The OUTPUTs are results which are returned to the calling application.

The third row specifies the type of the attribute values that will occur in the table column. The row begins in the first column of the table with the string TYPE and is followed by type specifiers for each attribute in the table. If the data is alphanumeric in nature, the type specifier is ALPHA. If the data is in the form of integer (from −32K to +32K), the type specifier is NUM. If the data is whole numbers (from zero to +64K), the type specifier is LINT (Longer INTeger). If the user wishes to specify a range of integers, a RANGE type specifier should be used. OUTPUT columns should be typed ALPHA since OUTPUT column data is always treated as character strings. If, in fact, the output is, for instance numerical, the applications program can adjust for this.

Each row in the remainder of Table 7 is a list of values associated with each of the attributes, and constitutes one rule. In other words, each rule consists of a group of attributes/value pairs which are labeled as INPUTs (i.e., the antecedent or "left hand side" of the rule), and a group of attributes/value pairs which are labeled as OUTPUTs (i.e., consequent or "right hand side" of the rule). The rows in the table represent each meaningful combination of values that are possible for the list of attributes at the head of the table. By setting out the rules in this tabular format, it is very easy for the user to review the rules that have been entered and make sure that all meaningful combinations of values have been included as a rule.

As it will be noted in Tables 7, 8 and 9, each rule is preceded by an R placed in any column before the Description column to identify it as a rule. If data under an OUTPUT column cannot fit in one row, the data may be extended underneath its column to multiple rows following the rule line by using the rule extension line. Rule extension lines are preceded by a "—" placed in any column before the table Description (see Rule 5 in Table 7). Alternatively, if a value in a table is too long to fit on a single row, the value may be placed in a text file, as demonstrated by the "@text.fil" in the last rule in Table 7. The text file may have any name.

Attributes which can take on any value in a particular rule are easily expressed by simply leaving the entry blank, as indicated by the blank in the input column of the last rule in Table 7.

If the user needs to specify an INPUT attribute column that is really a logical disjunction of several values (i.e., an OR function), this may be represented by defining a disjunction value, DEFINE OR: as shown at the top of Table 7. These functions are very useful in reducing the size of a table where several inputs produce the same output. The disjunction value may be used in any table of the file in place of a value to represent the disjunction of the values specified in the definition line.

TABLE 8

| | ASCII File 2 - Sample Rule Base Table | | | | |
|---|---|---|---|---|---|
| HEADING | | attribute1 | attribute2 | attribute3 | output |
| I/O | | INPUT | INPUT | INPUT | OUTPUT |
| TYPE | Description | NUM | ALPHA | RANGE | ALPHA |
| R | Table 2 | <= 0 | Yes | [−100, 0) | outval1 |
| R | Table 2 | <= 0 | Yes | | outval2 |
| R | Table 2 | <= 0 | No | [−100, 0) | outval3 |
| R | Table 2 | <= 0 | No | [0, 23) | outval4 |
| R | Table 2 | <= 0 | No | | outval5 |
| R | Table 2 | < 10 | Yes | [−100, 5] | outval6 |
| R | Table 2 | < 10 | Yes | | outval7 |
| R | Table 2 | < 10 | No | | outval8 |
| R | Table 2 | < 100 | Yes | > 0 | outval9 |
| R | Table 2 | < 100 | Yes | [0, 5] | outval10 |
| R | Table 2 | < 100 | Yes | | outval11 |
| R | Table 2 | <1000 | | 0 | outval12 |
| R | Table 2 | <1000 | | | outval13 |
| R | Table 2 | <5000 | | | outval14 |
| R | Table 2 | | Yes | | outval15 |
| R | Table 2 | | No | | outval16 |
| R | Table 2 | | | | default |

Table 8 is another ASCII input table which illustrates the various types of operators which can be used. Numerical NUM type data may have >, <, >=, <=, <>, or != operators to the left of the integer in order to specify inequalities.

The RANGE type data uses the standard mathematical notation of square brackets for inclusive range delimiters and parenthesis for exclusive range delimiters, as in [,], [,), (,). So [1,3] would denote the set of integers {1,2,3} and [1,3) would denote the set of integers {1,2}. RANGE type attributes may also have any valid NUM type values since the RANGE attribute type is a superset of the NUM attribute type. Hence, values such as <=5 and 3 are valid for a RANGE type attribute.

TABLE 9

ASCII File 3 - Sample Rule Base Table

TABLE TYPE: Pick All
DEFINE DELIMITER: ,

| HEADING I/O TYPE | Description | out-in INPUT ALPHA | Input-Attr INPUT NUM | Output-Attr OUTPUT ALPHA |
|---|---|---|---|---|
| R | Table 3 | Yes | | a |
| R | Table 3 | No | | b |
| R | Table 3 | Maybe | | a, b |
| R | Table 3 | | > 10 | c |
| R | Table 3 | | > 100 | d |
| R | Table 3 | | >1000 | e |
| R | Table 3 | | >5000 | f |

Some of the rule bases are interdependent, that is the output of some rules are the inputs for other rules. For instance, the last output attribute OUT-IN, in Table 1 is an input attribute for the rules in Table 9.

Often a calling application will require the ability to interpret a value in an OUTPUT column of a table as a list of items. This necessitates the use of a delimiter to separate distinct items in a list from one another. The default delimiter is a space. If this was the only delimiter available, spaces could not appear within an OUTPUT item. The space would be treated as a separator instead of a part of the item itself. To prevent this from occurring, the knowledge compiler 1 allows the user to override the default delimiter for a given file with a desired printable character.

For instance, in Table 9, a "," has been selected as the delimiter. While any delimiter can be used in the ASCII tables, the OUTPUT returned from the knowledge processor 3 will have all delimiters replaced by a common system delimiter.

In normal operation, the knowledge processor 3 will fire (match) only one rule in a table each time it is called based upon the input and rule number passed to it, as described below. In some instances, however, the application may require the knowledge processor to fire all rules that match the given input. In order to provide this capability, a TABLE TYPE line is included in the ASCII tables. If Pick One is used as the table type, then only the first rule which matches the input is picked. If on the other hand, Pick All is selected, the knowledge processor 3 will fire all rules that match the given input and will return all matching OUTPUTs concatenated together and separated by the system delimiter. Entering anything other than Pick All, or omitting the TABLE TYPE line, will default to the normal Pick One mode. As can be seen, Table 7 is a Pick One table, Table 8 is a default table, and Table 9 is a Pick All table.

This novel tabular method of defining rule bases provides the essential operations necessary for defining an expert system. The method allows for any combination of relational and logical operators. Disjunctions are simply defined through the DEFINE OR statement as described previously. Conjunctions are provided through the combination of values of attributes across each rule entry. All relational operators are provided including a convenient range operator.

This method of defining rule bases has several distinct advantages over previous approaches to creating expert systems. This format can be created by using spreadsheet programs (for example, Lotus 1-2-3), or even with simple text editors. The format is extremely easy to read and understand. This organization also makes it very easy to recognize that a rule base is incomplete, or that discrepancies exist. These advantages allow even novice computer users to rapidly create well organized, well documented expert systems.

This rule base format can also make maintenance of the expert system automatic. Existing source documentation often exists in a tabular form which, with only slight modification, can be used as the rule base of the expert system. The source documentation and the expert system rule base then become one and the same, and when the documentation is updated, the expert system is automatically updated.

Further, by making knowledge bases of expert systems directly accessible to applications specialists, this novel rule base format eliminates the need for a knowledge engineer, and thus eliminates a potential bottleneck and source of error in the development of expert systems.

Knowledge Compiler

Once the rule base is created, it is the function of the knowledge compiler 1 to take the table or "human readable" form of the rule base and translate it into a compact, efficient, computer readable form. This translation, while essential to the speed and efficiency of the expert systems produced, is transparent to the application designer.

Tables 10 through 19 show the translated form of the rule base represented by Tables 7, 8 and 9. Each of the files produced by the knowledge compiler 1 will be described. Certain control characters are used as delimiters in the translated tables; these characters are represented as the character preceded by the " ∧ " symbol (for example, control-A is represented as ∧A).

TABLE 10

File: index.dat

| Active Entry Flag | Table Name | Delim iter | Table Type | field index | ors index | rb index | out-index index | out-put index | Delim-iter |
|---|---|---|---|---|---|---|---|---|---|
| 1 | Table 1 | ∧D | 0 | 0 | 0 | 0 | 0 | 0 | ∧E |
| 1 | Table 2 | ∧D | 0 | 58 | 35 | 30 | 64 | 282 | ∧E |
| 1 | Table 3 | ∧D | 1 | 118 | 42 | 270 | 208 | 538 | ∧E |

TABLE A-5

| | | | | |
|---|---|---|---|---|
| | | File:nxtindex.dat. | | |
| field index | ors index | rb index | out-index index | out-put index |
| 164 | 49 | 328 | 272 | 600 |

The file index.dat, Table 10, contains one line for each table in the expert system. The main purpose of this file is to provide indices into five of the other files (listed in columns 5–9 of Table 10) produced by the knowledge compiler 1. These indices are the number of bytes from the beginning of each of the five files to the beginning of the section for the given table. For example, the rule base for "Table 8" begins at byte #30 in the file rb.dat (See Table 10).

In addition, index.dat, Table 10, contains a flag for each table in the rulebase which indicates whether such table is to be treated as a Pick All (encoded as 1) or a Pick One (encoded as 0) type table. This is the "Table Type" entry in index.dat.

In normal operation, the knowledge compiler 1 simply appends together the rule bases represented by the tables. As rule bases are updated, the new information is appended to the translated rule base files. Outdated information is flagged as such and is not referenced. The "Active Entry Flag" in index.dat is used to indicate active or outdated information. A 1 is used to represent an active entry, while a 0 means the information is outdated.

The file nxtindex.dat., Table 11, is simply a list of the five byte offsets that will become the indices for the next table entered into the rule base, and into index.dat (Table 10).

The file defs.dat, Table 13 contains a list of alphanumeric values and integer codes used by the knowledge compiler 1 and knowledge processor 3. The alphanumeric values encoded include the values for all ALPHA type INPUT attributes for all rules in the system, and all values listed as elements of a disjunction definition. These integer codes are used to create a faster, more compact representation of the rule base and the disjunction definitions.

TABLE 13

| File:defs.dat | |
|---|---|
| Alpha Name | Code |
| U | 1 |
| V | 2 |
| W | 3 |
| X | 4 |
| Y | 5 |
| Z | 6 |
| value1 | 7 |
| value2 | 8 |
| value3 | 9 |
| A | 10 |
| Yes | 11 |
| No | 12 |
| Maybe | 13 |

Each disjunction definition is stored in the file ors.dat, Table 14. The file consists of lists of disjunction definitions for every table in the system, each separated by a delimiter (De12). The list of disjunction definitions for each table consists of the list of integer codes (from defs.dat) for the alphanumeric values of each of the elements of the disjunction. The list of codes for each disjunction is separated by a delimiter (De11). The set of disjunctions for each table is referenced through the "ors index" in the file index.dat (Table 4).

TABLE 14

| | | | | | | | | | | |
|---|---|---|---|---|---|---|---|---|---|---|
| | | | File:ors.dat. | | | | | | | |
| code | code | code | ... | De11 | code | code | code | ... | De11 | De12 |
| 1 | 2 | 3 | 4   5   6 | 9999 | 4 | 5 | 6 | | 9999 | −9999 |
| | | | | | | | | | | −9999 |
| | | | | | | | | | | −9999 |

The file field.dat, Table 11, contains a list of all the attributes of all the tables in the expert system. Each attribute name is listed followed by an integer code which indicates its TYPE (such as 2=ALPHA), followed by an integer code for its I/O type (4=INPUT, 6 OUTPUT, for example). All attributes for a given table are listed together, followed by a delimiter. The attribute list for a table can be found through the "field index" in the file index.dat (Table 10).

The INPUT of all the rules in the expert system are stored in the file rb.dat, Table 15. Each INPUT attribute value for every rule is represented as an encoded operator/value pair, or operator/value/value triple in the case of RANGE type attributes. The operators such as <>,>=,[), etc., are encoded as integers, as are the values which are either the actual integer value for NUM and RANGE type attributes, or the integer codes (found in defs.dat, Table 7) for ALPHA type attributes.

TABLE 12

| | | | File:field.dat. | | | | | |
|---|---|---|---|---|---|---|---|---|
| Attrib-Name | TYPE | I/O | Attrib-Name ... | | | | | Delim. |
| long-attr-name | 2 | 4 | output1 | 2 6 | output2 | 2 6 | out-in   2 6 | ∧ E |
| attribute1 | 1 | 4 | attribute2 | 2 4 | attribute3 | 7 4 | output   2 6 | ∧ E |
| out-in | 2 | 4 | Input-Attr | 1 4 | Output-Attr | 2 6 | | ∧ E |

Each line of Table 12 contains all of the attributes for one of the ASCII tables, i.e., line 1 lists the attributes for Table 7. Table 6 tells the knowledge processor 3 what the entries in the rule base represent.

The code −8888 represents, "don't care" (any value) and the code −9999 represents the end of a table. Examples of the encoding can be determined by comparing the entries in Table A-9 with the corresponding entries in Tables 7 to 9.

TABLE 15

File:rb.dat.

| Operator | Value | Operator | Value | Operator | Value1 | Value2 ... | Del |
|---|---|---|---|---|---|---|---|
| 0 | 7 | | | | | | |
| 0 | 8 | | | | | | |
| 0 | 9 | | | | | | |
| 0 | 10 | | | | | | |
| 9 | 2 | | | | | | |
| 8 | 1 | | | | | | |
| −8888 | 0 | | | | | | −9999 |
| 5 | 0 | 0 | 11 | 12 | −100 | 0 | |
| 5 | 0 | 0 | 11 | −8888 | 0 | 0 | |
| 5 | 0 | 0 | 12 | 12 | −100 | 0 | |
| 5 | 0 | 0 | 12 | 12 | 0 | 23 | |
| 5 | 0 | 0 | 12 | 8888 | 0 | 0 | |
| 3 | 10 | 0 | 11 | 13 | −100 | 5 | |
| 3 | 10 | 0 | 11 | −8888 | 0 | 0 | |
| 3 | 10 | 0 | 12 | −8888 | 0 | 0 | |
| 3 | 100 | 0 | 11 | 4 | 0 | 0 | |
| 3 | 100 | 0 | 11 | 13 | 0 | 5 | |
| 3 | 100 | 0 | 11 | −8888 | 0 | 0 | |
| 3 | 1000 | −8888 | 0 | 4 | 0 | 0 | |
| 3 | 1000 | −8888 | 0 | −8888 | 0 | 0 | |
| 3 | 5000 | −8888 | 0 | −8888 | 0 | 0 | |
| −8888 | 0 | 0 | 11 | −8888 | 0 | 0 | |
| −8888 | 0 | 0 | 12 | −8888 | 0 | 0 | |
| −8888 | 0 | −8888 | 0 | −8888 | 0 | 0 | −9999 |
| 0 | 11 | −8888 | 0 | | | | |
| 0 | 12 | −8888 | 0 | | | | |
| 0 | 13 | −8888 | 0 | | | | |
| −8888 | 0 | 4 | 10 | | | | |
| −8888 | 0 | 4 | 100 | | | | |
| −8888 | 0 | 4 | 1000 | | | | |
| −8888 | 0 | 4 | 5000 | | | | −9999 |

The file rb.dat is stored in a compact form with no blanks, and in binary format.

Encoding of the rule base as described above greatly enhances the speed of the matching process performed by the knowledge processor 3. First, the rule base can be read in very rapidly since it is in binary format, and since it is encoded and has no blanks and is therefore very compact (the rb.dat file Table 15, normally takes only between 2% and 10% of the space of the tables used to produce it). Also, less information is stored since only the INPUTs are stored in the rb.dat file. Furthermore, after a rule is read in, only integer comparisons are performed, rather than the more time consuming string comparisons. Finally, once a rule is "fired," its output is accessed directly through the indexing mechanism provided by the index.dat (Table 10 described above).

The file output.dat, Table 16, contains the values for all the OUTPUT attributes for all rules in the system. Each output is preceded by an integer equal to the number of characters in the output, and followed by a delimiter (De11). The output values for a given rule are followed by a second delimiter (De12), and the section for each table is separated by a third delimiter (De13). The section for each table is referenced through the "output index" found in index.dat (Table 4).

TABLE 16

File:output.dat.

| Len | Output | Del1 | Len | Output | Del1 | Len | Output ... | Del2 | Del3 |
|---|---|---|---|---|---|---|---|---|---|
| 8 | output11 | B | 8 | output12 | B | 3 | Yes | ∧C | |
| 0 | | B | 8 | output22 | B | 2 | No | ∧C | |
| 8 | output31 | B | 8 | output32 | B | 0 | | ∧C | |
| 8 | it's 'A' | B | 8 | output42 | B | 0 | | ∧C | |
| 22 | it's 'X' or 'Y' or 'Z' | B | 8 | output52 | B | 5 | Maybe | ∧C | |
| 19 | it comes before 'U' | B | 0 | | B | 5 | Maybe | ∧C | |
| 25 | it's not a capital letter | B | 0 | | B | 2 | No | ∧C | ∧E |
| 7 | outval1 | | | | | | | ∧C | |
| 7 | outval2 | | | | | | | ∧C | |
| 7 | outval3 | | | | | | | ∧C | |
| 7 | outval4 | | | | | | | ∧C | |
| 7 | outval5 | | | | | | | ∧C | |
| 7 | outval6 | | | | | | | ∧C | |
| 7 | outval7 | | | | | | | ∧C | |
| 7 | outval8 | | | | | | | ∧C | |
| 7 | outval9 | | | | | | | ∧C | |
| 8 | outval10 | | | | | | | ∧C | |
| 8 | outval11 | | | | | | | ∧C | |
| 8 | outval12 | | | | | | | ∧C | |
| 8 | outval13 | | | | | | | ∧C | |
| 8 | outval14 | | | | | | | ∧C | |
| 8 | outval15 | | | | | | | ∧C | |
| 8 | outval16 | | | | | | | ∧C | |
| 7 | default | | | | | | | ∧C | ∧E |
| 1 | a | | | | | | | ∧C | |
| 1 | b | | | | | | | ∧C | |

TABLE 16-continued

| | | File:output.dat. | | | | | | | |
|---|---|---|---|---|---|---|---|---|---|
| Len | Output | | Del1 | Len | Output | Del1 | Len Output ... | Del12 | Del3 |
| 3 | a ∧Ab | | | | | | | C | |
| 1 | c | | | | | | | C | |
| 1 | d | | | | | | | C | |
| 1 | e | | | | | | | C | |
| 1 | f | | | | | | | C | E |

All delimiters specified in OUTPUT columns by the user are replaced in output.dat (Table 16) by the system delimiter. For example, "a, b" in Table 9 is replaced by "a ∧Ab" in Table 16. This is necessary since blanks are valid characters and therefore cannot be used as the delimiter character. Users can define their own delimiter character through the DEFINE DELIMITER: statement as described above.

TABLE 17

| | | | | | File:outindex.dat. | | | |
|---|---|---|---|---|---|---|---|---|
| indx1 | indx2 ... | | | | | | | Del |
| 0 | 38 | 66 | 101 | 136 | 190 | 232 | | −9999 |
| 0 | 14 | 28 | 42 | 56 | 70 | 84 | 98 112 126 142 158 174 190 206 222 238 | −9999 |
| 0 | 8 | 16 | 26 | 34 | 42 | 50 | | −9999 |

The file outindex.dat. (Table 17), contains indices which allow direct access to the output (in output.dat, Table 16) of each rule in the system. The file contains one section for each table in the system. Each section is separated by a delimiter (De1). Within each section is a list of byte offset integers—one for each rule in that table. The byte offset for a rule is the number of bytes from the beginning of that table's section in the output.-dat file (Table 16) at which the output for the given rule begins. The entries for each table in outindex.dat. (Table 17) are referenced through the table's "outindex index" in the file index.dat (Table 10).

Hence, once a rule has been matched by the knowledge processor 3, obtaining the output for that rule involves these indexing operations:

1. Get "output index" and the "outindex index" for the rule's table from the index.dat file (Table 10).
2. Get the rule's output byte offset from the outindex.dat. file (Table 17). This is obtained directly from the "outindex index" just read in, and from the matching rule number.
3. Get the rule's output by going directly to the point: ("output index"+"rule byte offset") bytes from the beginning of the output.dat file.

The file flddep.dat (Table 18) contains one entry for each attribute in the system. An attribute's entry consists of the attribute name, followed by a list of tables in which that attribute appears as an INPUT attribute (table names separated by delimiters (De11)). This list is followed by a second delimiter (De12) which is then followed by a list of OUTPUT attributes which are directly dependent on this INPUT attribute (i.e., found in the tables in which this attribute is an INPUT attribute). Finally, the entry is followed by a third delimiter (De13).

TABLE 18

| | | | | File:flddep.dat | | | | |
|---|---|---|---|---|---|---|---|---|
| Attrib-Name | DT | Del1 | DT Del1 ... | Del2 | DP | DP | DP ... | Del3 |
| long-attr-name | Table 1 | ∧Q | | ∧P | output1 | output2 | out-in | ∧E |
| output1 | | | | ∧P | | | | ∧E |
| output2 | | | | ∧P | | | | ∧E |
| out-in | Table 3 | ∧Q | | ∧P | Output-Attr | | | ∧E |
| attribute1 | Table 2 | ∧Q | | ∧P | output | | | ∧E |
| attribute2 | Table 2 | ∧Q | | ∧P | output | | | ∧E |
| attribute3 | Table 2 | ∧Q | | ∧P | output | | | ∧E |
| output | | | | ∧P | | | | ∧E |
| Input-Attr | Table 3 | ∧Q | | ∧P | Output-Attr | | | ∧E |
| Output-Attr | | | | ∧P | | | | ∧E |

DT = Dependent Table
DP = Dependent Part

The information in Table 18 is generated by the knowledge compiler 1. This information is needed for auxiliary functions which provide information concerning which INPUT attributes are found in which tables, and which OUTPUT attributes are dependent on these INPUT attributes. Each attribute's dependency information is accessed through the attribute's "flddep index" found in the file fldindex.dat (Table 13).

The file fldindex.dat (Table 19) provides an index into the flddep.dat file (Table 18). Each attribute in the system is listed along with a byte offset which points to the attribute's entry in flddep.dat.

TABLE 19

| File:fldindex.dat. | |
|---|---|
| Field Name | flddep index |
| long-attr-name | 0 |
| output1 | 53 |
| output2 | 66 |
| out-in | 79 |
| attribute1 | 113 |
| attribute2 | 146 |
| attribute3 | 179 |
| output | 212 |
| Input-Attr | 224 |
| Output-Attr | 262 |

All tables in a rule base must be processed by the knowledge compiler 1. As each table is processed, it is added to the rule base. Several options are available to indicate specific actions that are to be performed on the file being processed or on the entire rule base.

If an "all" option is selected, all tables in the file will be processed. Otherwise, the knowledge compiler 1 will prompt the user for which tables to process. Thus, when first creating a rule base this option should be used. However, when editing an existing rule base it is more efficient to avoid the "all" option and "recompile" only those tables that have been changed.

In normal operation, the knowledge compiler 1 simply appends together the rule bases represented by tables. As rule bases are updated, the new information is appended to the translated rule base files. Outdated information is flagged as such and is not referenced, but still exists in the files. This is done to increase the speed of compilation. Occasionally it is desirable to invoke a "compress" option to remove this outdated information and compress the remaining up-to-date information. Again, as with the "all" option, this option is somewhat more time consuming, and should be run only occasionally.

A "dependency" option is used to generate interdependency information among INPUT and OUTPUT attributes for all tables in the expert system being generated. This information is needed by some auxiliary functions and is used to provide information concerning which INPUT attributes are found in which tables, and which OUTPUT attributes are dependent on the INPUT attributes. If the application being developed needs to use any of these functions, this option should be used, but only when tables are added to or eliminated from the rule base, or when columns (attributes) are added or removed from an existing table.

Any order and combination of the above options may be specified when processing a table.

When editing an expert system, normally only a small subset of the tables in the overall system are being changed. Consequently, it is usually advantageous to place these few tables in a separate file and then run the knowledge compiler 1 only on that file. By doing this, and by using the above options only when necessary, most changes to an expert system can be made in a matter of seconds.

The knowledge compiler 1 has built-in error checking that will generally give the user an appropriate message if a table cannot be processed due to a breach of any of table format constraints.

The file structure generated by the knowledge compiler 1 leads to extremely compact rule bases. The rule base is represented entirely as integers and each integer requires only 2 bytes of storage. The INPUT values are separated from the OUTPUT values since only the input is needed to fire the rule. This also makes the rule base much more compact. This novel encoding of the rule base allows extremely large rule bases to be stored in a relatively small amount of disk space, allowing for the creation of much larger rule bases than were previously possible in a PC environment. Distribution and updating of an expert system becomes as easy as copying compacted disk files.

The need for time consuming rule base compilation is also eliminated, replaced by a simple, fast translation step which greatly facilitates creation and debugging of expert systems.

With this novel architecture, expert systems which were previously considered much too large to run in a PC environment can now be handled easily and at unprecedented speeds.

The Knowledge Processor

After the rule base is created and translated, the knowledge processor 3 is called to run the expert system. The execution strategy of the knowledge processor 3 is completely under the control of the calling application and is invoked in the exemplary system through a simple "C" language function call.

The calling sequence of the Knowledge processor 3 is as follows:

```
int pick(char                        *table,
         struct Input_Group_Struct   *lig_ptr,
         struct Input_Group_Struct   *gig_ptr,
         struct Output_Struct        **output_ptr_ptr,
         long                        *rule_num_ptr;
            The structures are defined as:
struct Input_Group_Struct
{   char                             *name
    int                              value
struct Input_Group_Struct            *next struct Output_Struct
{   char                             *name;
    char                             *value;
struct Output_Struct                 *next;
};
```

A call to "pick" (the Knowledge processor) returns 1 if a match was made successfully, or 0 if no match was made.

The first parameter: table, is the name of the table that user wants to "pick" from.

The attribute/value pairs that the application wants to match are contained in the structures pointed to by the lig_ptr (local input group pointer) and the gig_ptr (global input group pointer). These structures are linked lists which contain the names of the INPUT attributes and their integer values (for NUM, RANGE, or LINT type attributes), or their integer codes (for ALPHA type attributes). Several functions are provided which return attribute types and codes to aid the user in constructing input groups. If an attribute's value is set equal to the DONT_CARE_CODE, it will match any value for that attribute in the rule table.

The output_ptr_ptr parameter is used to return the OUTPUT attributes and values of the matching rule(s). It is allocated by the knowledge processor and contains a linked list of OUTPUT attributes and their alphanumeric values.

The rule_num_ptr is a pointer to the rule number in the given rule base (table) after which the calling application wants the knowledge processor 3 to begin trying to match the rule base. That is, the knowledge processor will begin trying to match the given rule base at rule (*rule_num_ptr+1). So if *rule_num_ptr is 0, the knowledge processor will start at rule #1. If a match is successfully made, *rule_num_ptr will be set by the knowledge processor to the rule number just matched. If no match is made, *rule_num_ptr will be reset to 0 by the knowledge processor.

The mechanism allows; successive calls to the knowledge processor 3 to find successive matches in a rule base. For example, the following sequence will return the OUTPUT attribute values of all rules that match the input groups:

```
rule_num= 0;
while (pick(table, lig_ptr, gig_ptr, &output_ptr, &rule_num))
    {
        Process the output . . .
```

-continued
}

By saving values of rule_num, it is also possible to resume matching in a table even if the knowledge processor has been called on another table.

Normal execution of the knowledge processor proceeds as follows: The knowledge processor will first determine if there are any INPUT attributes in the given table. If there are no INPUT attributes, it will attempt to return the output of the next rule (after *rule_num_ptr) in the table.

If there are INPUT attributes, the knowledge processor 3 will first check to see if each attribute is in the local input group. If the attribute is not found in the local input group (ig), it will next check the global input group (gig). If an attribute is not found in the lig or the gig, no match will occur, and the Knowledge processor will return 0.

If all INPUT attributes are represented in the input groups, the Knowledge processor will next attempt to match the input groups to the rule base starting with rule (*rule_num_ptr+1). This matching process is very rapid due to the integer encoding of the rule base, the separation of the input side of the rule base from the output side, and the binary representation of the rule base. Once a rule is "fired," its output is accessed directly through the indexing mechanism described above.

If the table is a Pick One type table, and a match occurs, the Knowledge processor will:

1. Use the output_ptr_ptr parameter to return the OUTPUT attributes and values of the matching rule.
2. Set *rule_num_ptr to the number of the matching rule.
3. Return 1.

If the table is a Pick One type table, and no match occurs, the Knowledge processor will:

1. Set *rule_num_ptr to 0.
2. Return 0.

If the table is a Pick All type table, and a match occurs, the Knowledge processor will:

1. Use the output₁ptr₁ptr parameter to return the OUTPUT attributes and the concatenation (separated by the system DELIMITER_CHAR) of the all values of the OUTPUT attributes of all the matching rules.
2. Set *rule_num_ptr to back to 0.
3. Return 1.

If the table is a Pick All type table, and no match occurs, the Knowledge processor will:

1. Set *rule_num_ptr to 0.
2. Return 0.

The compact, encoded rule base provides for extremely fast execution speeds. Since the rule base are compact (and stored in binary format) they can be read in very rapidly, and since only integer comparisons are required, a match can be made in much less time than would be required with normal string comparison operations. The required output can then be accessed directly through an indexing mechanism.

The compact rule base format and the unprecedented execution speed allow large, complex expert systems to be invoked through simple function calls in an ordinary PC environment. With this architecture, it is even possible to have a large application program resident in memory and still be able to call multiple, large expert systems from within the application, thus opening up many new applications to expert systems techniques.

Figure 19:
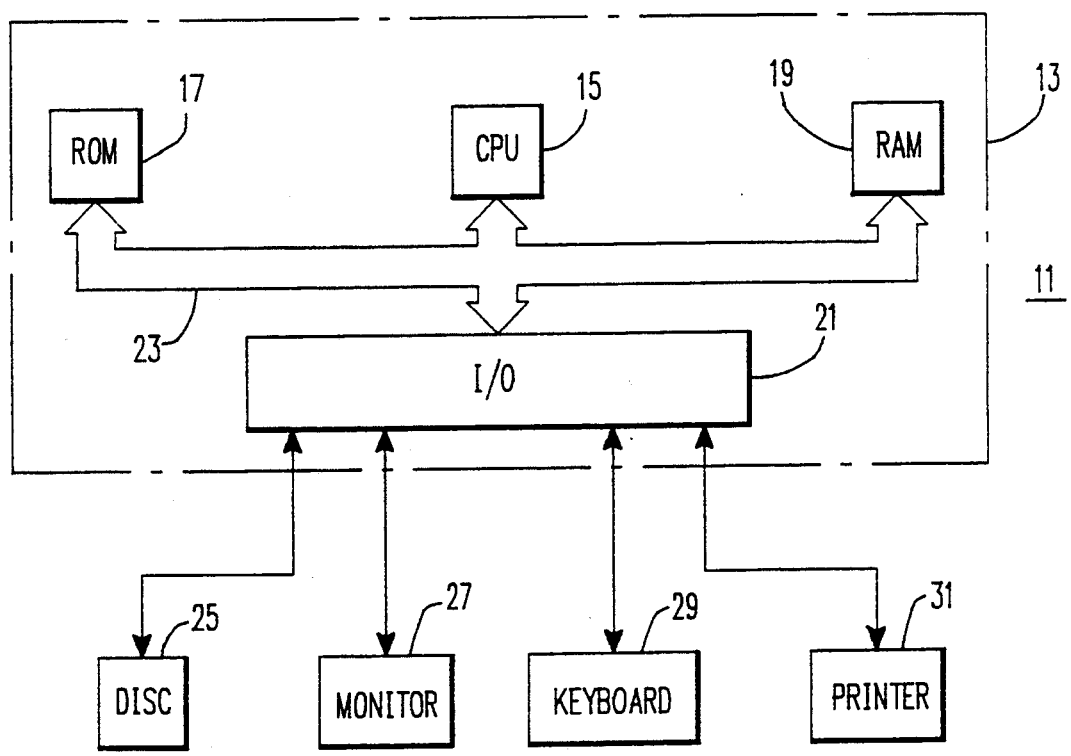
FIG. 19 is a schematic diagram in block form of a computer system.
Figure 20A:
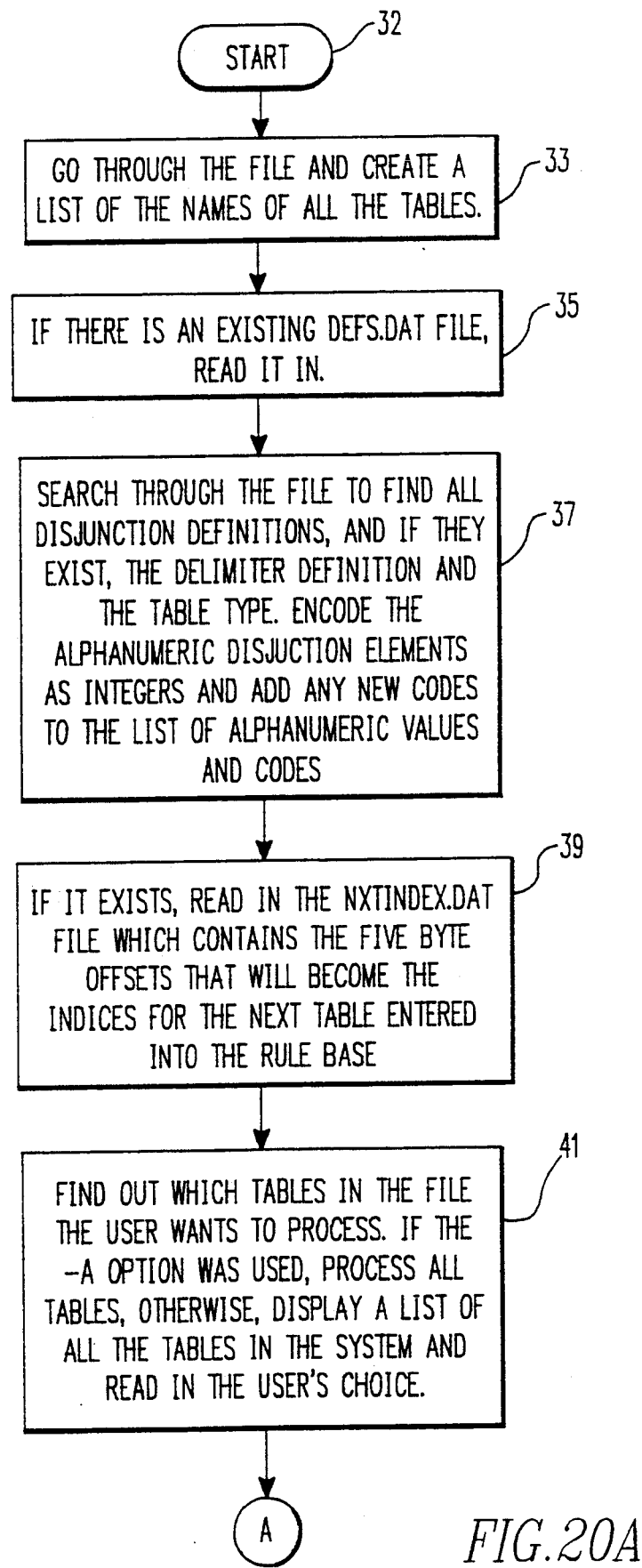
FIGS. 20A through 20 E illustrate a flow chart for a suitable program for implementation by the computer system of FIG. 19 of a knowledge compiler.
Figure 20B:
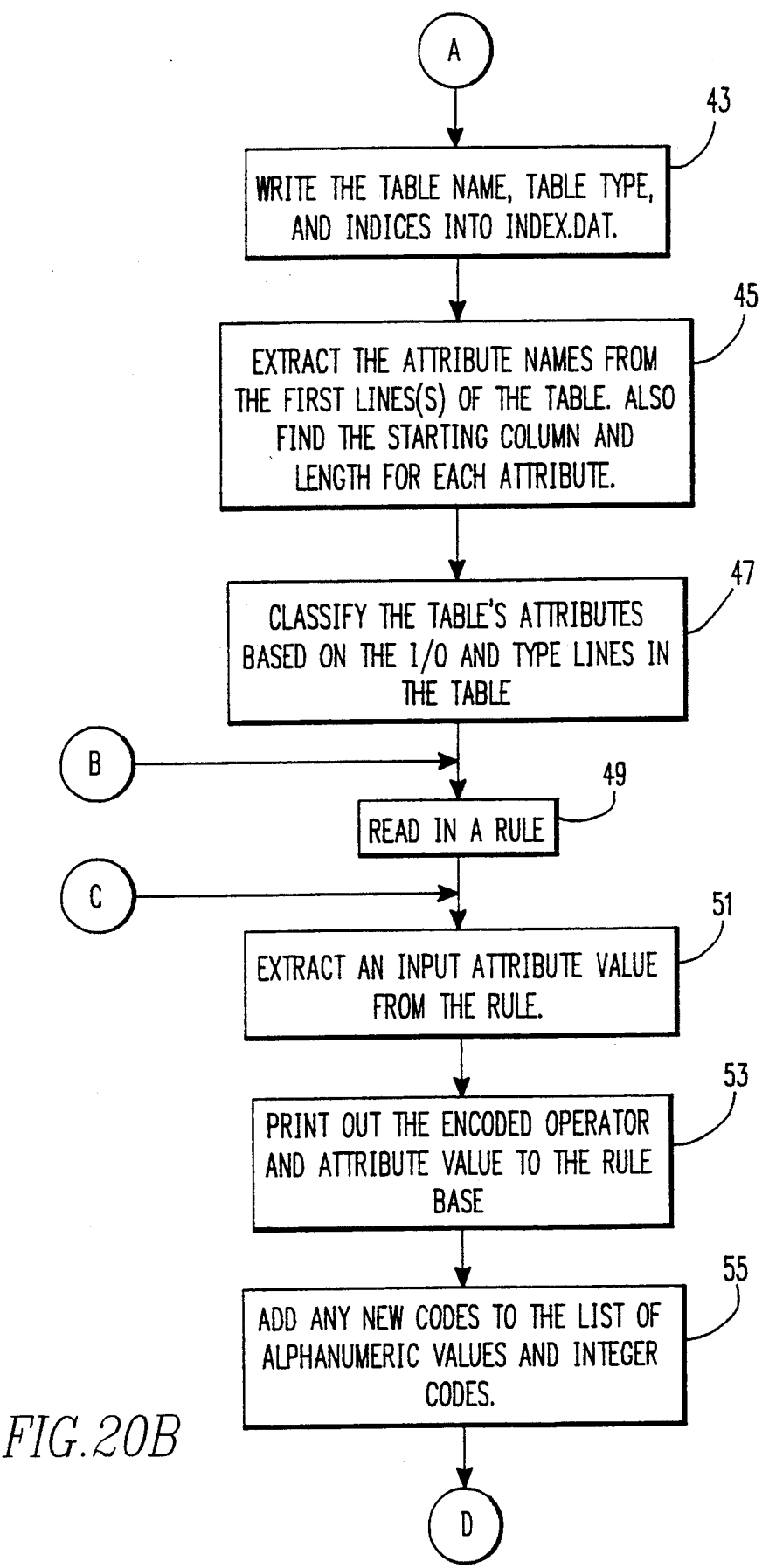
Figure 20C:
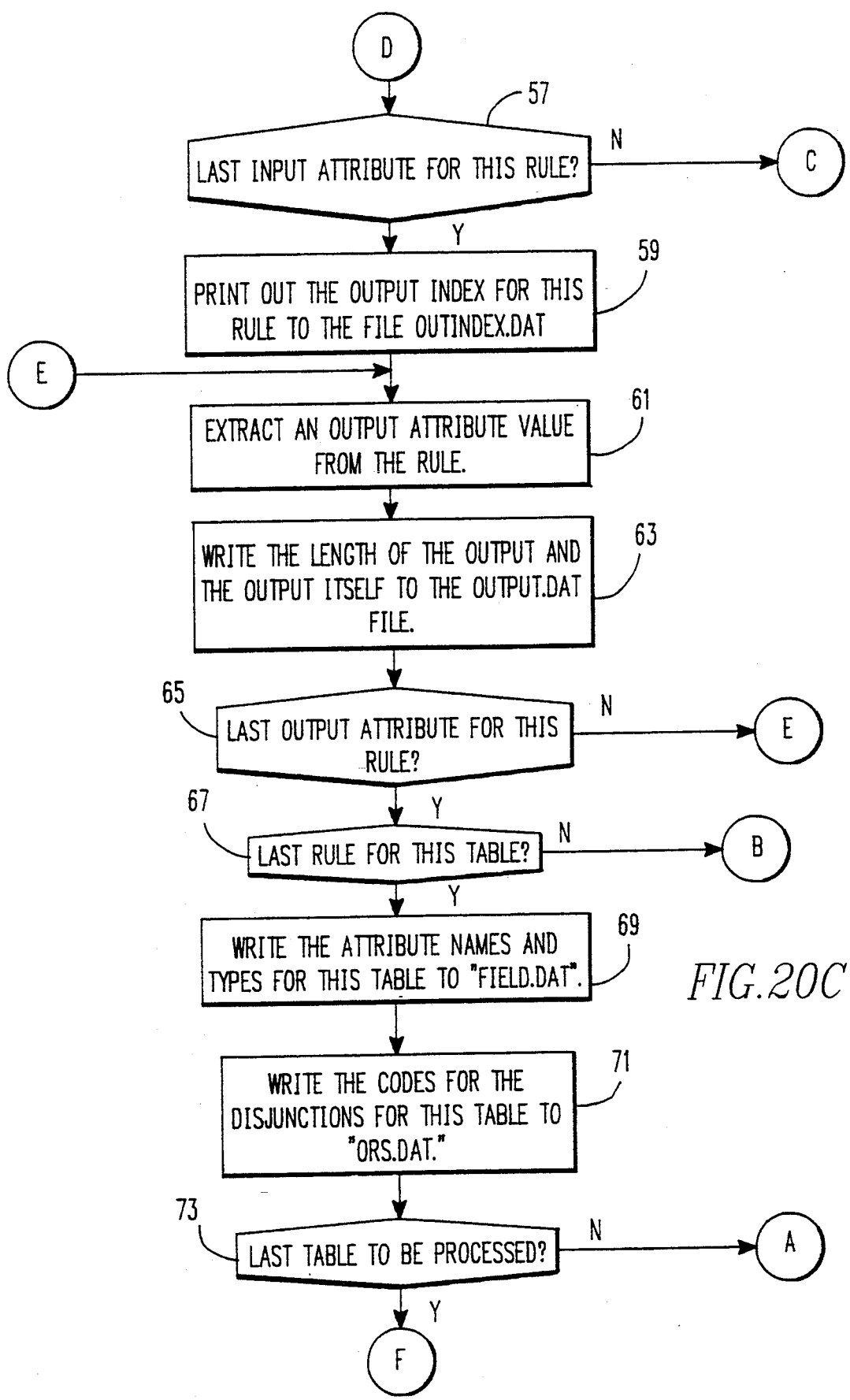
Figure 20D:
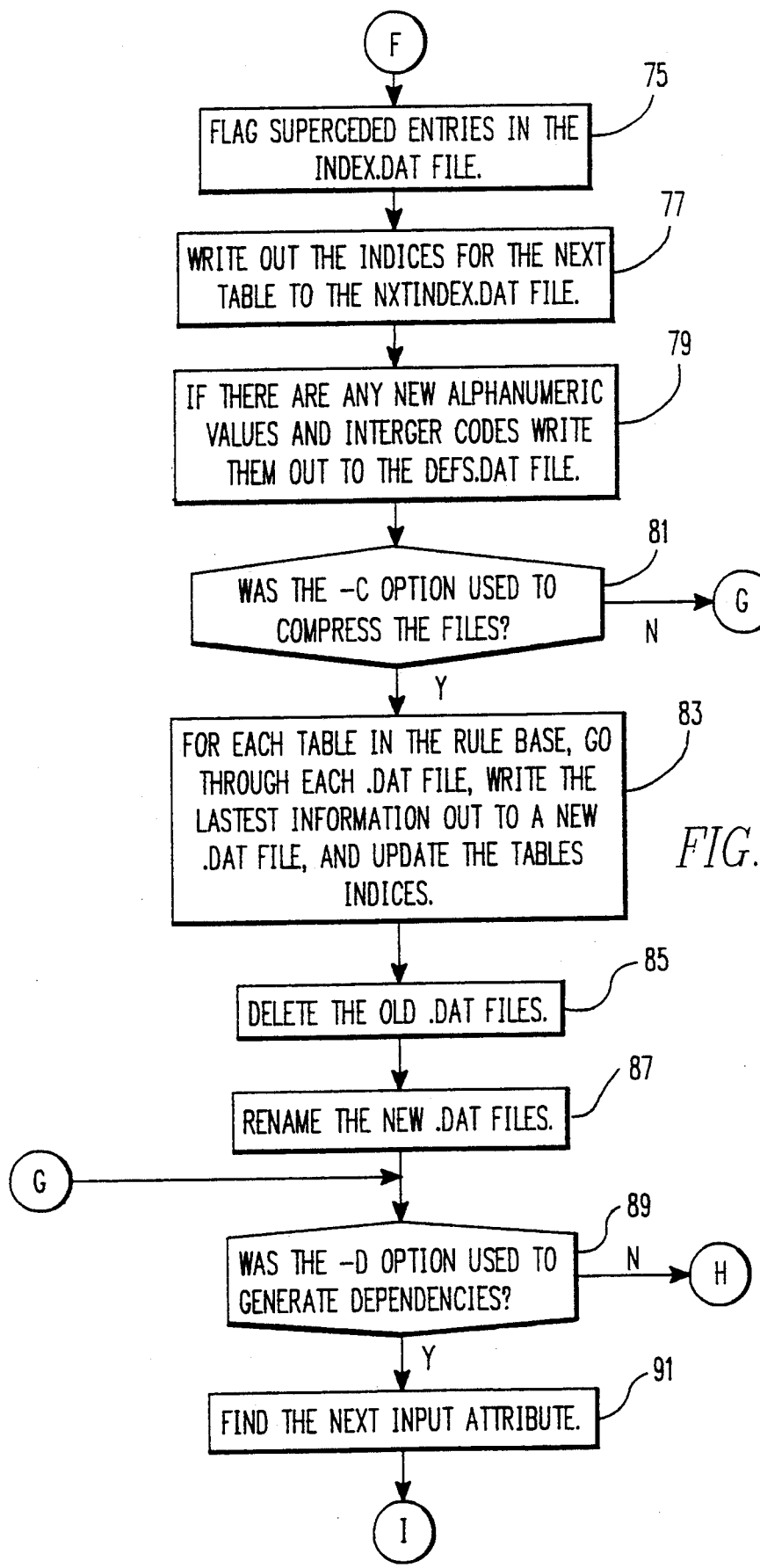
Figure 20E:
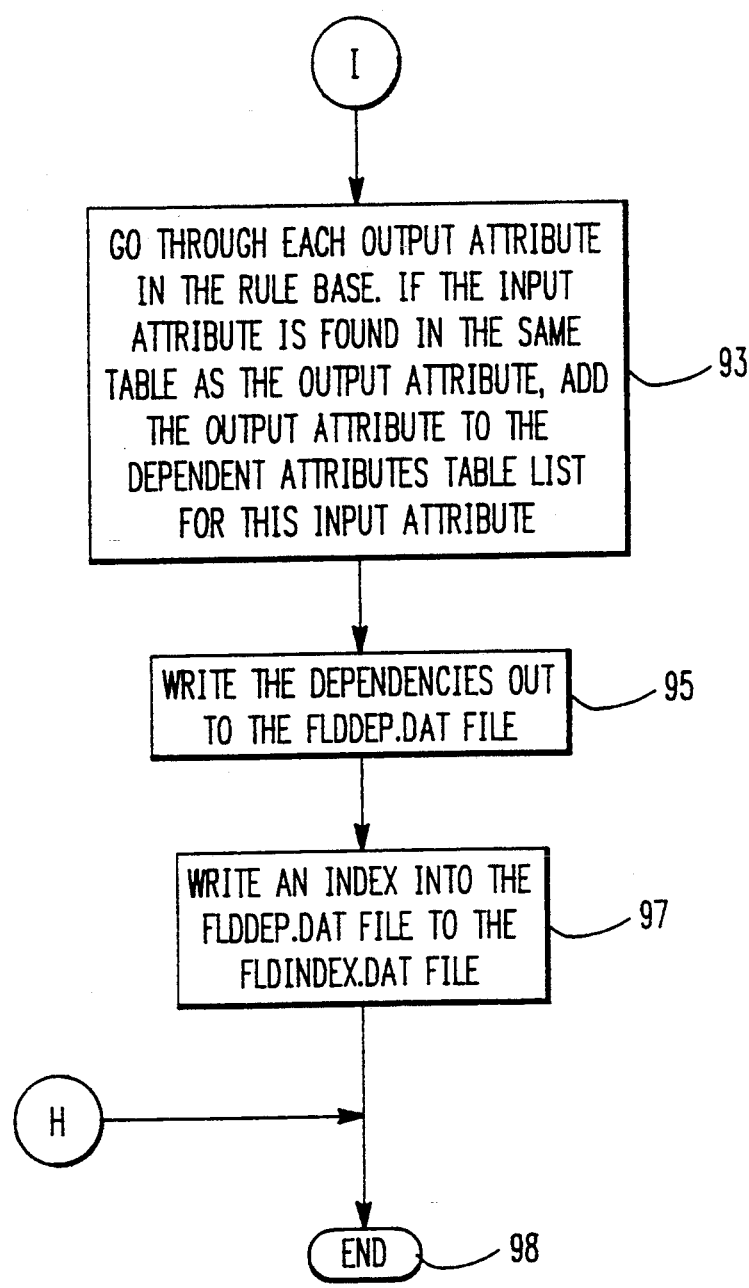
Figure 21A:
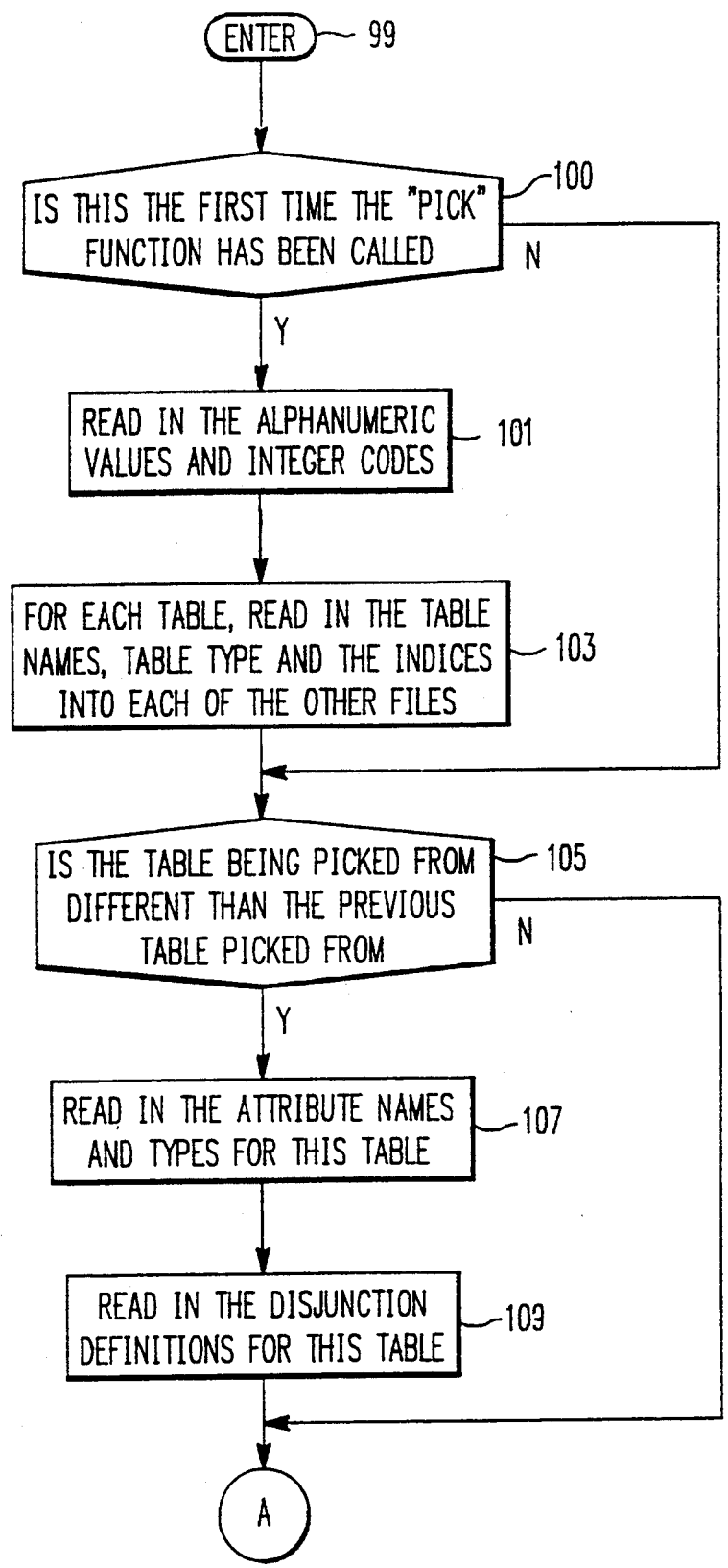
FIGS. 21A through 21C illustrate a flow chart for a suitable program for implementation by the computer system of FIG. 19 of a knowledge processor.
Figure 21B:
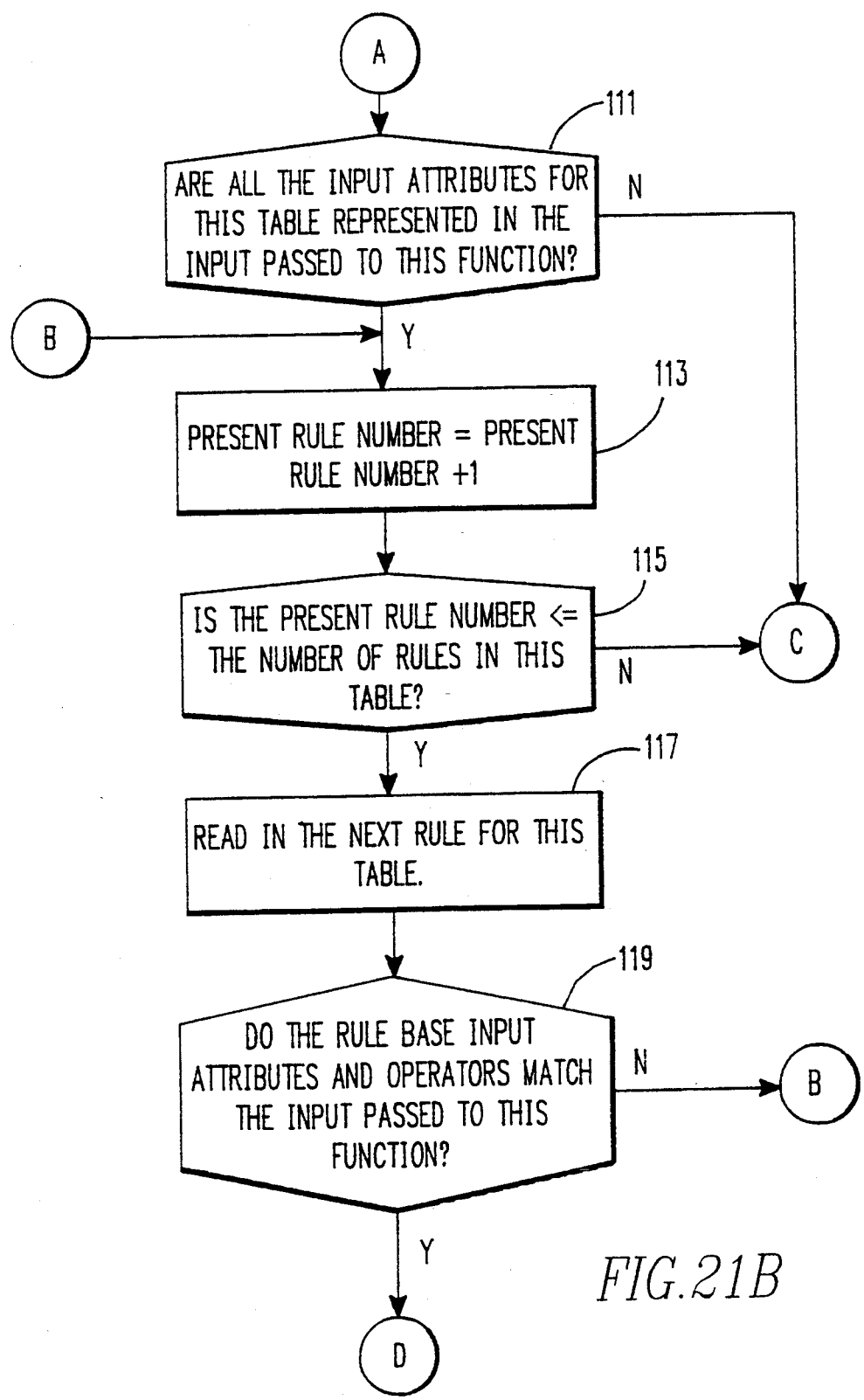
Figure 21C:
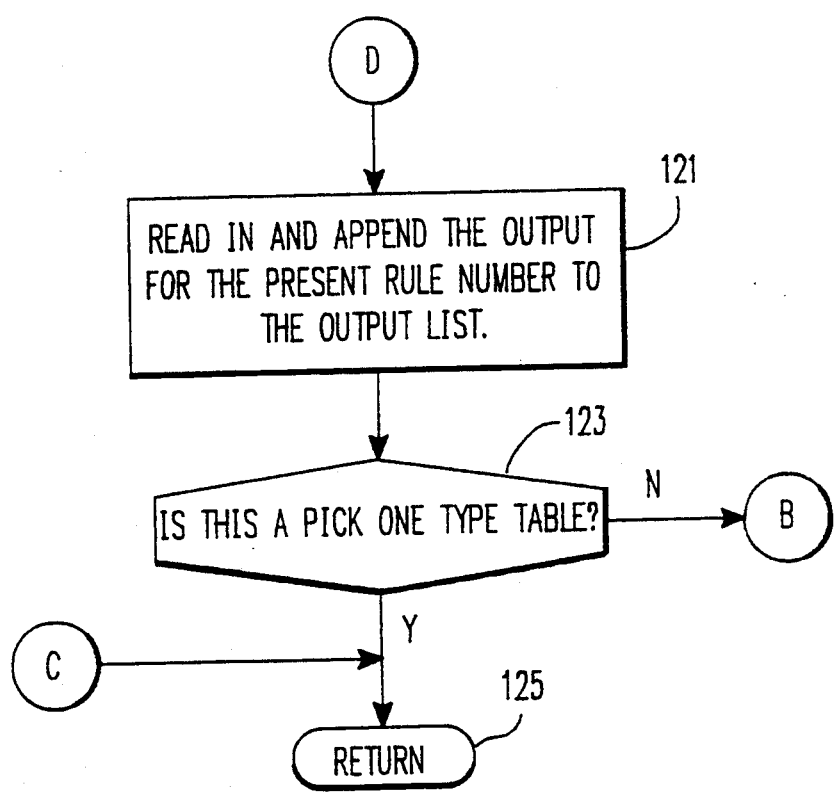

FIG. 19 illustrates a system 11 in which the described software tools are utilized. The system includes a computer 13. As mentioned previously, the tools can be utilized on systems run on a wide variety of computers, however, it is particularly suitable for implementing sizeable expert systems on a personal computer. The computer 13 includes a central processor 15, a read only memory (ROM) 17, a random access memory (RAM) 19, and input/output (I/O) 21 all connected by a bus system 23. ROM 17 stores the control programs for the CPU 15, and the RAM 19 memory stores application programs executed and data manipulated by the CPU 15.

The system 11 includes secondary storage means 25 which is preferably disk storage, such as a hard disk. The system 11 includes additional I/O devices such as, for example, a monitor 27, a keyboard 29 and a printer 31.

All of the ASCII tables and the tables generated by the knowledge compiler 1 are stored in secondary storage on the disk 25. It is one of the unique features of the invention that it is not necessary to copy the translated files into the computer memory (RAM) in order to execute the expert system. This feature is one of the reasons that sizeable expert systems can be executed on a personal computer since the rule base input files (rb.dat, Table 15) and output files (output.dat, Table 16), are not copied into the memory (RAM). Only the portions of a file needed at any given time are copied into memory. In practice, there are some files which are copied into memory because they are used often and do not take up much space. These are the index.dat file (Table 10) which provides information for locating data in other files and the defs.dat file (Table 13) which stores the integer codes for the non-numerical attribute values. If a particular application uses the flddep.dat file (Table 18), which lists the dependencies between rules extensively, this file can also be copied into memory, otherwise, it remains only in disk storage.

In operation, an application program running in the computer system 11 calls the knowledge processor and provides it with a set of input values and the identification of the table in which to fire the rules based on those input values. The specified table is then located on the disk 25 and the first rule is copied into memory 19 where it is compared with the inputs provided by the application program. While only the inputs for the rule being fired are needed, a block of data is read from the disk 25 into memory 19. There are two input/output modes available, the normal ASCII mode and the faster binary mode. The ASCII mode automatically buffers the data, the binary mode does not. Both buffering and binary modes speed up input/output, therefore, in the exemplary system both are used to speed up input/output. Since binary does not automatically buffer, it is done in the knowledge processor. The exemplary system reads in ten rules at a time hence, the size of the buffer is variable depending on the table. If the first rule examined does not match, the next rule is examined. The data for this rule may be in the same block of data read in for the first rule, or may require reading into memory 19 a new block of data. The point is, only the smallest block of data from the rb.dat file containing the input columns of the rule to be fired need be read into memory 19 at a time. Since the translated files are stored on the disk 25 in binary form, and since the tables all contain only integers, the comparisons needed for matching can be made very rapidly despite the fact that the tables containing the rules are not resident in memory 19. Once a match is made, the corresponding output data is found on the disk 25 using the index.dat file (Table 10) and the outindex.dat. (Table 17), and again, only the smallest block of data in output.dat (Table 16) that is necessary is copied into memory 19. From this block of data, the output values in the matched rule are extracted.

What is claimed is:

1. A data entry system for a digital computer having a display screen and a user input device, said system comprising:
   means for generating on said display screen, forms having background text and a plurality of fields for the insertion of data, wherein each field has a data entry, said fields being successively selectable through said user input device; and
   menu generating means for generating on said display screen dynamically varying menus, each comprising a list of valid potential data entries for certain selected menu fields, with said list of valid potential data entries for a given selected menu field varying dynamically, in a manner wherein the potential data entries on said list are dependent upon combinations of data entries made for designated other fields, a valid potential data entry in each dynamically varying menu being selectable as the data entry in the given selected menu field through said user input device, said menu generating means incorporating an expert system having a rulebase which includes rules establishing said list of valid potential data entries for the dynamically varying menus for each of said certain selected menu fields for each combination of data entries of said designated other fields upon which each said certain selected menu field depends, and means for firing the rules to select said list of valid potential data entries in a manner wherein said list is dependent upon current combinations of data entries made for the designated other fields.

2. The data entry system of claim 1 wherein said menu generating means generates a dynamically varying menu for at least one of said certain selected menu fields which has only one valid data entry for each combination of data entries for said designated other fields, with said one valid data entry varying dynamically in a manner wherein said one valid data entry is dependent upon said each combination of data entries in said designated other fields.

3. The data entry system of claim 2 including means for automatically entering without user input said one valid data entry for said at least one certain selected menu field when a data entry for one of said designated other fields is changed, said valid data entry, which is automatically entered, being the one valid data entry that is generated by said menu generating means, said one valid data entry being dependent upon combinations of data entries for said designated other fields, including the changed data entry for said one designated other yfield.

4. The data entry system of claim 3 wherein the field, for which the one valid data entry is automatically entered, is a designated other field for an additional field having only one valid data entry, said data entry system including means for iteratively automatically entering the one valid data entry for additional fields wherein each said additional field has only one valid data entry, until data entries for no more fields change.

5. The data entry system of claim 4 wherein said rulebase of said expert system includes rules establishing the one valid data entry for the selected field for each combination of data entries of said designated other fields and means for firing said rules to select the one valid data entry in a manner wherein the one valid data entry is dependent upon said combinations of data entries for said designated other fields.

6. The data entry system of claim 5 wherein said expert system includes a table for each of said fields having only one valid data entry dependent upon the combinations of data entries for said designated other fields, each said table including an input column for each designated other field upon which the one valid data entry for the selected field depends, an output column, and successive rows each containing in said input columns a combination of data entries for the designated other fields, and in said output column the one valid data entry for the selected field for the combination of data entries of the designated other fields in the input columns, each said row constituting a rule in the rulebase.

7. The data entry system of claim 1 wherein said expert system includes a table for each dynamically varying menu, each table including an input column for each designated other field upon which the dynamically varying menu depends, an output column and successive rows each containing in said input columns values for the designated other fields, and in said output column the menu of valid data entries for the dynamically varying menu for the combination of values of the designated other fields in the input columns, each said row constituting a rule in said rulebase.

8. A data entry system for a digital computer having a display screen and a user input device, said system comprising:
   means for generating on said display screen, forms having background text and a plurality of fields for the insertion of data, wherein each field has a data entry, said fields being successively selectable through said user input device; and
   menu generating means for generating on said display screen dynamically varying menus comprising a list of valid potential data entries for certain selected menu fields, with said list of valid potential data entries for a given selected menu field varying dynamically in a manner wherein the potential data entries on said list are dependent upon combinations of data entries made for designated other fields, a valid potential data entry in said dynamically varying menu being selectable as the data entry in the given selected menu field through said user input device; and
   means for selectively validating data entries previously made, as data entries are made for additional fields, including means for sequentially selecting each dynamically varying menu field and generating current valid potential data entries for said each dynamically varying menu field dependent upon the current combinations of data entries of the designated other fields upon which the selected dynamically varying menu field is dependent, comparing the data entry previously made for said selected dynamically varying menu field with said current valid potential data entries, and generating an indication that said data entry previously made is invalid when it does not match any of said current valid potential data entries.

9. A data entry system for a digital computer having a display screen and a user input devices, said system comprising:

means for generating on said display screen, forms having background text and a plurality of fields for the insertion of data, said fields being successively selectable through said user input device; and means responsive to selection of a selected field on a parent form for selecting for display on said display screen one of a plurality of subforms, with said selecting for display of said one subform dynamically varying in a manner wherein said selecting for display of said one subform is dependent upon combinations of data entered for designated other fields on said parent form, said selection means incorporating an expert system having a rulebase which includes rules establishing, for each combination of data entered for said designated other fields, the one subform displayed by selection of said selected field, and means for firing said rules to select the said one subform in said manner wherein said selecting for display of said one subform is dependent on said combinations of data entered for said designated other fields, and wherein said rulebase includes an indirection table for said selected field, said table including an input column for each designated other field upon which selection of the one subform displayed by selection of the selected field is dependent, an output column, and successive rows each containing in said input columns a combination of data entered for said designated other fields, and in said output column the one subform displayed for the combination of data entered for the designated other fields in the input columns, each said row constituting a rule in said rulebase.

10. A data entry system for a digital computer having a display screen and a user input device, said system comprising:

means for generating on said display screen, forms having background text and a plurality of fields for the insertion of data, said fields being successively selectable through said user input device;

means responsive to selection of a selected field on a parent form for selecting for display on said display screen one of a plurality of subforms, with said selecting for display of said one subform dynamically varying in a manner wherein said selecting for display of said one subform is dependent upon combinations of data entered for designated other fields on said parent form;

said fields being identified by field names, and wherein a field of a given field name is repeated in multiple locations and including means for designating fields with specified names as global fields and entering a value entered in a global field with a given specified name in each location of that field including locations on a single form and other forms in the system;

override means for passing values of identified fields in a parent form to fields of the same name in all subforms of the parent form; and means for labeling at least one field on a parent form for modification of said at least one field's value upon return from a subform, and means for modifying the value of a labeled field on said parent form to the value of a field of the same name on the subform when returning to the parent form from the subform.

11. A data entry system for a digital computer having a display screen and a user input device, said system comprising:

means for generating on said display screen, forms having background text and a plurality of fields for the insertion of data, said fields being successively selectable through said user input device for entry of data, at least one selected field when selected calling one of a plurality of hypertext forms containing help information for display on said display screen, selection of the one of said plurality of hypertext forms called for display varying dynamically in a manner wherein said selection of the one of said plurality of hypertext forms is dependent upon combinations of data entries for designated other fields, said means incorporating an expert system having a rulebase which includes rules establishing the selection of the one hypertext form of said plurality of forms displayed by selection of said selected field for each combination of data entries for said designated other fields, and means for firing said rules to select the one hypertext form, said selection being dependent upon the combinations of data entries of said designated other fields, the rulebase including an indirection table for said selected field, said table including an input column for each designated other field upon which said selection of the one hypertext form displayed by selection of the selected field is dependent, an output column, and successive rows each containing in said input columns a combination of data entries for said designated other fields, and in said output column the one hypertext form displayed for the combinations of data entries for the designated other fields contained in the input columns, each said row constituting a rule in said rulebase.

12. A data entry system for a digital computer having a display screen and a user input device, said system comprising:

means for generating on said display screen, forms having background text and a plurality of fields for the insertion of data, said fields being successively selectable through said user input device for entry of data, at least one selected field when selected calling one of a plurality of hypertext forms containing help information for display on said display screen, selection of the one of said plurality of hypertext forms called for display varying dynamically in a manner wherein said selection of the one of said plurality of hypertext forms is dependent upon combinations of data entries for designated other fields, said means for generating forms on said display screen including means for generating a network of hypertext forms each having at least one field which when selected through said user input device calls for display on said display screen another hypertext form in said network, the selection of said another hypertext form called being dependent upon combinations of data entries for of the designated other fields.

13. A data entry system for a digital computer having a display screen and user input device, said system comprising:

means for generating on said display screen, forms having background text and a plurality of fields for the insertion of data, said fields being successively selectable through said user input device, properties of said fields being defined by a form table having a plurality of columns each defining an attribute of said fields and a row for each field containing in each column a value of the attribute represented by that column for that field, and means for changing selected attribute values for said given field by changing in the row of said form table for said given field the values in the columns for said selected attributes, said field attributes including attributes which define a form structure for a current form in a memory, said form structure including a field cell for each field, at least some of said field cells including a location for a data entry for said field entered through said user input device, said means for generating said form tables including means for generating an array form table for generating an array form, said array form table having a set of fields with each field in said set defined by a row in said array form table, said system including means for replicating said set of fields a selected number of times in said form structure in memory.

14. A data entry system for a digital computer having a display screen and user input device, said system comprising:

means for generating on said display screen, forms having background text and a plurality of fields for the insertion of data, said fields being successively selectable through said user input device, properties of said fields being defined by a form table having a plurality of columns each defining an attribute of said fields and a row for each field containing in each column a value of the attribute represented by that column for that field, and means for changing selected attribute values for said given field by changing in the row of said form table for said given field the values in the columns for said selected attributes, said means for generating said forms including means for generating for a call field an indirection table in a given location in memory, said indication table having at least one input column for a designated other field, one output column and a plurality of rows, each row containing in said input column a value for said designated other field and in said output column the form table of a form to be called by the call field for each value of said designated other field, and wherein said form table for said call field includes as an attribute the given location in said memory of said indirection table.

* * * * *